(12) United States Patent
Shultz et al.

(10) Patent No.: US 9,654,179 B2
(45) Date of Patent: May 16, 2017

(54) METHOD AND APPARATUS FOR FORMING ASSOCIATIONS AND COMMUNICATING BETWEEN DEVICES

(71) Applicant: XPED HOLDINGS PTY LTD, Mawson Lakes (AU)

(72) Inventors: John Shultz, Mawson Lakes (AU); Christopher Richard Wood, Mawson Lakes (AU)

(73) Assignee: XPED HOLDINGS PTY LTD, South Australia (AU)

( * ) Notice: Subject to any disclaimer, the term of this patent is extended or adjusted under 35 U.S.C. 154(b) by 0 days.

(21) Appl. No.: 14/387,916

(22) PCT Filed: Mar. 28, 2013

(86) PCT No.: PCT/AU2013/000328
§ 371 (c)(1),
(2) Date: Sep. 25, 2014

(87) PCT Pub. No.: WO2013/142913
PCT Pub. Date: Oct. 3, 2013

(65) Prior Publication Data
US 2015/0044966 A1    Feb. 12, 2015

(30) Foreign Application Priority Data

Mar. 28, 2012 (AU) ................ 2012901247
Aug. 1, 2012 (AU) ................ 2012903292
Aug. 1, 2012 (AU) ................ 2012903294

(51) Int. Cl.
H04B 5/00    (2006.01)
H04W 4/00    (2009.01)
(Continued)

(52) U.S. Cl.
CPC ......... *H04B 5/0012* (2013.01); *H04B 5/0031* (2013.01); *H04B 5/0037* (2013.01);
(Continued)

(58) Field of Classification Search
CPC .. H04B 5/0012; H04B 5/0031; H04B 5/0037; H04W 4/008; H04W 12/04
(Continued)

(56) References Cited

U.S. PATENT DOCUMENTS

2008/0272889 A1    11/2008  Symons
2009/0170431 A1*   7/2009   Pering .................... H04B 5/02
                                                       455/41.1
(Continued)

FOREIGN PATENT DOCUMENTS

WO    2009105115    8/2009

*Primary Examiner* — April G Gonzales
(74) *Attorney, Agent, or Firm* — Duane Morris LLP; J. Rodman Steele, Jr.; Gregory M. Lefkowitz

(57) ABSTRACT

The present invention relates to the field of proximity communications and especially methods for establishing associations, transferring power and communicating data between devices. Devices are proposed to interact with each other, initially by being brought into close proximity to initiate transfer of data that enables the device to communicate with other devices similarly brought together. The devices can be used as a controller or an appliance or both. There is also provided a power transfer mechanism for controller and appliance devices which do not have locally available power at the time the initial proximity action is taking place, so that the processes associated with the data transfer can take place regardless. There is also described a two part device, one part of which provides the proximity communications capability the other part does not have.

37 Claims, 28 Drawing Sheets

Representation of a 1st, 2nd or 3rd device

(51) Int. Cl.
*H04M 1/725* (2006.01)
*H04W 12/04* (2009.01)

(52) U.S. Cl.
CPC ......... *H04M 1/7253* (2013.01); *H04W 4/008* (2013.01); *H04M 1/72527* (2013.01); *H04M 2250/04* (2013.01); *H04M 2250/12* (2013.01); *H04W 12/04* (2013.01)

(58) Field of Classification Search
USPC ....................................................... 455/41.1
See application file for complete search history.

(56) References Cited

U.S. PATENT DOCUMENTS

| | | | |
|---|---|---|---|
| 2010/0174801 A1* | 7/2010 | Tabaaloute | H04L 12/2812 709/217 |
| 2010/0330904 A1* | 12/2010 | Stougaard | H04L 67/12 455/41.1 |
| 2011/0106954 A1 | 5/2011 | Chatterjee et al. | |
| 2012/0021682 A1* | 1/2012 | Tabaaloute | H04L 12/2812 455/41.1 |
| 2012/0021684 A1 | 1/2012 | Schultz et al. | |
| 2012/0100803 A1* | 4/2012 | Suumaki | H04W 36/0072 455/41.1 |

\* cited by examiner

A dongle device capable of being attached to a mobile device
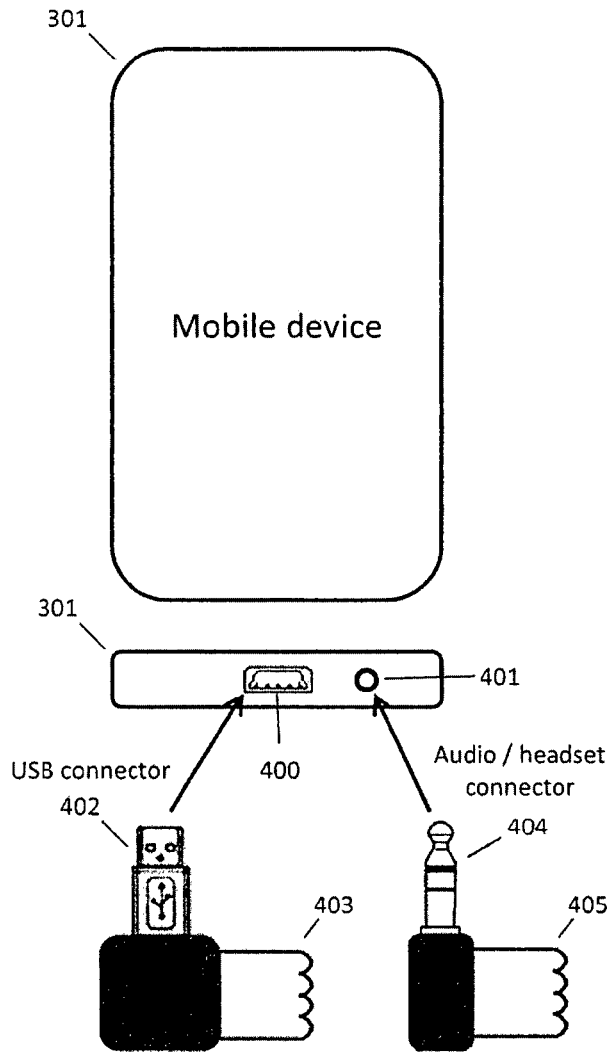
Dongle device connection to a mobile device
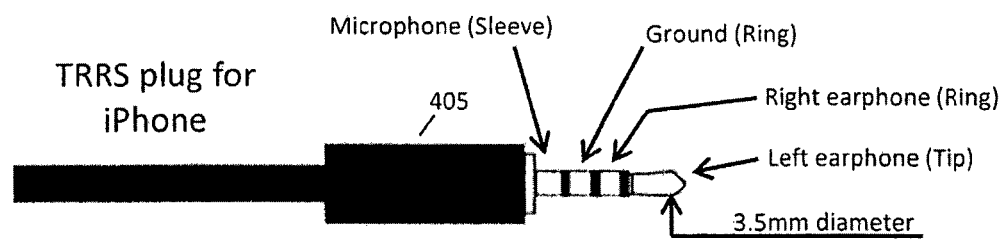
*Figure 4*

A generator arrangement
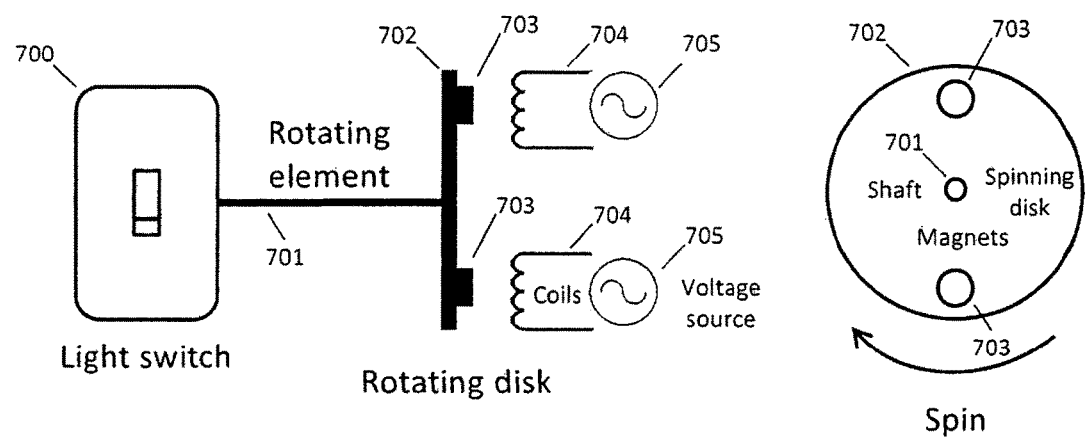
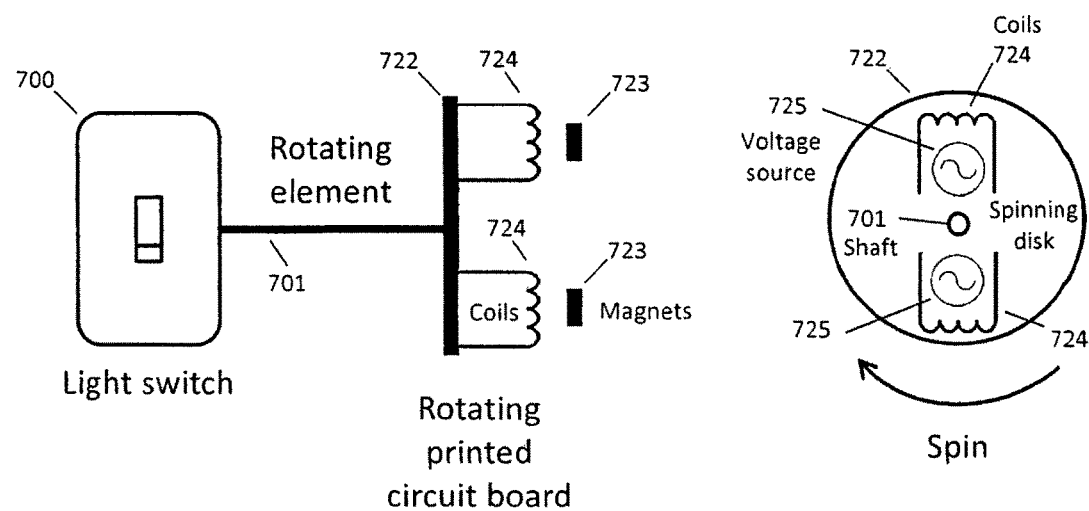
*Figure 7*

Arrangement of multiple PLC gateways and a wand device
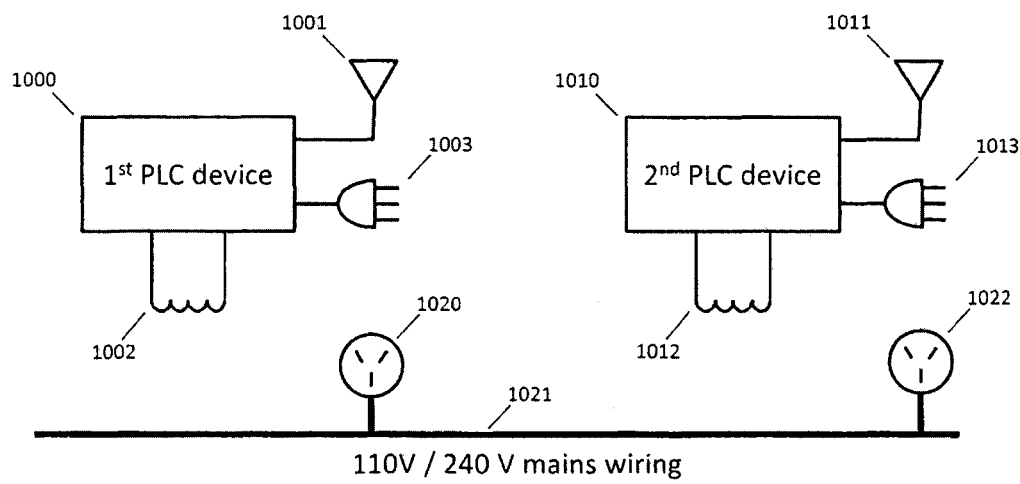
110V / 240 V mains wiring
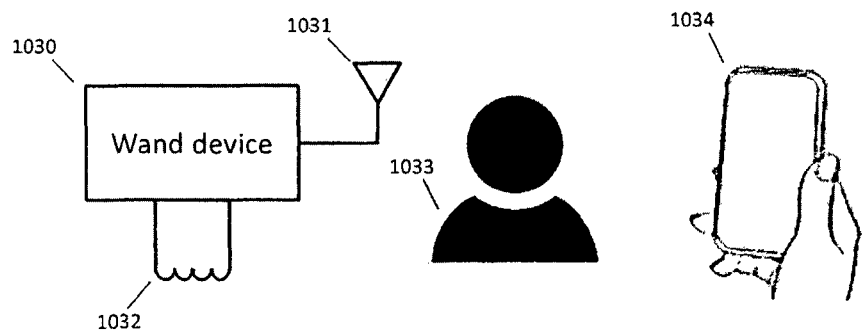
User accessing a wand device being a mobile device
*Figure 10*

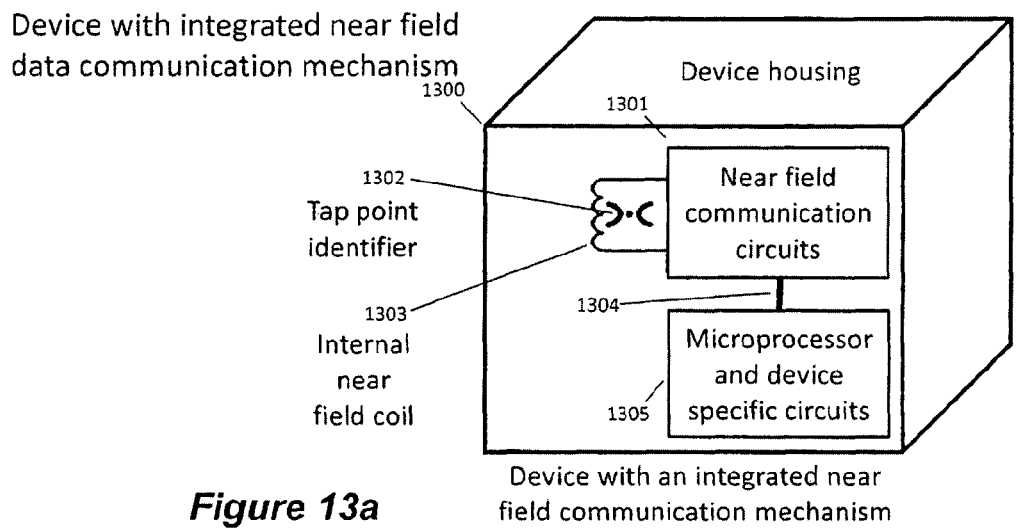
*Figure 13a* — Device with an integrated near field communication mechanism
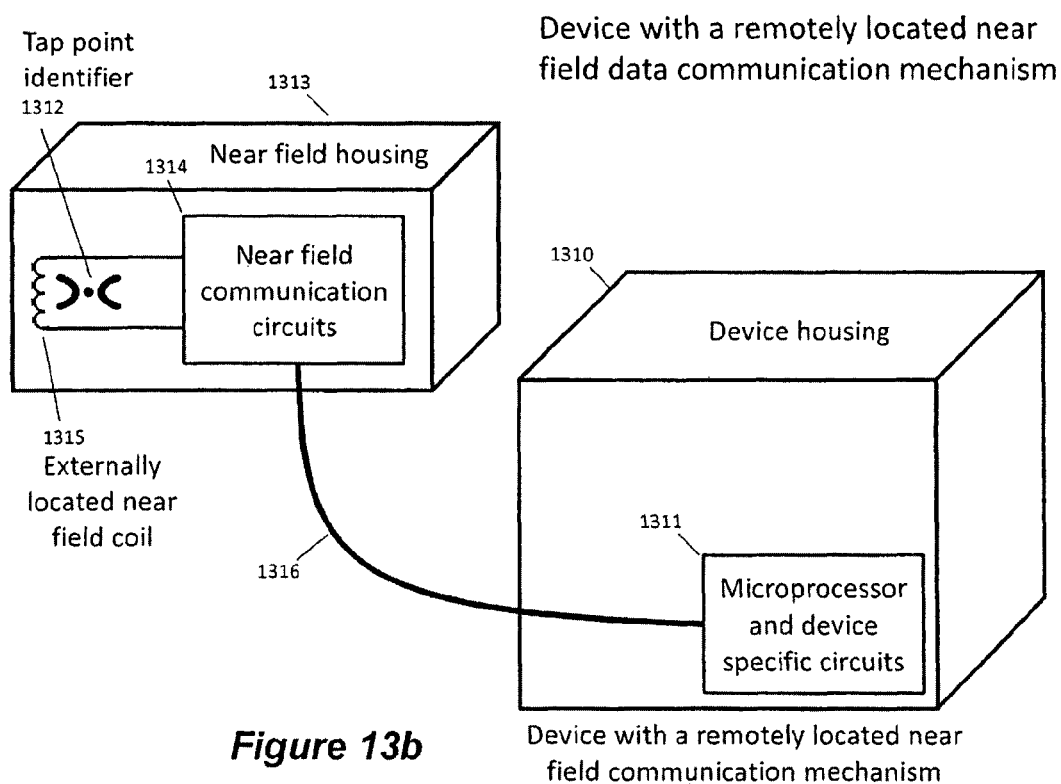
*Figure 13b* — Device with a remotely located near field communication mechanism

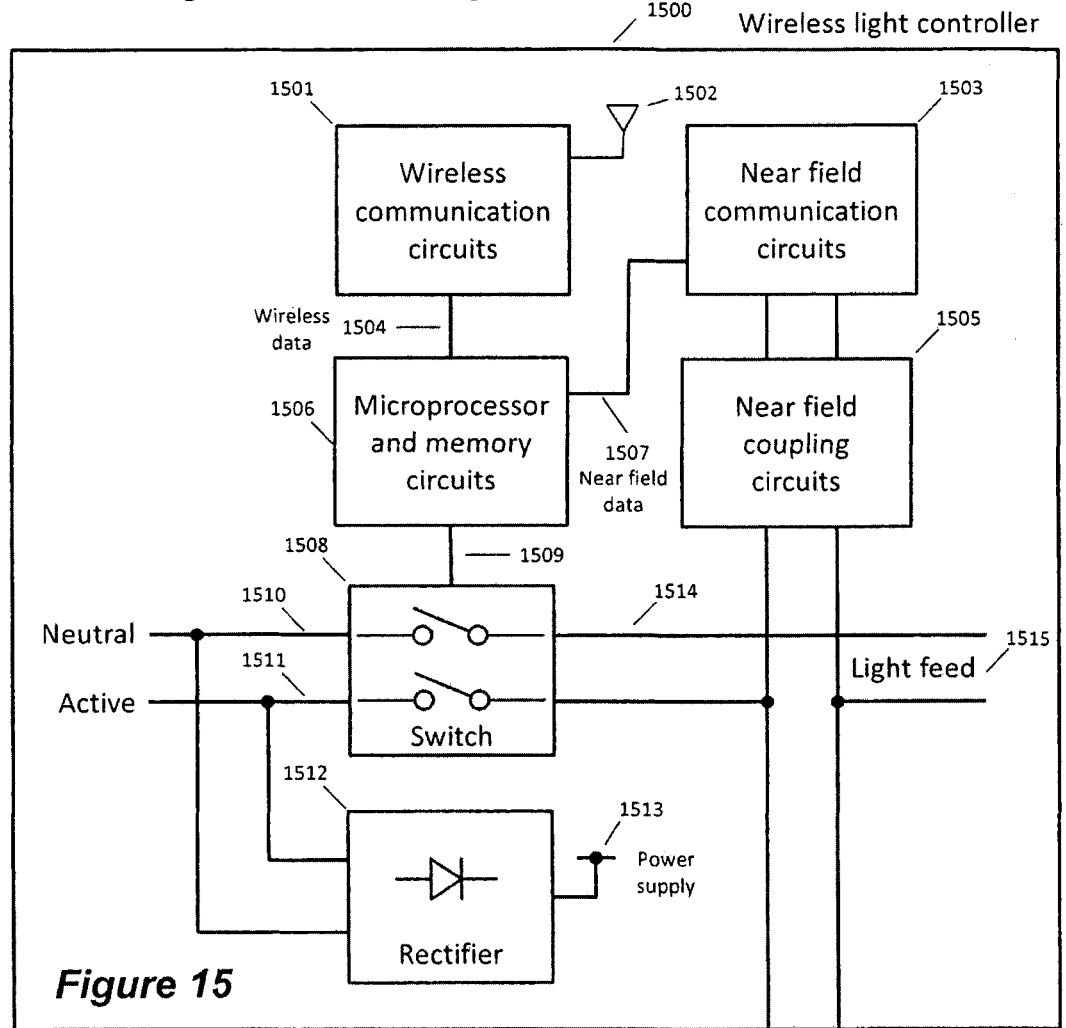
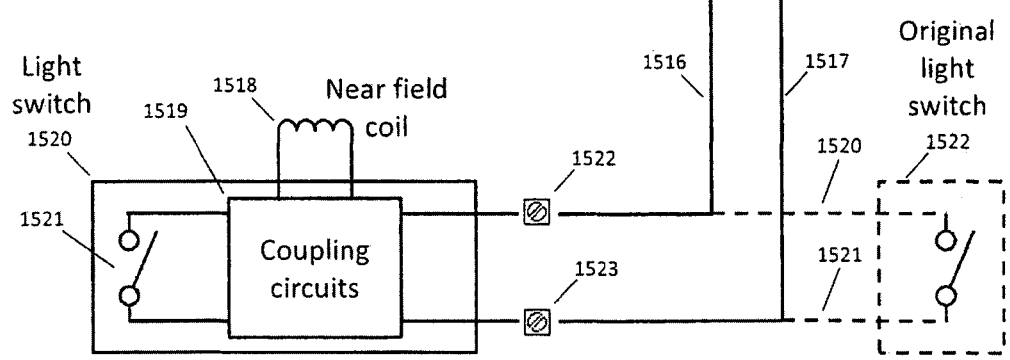
Figure 15

Audio channel data modulation

Audio channel data modulation for near field ping data communication

Impedance matching the phone to the dongle device
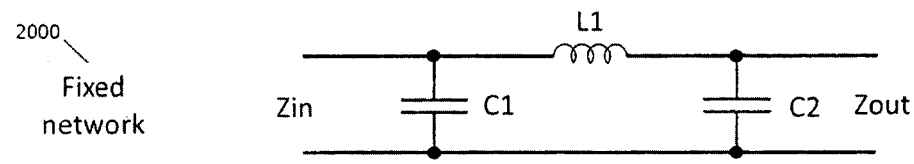
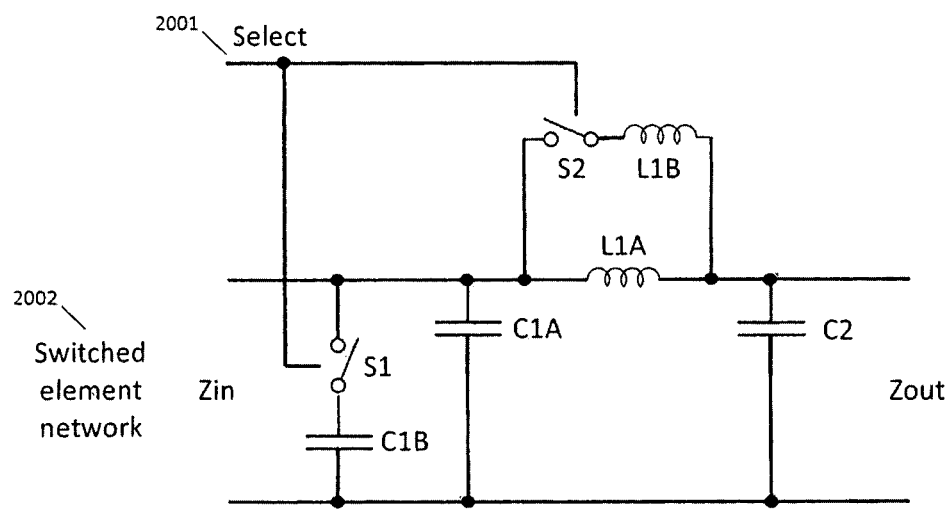
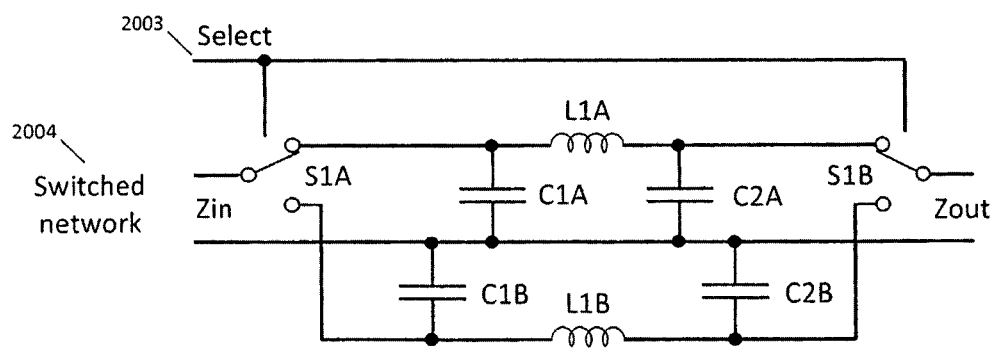
*Figure 20*

Voltage detection circuits used for adjusting a voltage multiplier

User selectable devices in a gateway arrangement

Step 1: User taps a wand to a gateway and 5 other devices and assigns nicknames

2200 — List displayed after tapping a gateway device

2204 — List displayed after tapping 5 devices

| Gateway Devices /2201 | Devices /2202 |
|---|---|
| Lounge Light 1<br>Lounge Light 2<br>Lounge Light 3<br>Lounge Light 4 -<br>Bedroom 1 Light<br>Bedroom 2 Light<br>Hall Light | Hall Light Switch Front<br>Hall Light Switch Back<br>Lounge Light Switch<br>Bedroom 1 Light Switch<br>Bedroom 2 Light Switch |
|  |  |

2203

Step 2: User drags devices into matched groups

2205 — List displayed after grouping gateway devices

2208 — List displayed after grouping devices

| Gateway Devices /2201 | Devices /21012 202 |
|---|---|
| Lounge Light 1<br>Lounge Light 2<br>Lounge Light 3<br>Lounge Light 4 | Lounge Light Switch |
| Bedroom 1 Light | Bedroom 1 Light Switch |
| Bedroom 2 Light | Bedroom 2 Light Switch |
| Hall Light | Hall Light Switch Front<br>Hall Light Switch Back |

METHOD AND APPARATUS FOR FORMING ASSOCIATIONS AND COMMUNICATING BETWEEN DEVICES

CROSS-REFERENCE TO RELATED APPLICATIONS

This application is a §371 national stage entry of International Application No. PCT/AU2013/000328, filed Mar. 28, 2013, which claims priority to:

Australian Provisional Patent Application No 2012901247 titled "METHOD AND APPARATUS FOR FORMING ASSOCIATIONS BETWEEN WIRELESS DEVICES" and filed on 28 Mar. 2012; and Australian Provisional Patent Application No 2012903292 titled "METHOD AND APPARATUS FOR MAXIMIZING POWER TRANSFER FROM AN AUDIO SOCKET TO A LOAD" and filed on 1 Aug. 2012; and Australian Provisional Patent Application No 2012903294 titled "AN ARRANGEMENT FOR COMMUNICATING BETWEEN DEVICES USING NEAR FIELD SIGNALS TO A REMOTE COIL" and filed on 1 Aug. 2012;

The content of each of these applications is hereby incorporated by reference in their entirety.

INCORPORATION BY REFERENCE

The following publications are referred to in the present application and their contents are hereby incorporated by reference in their entirety:

International Patent Application No PCT/AU2011/001412 (WO/2012/058724) titled "WIRELESS DEVICE DETECTION AND COMMUNICATION APPARATUS AND SYSTEM"

International Patent Application No PCT/AU2011/001235 (WO/2012/037618) titled "REMOTE CONTROL AND REMOTE CONTROL SYSTEMS"

International Patent Application No PCT/AU2010/000358 (WO/2010/108235) titled "AN ARRANGEMENT FOR MANAGING WIRELESS COMMUNICATIONS BETWEEN DEVICES" all in the name of Xped Holdings Pty Ltd.

FIELD OF INVENTION

The present invention relates to the field of near field communications and especially methods for establishing associations, transferring power and communicating data between devices.

BACKGROUND

The Near Field Arrangement

With the advent of close proximity near field communication systems which use the magnetic near field for communication (including the carrier based Near Field Communication (NFC) and carrier-less Near Field Ping (NFP) systems), a variety of new applications have emerged that can benefit from these close proximity near field communication systems.

The close proximity near field communication systems can provide data transfer over a wireless communication channel within a range of a few centimeters and enables a user to exchange data between devices by simply performing a sweep, wave, tap or touch gesture of one device in close proximity to another like device or other appropriately enabled device. This data can then also be used by the devices for initiating further actions, such as pairing and establishing a wireless network so the devices can communicate wirelessly.

This pairing process can be done by pressing buttons on both devices, or if the devices are equipped with near field communications circuits, they can be brought into close proximity to exchange the necessary data. Thus the device pairing is established through the near field touch gesture. By bringing the mobile device within close proximity to a fixed device enables the exchange of near field data, including PAN identifiers (ID's), MAC addresses, channel ID's, SSID's, security keys, etc. necessary to establish a long range wireless network. The long range wireless data channel can then be used as a data connection once the mobile device is withdrawn out of the close proximity near field range. In this way a mobile device can establish a wireless connection to a device by simply bringing the two devices within near field communications range (which is generally just a few centimeters).

One of the devices needs to be a mobile device, such as a mobile phone, smart remote, tablet, portable media player, handheld controller, keyfob, or the like and the second device can be another mobile device, but is typically a fixed device, such as a Point of Sale (POS) terminal, computer or door lock. The ability for two fixed devices to be paired using the described near field method is outside the scope of current technology.

Power Requirements of a Fixed Device

In the arrangement described above, the fixed device is typically mains powered and as such has substantially no power consumption constraints. In some systems the fixed device will be the master and typically will produce broadcast near field transmissions in the form of a modulated carrier, such that a slave mobile device can detect these signals, wake up from a low-power sleep state and begin communication with the master device. Alternatively the user would start an application (app) on the mobile device enabling near field capability. The full data transmission must occur while the devices are within the near field communication range.

In the arrangement where the near field equipped fixed device is mains powered, it is required to be positioned at a point having access to at least the active and neutral wiring of the mains power supply. This position may not be conveniently accessible by a user of a mobile device and therefore limits the ability to perform a near field communications tap action between the fixed and mobile devices. This limitation restricts the application and use of near field systems and the benefits they offer.

A Lighting Arrangement

It is becoming more common that mechanical light switches are being replaced with switches that contain electronic circuits. This allows greater functionality beyond a mechanical switch and can include diming, timing or wireless remote control functionality, to name a few.

Typically a light switch is located on a wall to control a light that is installed in the ceiling or some other remote or high place. The light itself requires active and neutral wires to operate. However, it is commonplace to feed the active wire down the wall cavity to one side of the light switch, with the other side of the light switch connected to a switched active wire that returns back up the wall cavity to the light. Turning the switch on (closing the switch contacts) connects the feed active wire to the switched active wire, thus providing power to the light. The switch allows the user to turn the light on or off. In this arrangement, no neutral wire is available at the light switch as it is wired directly to the light or lighting circuit itself.

This poses a problem, when electronic circuits are required to be powered since the active and neutral lines are rarely available at a light switch. There are a number of solutions to this problem.

A battery, capacitor, super cap, or some other method of power storage can be added to the system to power the circuits, however then there is a requirement to replenish this storage. This can be achieved by adding a solar cell, or adding power scavenging circuits that harvest power while the load is switched on, however both of these solutions have their own problems. In the first case, if the room is normally dark, little energy will be available from the solar cell and in the second case, if the light or load is of low wattage, or it is not turned on often, then very little energy can be harvested. In these cases the continuous quiescent current of the electronic circuits can deplete the energy storage and result in operational failure.

The way to overcome this is to run the neutral wire down the wall cavity. With the active and neutral wires now available, the electronic circuits can be powered from this source. However, this installation step can be very labor intensive and expensive to retrofit, particularly in solid walls.

Another method that has been employed is to utilize a switch mechanism that generates its own power when used. Energy is harvested from the action of the switch which may be used to generate a spark or to power a small generator. This produces energy that can be used to transmit a wireless transmission to command a lighting controller, allowing the light to be turned on or off. The problem with this system is that it has no power source available to operate the electronic circuits for pairing or device configuration, so the switch is generally hard coded to communicate to a light controller, limiting its usefulness.

PLC Extenders

It is becoming increasingly more common to use exiting mains power wiring in a home to transfer data around the home. This technology is referred to as Power Line Communication (PLC) where AC signals are superimposed on the 100V or 240V 50 Hz or 60 Hz mains voltage. A PLC extender device is equipped with an input connector or wireless antenna to accept the signals to be transferred over the power line. Ethernet and Wi-Fi PLC extenders are common. Multiple PLC extenders can be plugged into mains socket around the home and need to be addressed using software or switch setting to enable them to communicate with each other. The complexity of setup is often a barrier to the scalability of systems to include many devices and types as consumers find it increasingly more confusing, frustrating and time consuming to setup and maintain these systems. If an improved method was available that eliminated manual switch settings or software configuration then the advantages of PLC could be extended to include many devices such as light controllers, power outlets, security sensors, etc.

Toys

There is an increased use of mobile phones used to control devices using apps. However, in the toy market, mobile phones have made little penetration despite their technical ability to display information, communicate with or control devices such as toys. Part of the reason for this is that phones are seen as personal devices, often owned by the parents who would be hesitant to hand over their phone to their child as a play thing.

There has been an explosion of toys supplied with radio controls such as cars, helicopters, etc. however these technologies are all essentially the same; a single remote control controlling a single device. The technology has essentially stalled at this point mainly due to a lack of simple and inexpensive methods to wirelessly connect multiple systems together. With the current state of the art, it would be a complex process to say, interconnect many devices wirelessly and have them operate together, be controlled separately or as a collective.

Additionally, there is a practical limit on battery management. It is difficult enough for parents to keep track of this process with individual toys. Currently it is often required to change many batteries per device, or plug in the device for recharge. If multiple devices existed in the same system, each requiring individual battery management, the process would become intolerable for all but the most patient of parents. Additionally, introducing conventional wireless technology to a device has significant impact on battery life.

What is needed is a method that is affordable and simple enough for children to operate. With the cost of smartphones decreasing and the ability to build sophisticated remote controls inexpensively, the controller is clearly a reducing barrier. The barrier today is the mechanism and method of establishing a wireless network to include multiple devices and a way to simply establish a wireless network and control infrastructure that is suitable for the toy market.

The invention described discloses apparatus and methods that use ultra-low power wireless networks, methods to associate multiple wired and wireless devices, as well as a superior wireless power transfer and recharging system for improved battery management; based on new and innovative ways to use near field technologies which overcome, minimize the abovementioned problems or provide an alternative.

Adding Near Field Capability to a Mobile

With the increasing norm for electronic devices to be connected in some way to mobile phones and operated via an app, there is an increasing market for these "appcessories" to be physically attached to the phone and to operate while connected. The mobile phone and connected device can then operate as a single mobile unit and as such, there is a significant benefit if the attached device can be as small as possible. Eliminating a battery from the attached device or driving the battery capacity down has the significant benefits of physical size reduction and user maintenance benefits with battery charging and exchange.

Although the near field communication protocol NFC is becoming more common, many mobile devices are not equipped with any near field capability. In those cases it would be beneficial to be able to retrofit a suitable near field capability to a mobile device. Preferably the near field technology would be of ultra-low power since the mobile device has a limited battery capacity, which would make it possible and practical to effect mobile to mobile near field communications without excessive battery current drain.

With the advent of personal media players and subsequently media player compatible mobile phones, it has been possible to provide audio playback through attaching headphones to these devices. Devices can be attached to a mobile phone using wireless networks such as Wi-Fi or Bluetooth, or directly connected through the USB or audio connectors.

It would be advantageous to add near field capability to a phone using the audio jack as it is a commonly available and standard port. NFC dongle products already exist on the market that plug into the audio port. However, the power requirement of NFC exceeds the supply capability of the audio port, thus these dongles are equipped with batteries which must be replaced, causing inconvenience to the user.

The current state of the art utilizes the left or right audio channels and if available, the microphone input, as connections to the device. In particular, one of the audio channels is typically used to drive a signal to power the device and the other audio channel is typically used to provide serial data from the phone to the device. If the device needs to send data to the phone, the microphone input on the phone can be used.

Historically this method has been suitable for simple, low power devices. For example a mag stripe reader, which requires little circuitry to convert the alternating magnetic field of the card mag stripe into a voltage waveform suitable for the microphone input of a mobile phone. The data is then processed on the phone using an app.

Other devices, such as a stereo Bluetooth adaptor, are far more complex in that they consist of wireless circuits and a microprocessor. However, these devices rely solely on a built in battery for their power source and simply use the left and right audio channels as the stereo audio source. They commonly use USB connectors for recharging the built in battery which is the only power source and therefore scaled to provide sufficient power capacity to run the circuits in the device.

It would be beneficial if an ultra-low power, battery-less near field data communications device could be added to a mobile device using the standardized audio jack. This would overcome the current state of the art problems of near field communications between mobile to mobile and mobile to battery-less devices.

It would then also be beneficial to be able to use this suitably equipped mobile device to establish communications between multiple devices that are not easily portable.

The invention described herein, covers a variety of technologies that form part of a single, holistic solution that allows an arrangement of multiple mobile and fixed devices to communicate using a combination of near field and long range wired or wireless mechanisms. Multiple problems are solved arising from the limited portability of devices and limited power source availability to devices, that can restrict device positioning, reducing the ability for a user to access these devices needed to effect close proximity near field data transfers.

BRIEF SUMMARY OF THE INVENTION

First Aspect: Wand Establishes Data Communication between Two or More Devices

According to a first aspect of the present invention:

An arrangement for managing communication between a first, second and third devices the arrangement including;

a first device having a proximity sensor for detecting the proximity of another device, one or more communication mechanisms, one of which is a proximity communication mechanism;

a second device having a proximity sensor for detecting the proximity of another device, one or more communication mechanisms, one of which is a proximity communication mechanism; and a third device having a proximity sensor for detecting the proximity of another device, one or more communication mechanisms, one of which is a proximity communication mechanism, wherein the third and the first devices are brought together such that at least one of the respective device proximity sensors confirms the proximity of the other device after which the respective devices communicate to exchange data and the third and the second devices are brought together such that at least one of the respective proximity sensors confirms the proximity of the other device after which the respective devices communicate to exchange data; wherein the data transferred between the proximity communication mechanisms of the first device, second device and third device enables communications to be established between the first and second devices using one or more communication mechanisms.

The first device may also be known as a "controller". For clarity a controller is generally, but not limited to a device that commands or invokes actions on another device. A controller may be, but not limited to a device that is not easily portable. For example a personal computer, a light switch, etc. but may also include portable devices such as a mobile phone, keyfob, etc.

The second device may also be known as an "appliance". For clarity an appliance is generally, but not limited to a device whose operational state is determined by another device. An appliance may be, but not limited to a device that is not easily portable. For example a printer, wireless router, light circuit, etc. but may also include portable devices such as a smartcard, toy, etc.

A fixed device is generally referenced to a device that is not easily portable which may be a result of; its size or weight; being wired into position; requiring access to a non-movable power source; has wireless access within a limited area; or may be constrained by environmental factors, etc.

The third device is hereafter known as a "wand" and serves as a portable intermediary device that is used to establish a data communications link between two or more other devices. An example of a wand device is; a purpose designed and built device; handheld controller; keyfob; memory stick; or mobile phone, smartphone, smart remote, tablet, portable media player, running an app.

An example to illustrate the use of a wand would be a user tapping a wand to a wireless printer and then tapping the wand to a computer. Data is exchanged between the computer, printer and wand such that a wireless connection is automatically established between the printer and computer.

More generally the word "device" will refer to any device being a controller or an appliance. An arrangement of devices described within this invention is not limited to a single appliance or controller, but can be any number of devices with any combination of functions or modes. Similarly any number of wand devices can be present in an arrangement.

It is the general principle of this invention that one generally portable device, being the wand, can be positioned at a close distance to other devices, such that the wand can communicate data with a device or identify a device, resulting in two or more other devices establishing a data communication link or network. The data link may or may not include a communication mechanism that includes the wand itself. Thus the wand can act as a one off facilitator to establish communication links or networks between other devices, of which it is no longer included, or the wand may have a communication mechanism that allows it to continue to be included in the data link or network. This might be beneficial if the wand acts as a controller to devices.

A proximity sensor can be used for detecting the proximity of another device. It should be generally understood that in the embodiment of this invention, proximity means touching or close range such as might be achieved with; mechanical contacts or terminals; electrical contacts; infrared signals; electromechanical mechanisms; magnetic or hall effect sensors; coil coupled circuit; subsonic, audible or supersonic sound waves; fingerprint readers; capacitive sensors; optical recognition systems including barcodes, QR codes; a near field mechanism; a near field communication mechanism; or the like.

A near field proximity sensor is one used for detecting the proximity of another device utilizing a near field mechanism such as might be achieved with; carrier based near field systems, such as the Near Field Communication (NFC) standard; any of the Radio Frequency Identification (RFID) standards; ultra-low power carrier-less Near Field Ping (NFP) systems; wireless signals operating predominantly in the magnetic near field; low power wireless or radio signals.

A proximity communication mechanism refers to a mechanism that allows one device to communicate data to another device when the two devices are brought within a close physical distance such as might be achieved with; data over electrical contacts; infrared signals; capacitively, magnetically or transformer coupled circuits; low power wireless; radio signals; or a near field communication mechanism.

A near field communication mechanism refers to a mechanism that allows one device to communicate data to another device when the two devices are brought within a close physical distance such that data is transferred predominantly using the magnetic near field such as might be achieved with; carrier based near field systems, such as the Near Field Communication (NFC) standard; any of the Radio Frequency Identification (RFID) standards; ultra-low power carrier-less Near Field Ping (NFP) systems; wireless signals operating predominantly in the magnetic near field; low power wireless or radio signals. Typically for NFC systems operating at around 13 MHz, the near field communication range is in the order of a few centimeters. It is also a characteristic of these mechanisms that the closeness of the devices and the physical distance of other devices excludes or minimizes any security risk that the data exchanged between the devices will be intercepted, changed or corrupted. Thus the close proximity aspect of the data exchange also ensures identity of respective devices one to the other.

Additionally, devices may be referenced as being equipped with a wireless communication mechanism; however any communication mechanism or any number of communication mechanisms can be utilized.

A communication mechanism refers to a mechanism that allows one device to communicate data to another device. Commonly, the distance over which data is communication would be greater than might be achieved with a near field communication mechanism, such as; wired interfaces including RS485, RS2321, USB, CAN bus, one wire protocols, etc.; or wireless interfaces including any variant of 802.15.4, 802.11, GSM, CDMA, etc. However it is possible to implement a communication mechanism that utilizes a near field communication mechanism without detracting from the general concept, novelty and inventiveness of the invention disclosed herein.

In the first embodiment, the wand, which is typically a portable device, allows two or more other devices, which may or may not be portable, to establish a communication connection where data is transferred over a wired or wireless connection between the two or more other devices.

The wand can consist of data storage sufficient to hold device data from two or more devices in order to establish a data connection between the two or more devices.

It is possible that the wand can be any suitably equipped device, including an NFC equipped smartphone, remote control, keyfob, or the like. If the device is not suitably equipped, it might be possible to add an accessory device to provide the functionality required. For example a near field communication dongle could be added to the audio or USB port of a smartphone not already suitably equipped.

The wand itself can be used as a controller so would benefit from being equipped with switches, keypad, microphone, or motion sensors to act as user inputs for the control of devices. Motion sensors could send commands based on user gestures and a microphone input could be used for voice recognition.

With the explosion of Internet connected devices, more devices and device types are foreseen to have wireless connectivity and many of these are planned to exist in what is known as the "connected home".

A typical connected home may consist of appliances, power outlets and light switches, etc. that are wirelessly or even Internet connected. For the case of a lighting example, it is beneficial if the light switch and/or light controller are fitted with a suitable wireless communication mechanism as to allow the switch to function with mobile devices. Thus a light can be controlled from light switches and mobile devices, forming a multi way wireless light switch arrangement. Additional mobile devices could become controllers in this arrangement by simply tapping the mobile to the light switch, thus pairing with the switch using near field data communication.

In a further embodiment, it is possible that a wand can be used to establish wireless connections between more than two devices by tapping multiple devices in order for them all to be connected to a common wireless network such as a PAN.

It is also possible that the wand can be used to form groups of devices that can be controlled, monitored or otherwise interacted with, as a collective. An example of grouping might be to touch several lights with the wand that will enable these lights to now be controlled as a group rather than individually.

It is also possible that one of the devices could be a wireless router. Currently devices such as mobile phones, tablets, computers, media players, etc. connect to a wireless router by entering the SSID and password of the network to establish connection. For devices with a Graphical User Interface (GUI) this process, although rather laborious and error prone, is possible. However, if a device is not equipped with a GUI, this type of connection process is not normally possible.

The current invention makes it possible and easy to connect devices without a GUI.

Some examples of devices that would not normally be equipped with a GUI yet might benefit from being connected to a wireless network include light controllers, light switches, power outlets, wireless chargers, keyboards, keyfobs, electronic toys and toy bricks or building blocks, fridges, toaster, electric blankets, sensors, remote control devices of various appliances, etc.

Wireless routers which might normally be used to connect these devices are typically not equipped with a GUI. The wand can be used to touch one or more devices and then touched to the router to establish a wireless network.

A wireless router could come equipped with a removable wand device allowing the user to tap all the devices to be connected. By tapping or docking the wand to the router, automatically established a wireless link between the devices.

PLC extenders are also network devices without a GUI. Considering a situation where multiple PLC extenders are utilized with several separate networks, setup using the current state of the art would be challenging. However, using the wand to simply tap each extender that is to be added to a network becomes a simple and intuitive task. The task is then repeated for multiple networks, The wand itself may have no user interface, akin to a memory stick, or be equipped with LED indicators, or an LCD type GUI which could communicate data or status to the user. In addition, the wand may connect to a device that has a GUI, such as a mobile phone or smart remote.

Second Aspect: Battery-less

In this aspect of the invention, the wand can perform an additional function where the near field communication mechanism can also be used to transfer power between the wand and device.

It can be beneficial if a device is completely wireless, eliminating the need to provide power wires to the device. The device could then be located at a convenient, user accessible location, completely independent of external mains or other wiring. In this case the electronic circuits could be powered by batteries; however it would be even further beneficial if the device was also battery-less.

In the case of the light switch, if it does not require external power then the expense and inconvenience of installing wires down the wall cavity to the switch is eliminated resulting in full flexibility as to the installation position of the switch.

However a completely wireless light switch would need some power source to operate the microprocessor, near field communication and the long range wireless circuits. This could be a battery or solar cell combination, but both of these sources have the potential to run out of charge, rendering the light switch inoperable. Additionally, batteries can be costly and ecologically unfriendly and there is the inconvenience of having to change them periodically.

In a preferred arrangement, the motion or actuation of the switch itself would generate sufficient energy to power the electronic circuits and radio to transmit wireless data to turn the associated light on or off.

This could be achieved in many ways, including the rotary action of a light switch driving a small generator, a wind up or clockwork generator, or an action of the switch or some other device, generating a small energy pulse, etc.

The problem still remains of how to connect, associate, or "pair" the light switch to a light controller or suitably equipped light fitting or light bulb.

In the arrangement described herein the wand connects a light switch to light controller The preferred embodiment is to use the near field communication mechanism to transfer data between the light controller and the wand; and also the light switch and the wand; as to enable the light switch and light controller to pair and communicate data over a longer range wireless communications network.

However, during the near field pairing process with the light switch, energy is also required and may exceed the amount stored from the energy generation process resulting from normal operation, such as turning the light switch on or off, etc.

It may therefore be necessary to find an additional source of energy for the near field communication pairing process.

Third Aspect: Wand Power Transfer

In this aspect of the invention the wand itself could provide power to a device using a power transmitting mechanism. The device can receive the power using a power receiving mechanism.

This is beneficial in the case where there is none or insufficient power available for a device to perform some function, such as powering a proximity communication mechanism. A wand can then be used to provide power to the device when the wand and device are in close proximity.

It is particularly beneficial for use in battery-less devices or to recharge a built in energy storage mechanism.

An energy storage mechanism which can consist of one or more energy storage elements such as a battery, capacitor or super cap, or a combination of circuits and energy storage elements.

A power transmitting mechanism can transfer power to a device using electrical conductors or a wireless mechanism.

Power Transmitting Mechanism Using Electrical Conductors

The power can be transferred from the wand to the device using electrical conductors. Charge from a charge storage reservoir in the wand can be transferred to a charge storage reservoir in the device through electrical contacts, when the wand and device are in close proximity. These contacts might be connector pins, spring loaded pins, conductive contacts or the like.

Power Transmitting Mechanism Using a Wireless Mechanism

More advantageously though, power could be transferred from the wand to the device using a wireless mechanism. In this way, the device is not cosmetically hindered with visible pads, slots or connectors or subject to long term unreliability issues due to contact failure or contamination.

Power Receiving Mechanism

The device can receive power from a wand by utilizing a power receiving mechanism. In the case where electrical conductors are used to transfer power from the wand, the energy is then stored in an energy storage mechanism.

In the case where the device uses a wireless mechanism, a coil element is used to generate a voltage when in close proximity to a wand power transmitting mechanism. This voltage would typically be rectified, filtered and stored in an energy storage mechanism. The available voltage is then used to power electronic circuits.

The coil element can be a coil made from wire or made using printed conductors on a printed circuit board.

The invention described here involves the wand being held in close proximity to a device, such that an energy field is generated by the wand, sufficient to transfer power from the wand to the device. This can be used to recharge an energy storage mechanism in the device, such that the received power can be used to sustain sufficient power to supply the electronic circuits in the device. These circuits could include a near field communication mechanism to transfer data between the device and the wand.

The power transmitting and receiving mechanisms can be implemented using the same near field communication mechanism described previously. In which case the mechanism can be used to transfer power only; or power and data.

In this example, the energy transfer is sufficient to power the circuits in the light switch to transfer or exchange data between the switch and the wand that will be used for pairing.

Thus the wand is first brought into close proximity to the battery-less light switch where power is transferred from the wand to the switch sufficient to power a near field data transfer. Then the wand is brought into close proximity to one or more lighting controllers or fittings. Wireless pairing is established allowing the light switch to control the lights. In some embodiments the wand will also be able to control the lights, thus enabling a multi way light switch arrangement.

It is of course understood by those skilled in the art that this invention can be applied to many other applications beyond the light switch example and can include any arrangement including controllers and appliances where a wand device can be used to pair and establish communications between the controllers and appliances. It is particularly beneficial where a device is wireless and there is a further preference or need to remove batteries.

Fourth Aspect: Wand Controller

In this aspect of the invention, the wand can be equipped with communication mechanisms, User Interface (UI) or sensors, allowing it to act as a controller or status display for devices.

An example of this might allow a wand to tap light controllers and then act as a controller for those lights.

The lights could then be controlled using gestures, audible inputs, switches or touch screen, etc. Additionally, the status of the lights could be indicated using some form of display or audible device such as a beeper.

When a wand taps a light controller, it can be paired with the controller and at that time a nickname or some other identifier added to the light, for example, "lounge light". Where multiple lights are paired, the process of touching, pairing and identifying can be repeated for each light.

Identifying Multiple Lights

In the case where multiple light controllers are tapped with the wand and identifiers not added at that time, it can be difficult to identify each light when it comes to assign the nicknames at a later time. An example of this might be where a newly built home has been fitted with wireless light controllers and an installer has used a wand to tap and pair all the light controllers in the home. The wand is then provided to the home owner who then associates each light controller with a light switch and provides a nickname at that time.

The wand can be used to turn on each light since it has been paired with each light controller. Then once a light is identified, the wand can tap the appropriate light switch to be associated with that light. Pairing can then be handed over from the wand to the light switch and a nickname entered. A this point the wand can un pair with the controller, thus having no further role in the arrangement, or pairing can be maintained and the wand could continue to act as a controller to that light, acting as a multi way switch with the also paired light switch. The option to maintain or remove pairing on the wand once the light switch is paired, could be determined by the user from a menu option or prompt, or it could be a preselected built in function of the wand.

Identifying the light controller in the above arrangement might require the user to manually switch each light on to identify it. There may be many lights in a home, so this process may be time consuming. It would be beneficial to have a sequencing program where all the lights are each in turn, momentarily turned on and off. This sequencing could be controlled by the wand or a light controller communicating with the wand. If the wand is equipped with a light sensor it could be possible to point the wand at each light and use a time analysis algorithm to identify which light is being pointed at and then prompt for a nickname for that light.

Another method of identifying multiple devices would be to use a gateway device.

Fifth Aspect: Gateway Device

An arrangement for managing communication between a first, second and third devices the arrangement including;

a first device having a proximity sensor for detecting the proximity of another device, one or more communication mechanisms, one of which is a proximity communication mechanism;

one or more further devices having one or more communication mechanisms;

a second device having a proximity sensor for detecting the proximity of another device, one or more communication mechanisms, one of which is a proximity communication mechanism, and has communication with one or more further devices;

a third device having a proximity sensor for detecting the proximity of another device, one or more communication mechanisms, one of which is a proximity communication mechanism, wherein the third and the second devices are brought together such that at least one of the respective proximity sensors confirms the proximity of the other device after which the respective devices communicate to exchange data to permit the establishment of communication between said further devices and the first device as well communication between the first device and the second device using one or more communication mechanisms; and the third and the first devices are brought together such that at least one of the respective proximity sensors confirms the proximity of the other device after which the respective devices communicate to exchange data that enables communications to be established between the first and further devices and/or the first and second devices using one or more communication mechanisms.

A gateway device has access to information regarding devices which can be made available to a wand device.

A gateway device is equipped with one or more communication mechanisms, including a proximity communication mechanism. The communication mechanism allows the gateway to access information on one or more further devices. Further devices may be any type of device, including one or more controllers, appliances or other gateways.

Access to data or information regarding further devices enables communications to be established between the further devices and one or more other devices, which can include controllers, appliances, wands or other gateways.

A gateway can access information on further devices by being in direct communication with the devices, or by using one or more communication mechanisms that are not in directly communication with the devices, but allow access to information on further devices. This might include the gateway device accessing a Uniform Resource Locator (URL), or a transferrable data storage mechanism, such as a memory stick or the like, that contains information on further devices.

A wand device is brought within close proximity to the gateway device as to enable data transfer between the respective proximity communication mechanisms that enables devices and further devices to communicate.

The gateway can query each device using a communication mechanism to retrieve device data such as device ID, communication protocols available, network data such as MAC addresses, PAN identifiers, channel number, etc. The gateway device may run some software algorithm, software configuration or use a switch configuration to allow it to communicate with other devices using the communication mechanism.

Alternatively, the gateway could discover devices using a discovery protocol. A discovery protocol such as an extendible markup language (XML) or Auto Discovery Remote Control (ADRC) would allow multiple devices to disclose their identities, communication and control parameters and user interface to the gateway.

The wand is equipped with a mechanism for determining which one or more further devices are to establish communication with one or more devices. This device determining mechanism might be a user interface such as a touchscreen, keypad, buttons or voice command inputs.

It is also possible for the gateway device to include a device determining mechanism, so that further devices can be selected prior to the data being transferred to the wand.

The gateway could be equipped with a communication mechanism that uses PLC over wires. Further devices may also be equipped with PLC for communicating with the gateway.

An example of this arrangement might be that a PLC gateway is plugged into a main socket. A number of PLC equipped light controllers are installed and can communicate to the PLC gateway using the wiring connected to that mains socket. The gateway can access the device ID and other data from each light controller. A wand is used that is equipped with user interface, such as a touchscreen display and near field communication mechanism. The wand is tapped to the PLC gateway to enable a data exchange over the near field communication mechanism such that the identifying names of the discovered light controller devices are listed on the display.

A user can identify each device on the power line from this list, assign a nickname and tap a locally accessible device, such as a light switch, to establish the data communications link between the two devices.

If the PLC equipped device, such as a light controller, is also equipped with a wireless communication mechanism, then it can be automatically paired with the locally accessible device, which may be a wireless light switch.

One or more further devices can be selected using the device determining mechanism to enable communications to be established with a device which may be a controller. If the communication mechanism is wireless, then the one or more further devices can be paired with a device.

For example this would allow a user to select multiple lights from the list and pair them with a single light switch allowing all the lights to be controlled from this one switch.

Additionally one or more devices can be selected using the device determining mechanism to enable communications to be established with a further device which may be a light controller. If the communication mechanism is wireless, then the one or more devices can paired with a further device.

For example this would allow a user to select multiple light switches and pair them with a single light controller allowing all the light switches to control the one light.

Additionally a group of light controllers could be paired with multiple controllers which could be a combination of light switches, smartphones, tablets, remote controls, keyfobs, etc. all of which can operate together as multi way light switches.

Thus further devices attached to a gateway device are not required to be equipped with a proximity communication mechanism as they communicate with the gateway which is itself equipped with a proximity communication mechanism that is accessible using a wand.

This arrangement provides benefits as the user is not required to be in close proximity to the remote device. In the example of the light controller, which might be located in the ceiling space, the user can establish wired association or wireless pairing with a device, such as a light switch, without the need to access the ceiling space since the gateway and light switch are readily accessible within the home.

Sixth Aspect: Security Wand

In this aspect of the invention, the wand can act as a security device.

The wand can provide the mechanisms required to facilitate the creation of pairing links between devices that are trusted and highly secure. As the wand communicates with each device over a proximity communication mechanism, the resulting conversations cannot be heard by another party without the intervention being obvious (the eavesdropping party would have to be in close physical proximity as well). In effect, the proximity communication link between the wand and a device is a private channel. This being the case, the wand is in a good position to generate session keys that will later be used to establish a secure communication link between the first and second devices. For example if the wand generated a random 128-bit AES key and passed it on to the first and second devices via a proximity communications links, this would enable the first and second devices to use the key to encrypt the ensuing communications over a longer range communications link established between then to complete the pairing. Once the secure pairing link was established, the devices could both store the key from the wand, or they could generate a new secret key that only they know and use this for all further communications. The new secret key could quite safely be sent over the pairing link as it is already secured by the wand key.

The above mechanism is also applicable to wired communication channels.

A system could be designed where pairing may not be possible without the wand being used as the intermediary device. This can be beneficial to ensure devices cannot be paired or unpaired without the presence of the wand, adding additional security to a system.

In a home environment this may be an advantage as the parents could hide the wand ensuring unauthorized network alterations being made by children or guests, even if they are equipped with suitably enabled mobile devices.

Additionally security authorization mechanisms can be added such as finger print scanners, cameras, voice recognition, etc. to further expand the security and authentication possibilities.

Seventh Aspect: Remote Near Field Communication Mechanism

A near field equipped device may be fixed or located in a place that is not conveniently accessible by a user, making it difficult or impossible to facilitate a near field data transfer. In this case it is beneficial to remove the near field communications mechanism from the device and relocate it at a more suitable external position that is conveniently accessible by a user. This can be achieved by connecting the externally located near field electronic circuits and/or the near field coil, to the device wirelessly or using wires. This allows the freedom to place the near field circuits and touch point at a location that is independent of the location of the device.

Remote Near Field Circuits—Data Over Wires

In the case where the near field communication circuits are remotely located from the device but connected to the device using wires, the data signals may be transmitted over many meters of wire. In this case the data may need to be amplified or conditioned to overcome line losses or noise on the lines.

The wire connections used could comprise of power, ground and signals. However, it would be more beneficial if only two wires were needed and more specifically, in the case of a light switch, to be able to utilize the two existing wires that connect the light switch to the light or light controller.

Multiplexed Power and Data

In the case of a two wire system, power and ground could be supplied to the remote near field circuits by these wires. Then to communicate data down these wires, the power and data could be time multiplexed. The remote near field circuits would have sufficient energy storage to ensure they could operate during the data communications time window. Then once the data communication is completed, the power could be restored to the near field circuits.

Data Over Power Line

Continuing with the two wire example, it is possible to supply power to the remote near field circuits using the wires, then utilize an AC signal modulation technique that couples data onto these DC supply wires. This AC data signal can then be recovered by a capacitively coupled receiver or the like. Power line communication (PLC) systems exist currently and could be used here.

Clearly other techniques are possible to supply data and power to circuits over wires, such as AM, PWM, etc. The point here is not the specific techniques utilized to create a communications data link between the device and the near field circuits, rather the important fact here is that the near field circuits are located remotely to the device they are associated with.

Remote Near Field Coil—Data Over Wires

An alternative option is to maintain the near field transmitter and receiver circuits within the device and remotely locate just the near field coil. Once again, in this case the signals on the wires may need to be transmitted over many meters of wire so may need to be amplified or conditioned to overcome line losses or noise on the lines.

Data Over Mains Carrying Wires

In the embodiment described here, the two wires are the same wires that connect the switch to the light and carry mains voltage potential, therefore eliminating the need to run additional wires in the wall cavity.

At 50 or 60 Hz a near field coil will be of very low impedance and cannot therefore be connected directly to these wires. By capacitive, inductive, transformer or otherwise coupling the coil to the wires or terminals of the switch, the coil will not adversely load the mains circuits.

The fixed device containing the near field circuits, wireless radio circuits and light switching circuits, is located remotely from the light switch at a location where the active, neutral and switch wires can be accessed.

The near field receiving circuits are connected to the switch wires and monitored for the presence of a near field communication signal. If the user places a suitably equipped mobile device such as a smart phone or smart remote, within close proximity of the near field coil at the light switch, then a near field signal will be presented on the coil which is then coupled to the switch wiring and subsequently detected by the near field receiving circuits located remotely in the fixed device.

Since the signals being induced into the coil from the mobile device are of very low power and the coil may be located at the end of many meters of wire, the near field receiving circuits of the fixed device may need additional amplification, signal filtering, or conditioning to ensure the near field signals can be received, demodulated and decoded, as noise on the wires may adversely affect the signal to noise ratio of the signals.

Upon receiving the near field signal by the fixed device, it may be necessary for the fixed device to transmit a reply back to the mobile device also using near field communication. Since there will be some signal loss over long wires and the mobile device will require a minimum signal level in order to operate, it may be necessary to amplify the near field transmission that is modulated onto the mains wiring to overcome the long wire losses or any noise present.

Due to governing regulations in each country, there may be limitations on the amount of signal power permitted to be modulated onto the mains wiring system. In this case, it is preferable for the circuits in the fixed device to disconnect the mains supply from the switch wires prior to modulating the wires with the near field transmission. This could be achieved with a relay or semiconductor switching device suitable for switching mains voltages and loads. Once the near field communication is complete, the mains supply can be switch back onto the switch wires allowing normal operation.

During the near field communication process, data can be exchanged such as security keys, PAN or LAN data, MAC addresses, channel ID, SSID etc. allowing a long range wireless link to be established between the mobile device and fixed device. Thus the mobile device can be used to control or monitor the fixed device by simply touching the mobile device to the conveniently placed remote coil.

Data Over Low Voltage Wires

In another embodiment the existing wires used between the light controller and the light switch are permanently disconnected from the mains wiring and re connected to low voltage input/output ports of the light controller. These wires can then communicate the near field data between the light controller and the near field coil located at the switch, eliminating the need to consider the presence of mains voltages or loads. The near field coil could be AC coupled across the switch contacts of the light switch, however, if the light switch is closed (or in the ON state), then these wires will appear as a DC short to the near field coil and the fixed device inputs, so a near field data transfer would not be possible. Thus necessitating that the light switch be open (or in the OFF state) for near field operation.

AC Impedance Determined Switch State

It is possible to determine the state of the light switch, being open or closed, by measuring the AC impedance of the lines. A high frequency signal can be placed on the line and the impedance of the line measured during this time. Opening or closing the light switch will change the impedance of the lines which can be measured by the light controller, thus determining the switch state. In this way a switch state change can be detected and the light state changed accordingly.

DC Level Determined Switch State

It is also possible to determine the switch state by adding a series resistance to the switch, applying a voltage source to the switch wires and comparing the voltage across the wires which will change depending on whether the switch is open or closed.

It is also possible to apply a voltage source to the switch wires and monitoring the current in the wires which will change depending on whether the switch is open or closed. A diode can be used to isolate the coil during this test.

To those skilled in the art, it will be clear that it is possible to use any number of ways to determine the state of the switch. The point being made here is that it is advantageous and possible to locate a near field coil remotely from the device and implement a coil and switch combination in order allow both near field data transfer and device switching in the same embodiment.

It is also possible for the light switch controller to have wired inputs from one or more light switches, or devices with a switching mechanism; and use wireless communication data from paired controllers, such as a mobile phone or keyfob, each with the ability to control and/or monitor the state of the light.

Eighth Aspect: Mobile Dongle Device.

A first multi-function device attachable to a second multi-function device one function of which is to supply to an attached device an audio signal, the first attachable multi-function device including:

an impedance matching circuit for substantially matching the source impedance of the audio signal received from the second multi-function device to a load impedance of the first multi-function device;

an audio signal voltage multiplier having the load impedance, the multiplier for voltage multiplying the impedance matched audio signal; and an audio signal converter for converting the alternating current of the impedance matched and multiplied audio signal to a direct current to supply the operation of one or more of the multiple functions of the first multi-function device.

In this aspect of the invention a wand device includes a dongle device added to a mobile device. A dongle device is a device that has electronic circuits and functionality that when added to a mobile device running software, such as an app or device drivers using the operating system of the mobile device, provides the functionality of a wand.

This can be achieved using an expansion port on a mobile phone, such as a USB port or audio port. In this way additional functionality can be added to a wand, such as a user interface, power supply, wireless communication mechanism, etc. Similarly the dongle device can add functionality not normally available on the mobile device, such as a proximity communication mechanism, a power transmitting mechanism, etc.

Specifically discussed in this embodiment is adding near field data communication capabilities to a mobile phone by plugging a dongle device into the audio port. Those skilled in the art will recognize that the principles described will apply generally to any device that is required to draw power from an audio port.

By running an app on the mobile phone, it is possible to use the voltage signals present on an audio port for data communication and to generate a power supply sufficient to supply electronic circuits.

Impedance Transformation

However, one of the implementation problems is that the source voltage of a mobile phone's audio port is too low in magnitude to be used directly and thus the audio port's impedance must be transformed to higher impedance resulting in a higher magnitude voltage which may then be rectified to power a microelectronic circuit. Typical voltages useful for operating microelectronic circuits are above 1V.

Prior attempts to match the audio port's output impedance to the desired load impedance have utilized untuned transformers resulting in non-optimum and ultimately lossy power transfer.

Impedance Matching

The impedance matching of the current invention uses a series capacitor, shunt inductor network which transforms the audio port's low impedance to higher impedance so that the available source power may be utilized at a voltage magnitude suitable for powering microelectronic circuits. The inductor used is physically smaller and typically less expensive than a transformer.

Matching the impedance of the audio output of the mobile phone to the device circuits ensures greater efficiency of power transfer, resulting in more power being available for use by the device. This aspect of the invention herein discloses techniques that achieve impedance matching and voltage multiplication without the use of a transformer.

Dual Channel Power and Data Transfer

One channel of a stereo audio port may be used to generate power for the circuits. The second channel may be used for both power generation and data signaling from phone to device. Data signaling using frequency modulation allows additional power to be generated while data is being sent from phone to device. The matching network of the dual-use channel may be optimized for a mid-band frequency of the frequency modulation so that maximum power may be generated during modulation for full-duplex data retransmission, or the network may be optimized at a band edge for half-duplex data retransmission where maximum power is generated once the frequency modulation has completed and the channel returns to a constant frequency.

This invention utilizes both the left and right audio channels of the phone to maximize the power available for the load, while simultaneously being able to transfer data across one or more of the audio channels. The benefit is that the power available from the audio socket is maximized.

Power Delivery Regulation

In a further aspect of the invention it is disclosed how the device can provide feedback to the phone to control the power delivery. Thus at times where the load is operating in a low power mode, the phone can reduce the amount of power delivered, saving battery life of the phone.

Energy Storage Capacity and Recharge

Using these techniques a wider range of devices can be powered from the audio jack since more power is available. In the cases where a load is too great to be powered from the audio jack alone, an energy storage mechanism, including battery, capacitor, super cap or the like, can be implemented in the device. In this case the invention described here reduces the capacity requirements of the energy storage mechanism and allows recharging to be achieved in a shorter time.

Wireless Charging

When recharge is required it can be achieved from either surplus power from the phone or the device can incorporate a wireless charging coil which can receive power from a wireless charging device.

Part of the described invention solves many implementation problems when building an electronic device that communicates through the audio connector of a mobile phone. Including reducing or eliminating the need for a battery in the device which decreases the size and cost of the device and allowing a device to utilize both audio channels and microphone line for digital and analog data communication, including half or full duplex operation, while still sourcing power from both audio lines if required.

Adding a Near Field Communication Device

Maximum power transfer to the device from the phone is essential in a system that utilizes near field communication data as the transmit power is high compared to that available through an audio port of a mobile device. Therefore the techniques described herein are particularly advantageous for the addition of a near field device to the mobile.

This aspect of the invention is described in more detail below.

The invention consists of an impedance matching network to match the impedance of the output amplifier driving the audio channel and the load of the device.

The signal from the audio channel is then fed into a voltage multiplier circuit. The voltage multiplier is typically in the form of a doubler or trippler.

The impedance matching network and voltage multiplier is applied to both the left and right audio channels. The resulting amplified left and right signals are then summed prior to a regulator circuit. The regulator provides a supply suitable to run a microprocessor or logic circuits.

Using both audio channels delivers greater power to drive larger load devices than would be possible with a single channel only.

However, it is often still necessary to transmit data across the audio channels to be decoded by the microprocessor or other logic in the device.

Setting the audio volume on the audio player to maximum will produce the maximum signal amplitude and therefore the maximum generated power possible for the load. As a result, it is not beneficial to use Amplitude Modulation (AM) or Amplitude Shift Keying (ASK) to modulate the signal as a lower average power will be generated.

The techniques of Frequency Shift Keying (FSK) or Frequency Modulation (FM) allow the frequency of the signal to be modulated while maintaining the maximum amplitude and are the techniques of choice in this embodiment.

Device Informs Phone to Reduce Power.

At times where the device operates in low power or idle mode, it is possible to communicate this to the phone, which can adjust the frequency of the audio signals to reduce the amount of power delivered to the device load. The benefit of this is that surplus energy is not wasted in the device, often as heat in the regulator circuits, causing unnecessary drain on the phone's battery.

Additionally, many types of audio players and phones exist and therefore it is expected that a wide variety of audio driver circuits will be used also, including 4 or 8 ohms with some line out impedances being up to 1 k ohms. This range makes it difficult to predict the impedance output of the audio amplifier in the audio player to which the device is attached.

Impedance Adjustment and Matching

It would therefore be beneficial to measure the output impedance of the audio circuit and adjust the impedance matching circuit to suit. The impedance measurement circuits could operate when the device is in a minimum function, default mode. This mode may be entered into as the default power up state or when the device comes out of reset. Once the impedance matching is complete, higher power subsections of the device circuits can be enabled if it is determined enough power is available. In this way, even in the case of worst case impedance mismatch, a mode of default operation can be achieved.

Another method of achieving maximum power transfer involves an indirect method of matching, rather than direct impedance measurement. By monitoring the voltage from the output of the rectifier or regulator, the impedance matching circuit can be altered over a scanned range and the point of maximum voltage determined and used for normal operating mode.

It could then be determined how much power is available from the audio player and the device can enable the appropriate circuits or different modes or operation to suit. If insufficient power is available for full device functionality, the device could communicate an alert or status report to the phone and appropriate action taken.

An example of one possible action in this case, might be to configure the device to operate in a half-duplex communication mode, allowing just the receiver or the transmitter circuits to be powered at one time, as opposed to a full duplex mode where both transmitter and receiver circuits are simultaneously powered.

This reduced mode of operation, although not an optimum state, may still be beneficial to the user rather than have the device fail to operate at all.

Doubler and Trippler Circuits

Additionally, certain circuits might have a minimum operating voltage that cannot be achieved even if impedance matching techniques have been used. In this case, it might be possible for the low power circuits to switch in an additional voltage multiplication stage. For example this could be achieved by changing a doubler circuit into a trippler circuit.

An example of how this might be achieved is that the low voltage logic circuits could peak detect an audio tone and compare the magnitude to a reference. If the reference level is not achieved, a trippler circuit could be enabled, allowing a higher voltage system such as a microprocessor to be operated. Conversely, the trippler may be part of the default mode which allows the high voltage circuits to operate, but is disabled or converted back to a doubler circuit to accommodate some higher current/low voltage circuits, or to reduce the power consumption of the device. Doubler circuits are typically less electrically noisy than tripplers, so switching to a doubler may also benefit circuits that are noise sensitive. This system forms the basis of an automatic gain control (AGC) mechanism that maximizes the voltage or power available for the device circuits.

Supplementary Energy Sources

In the case where these techniques still fall short of being able to supply the full power requirements of the device, a battery, capacitor or super cap, or some other form of energy storage element can be used. An additional energy source can also be achieved by utilizing a solar collection mechanism such as a solar cell, or built in generator such as a motion based generator. In these cases, the built in energy storage element will benefit from faster recharging utilizing the techniques described so far.

It may also be the case where the normal operation of the device allows for little spare capacity to charge the internal storage device. In this case it might be beneficial to have a wireless charging system built into the device. When not in use, the device can be removed from the phone and placed on a wireless charger.

There may also exist a need for the device plugged into the phone audio jack to communicate wirelessly to a remote device, particularly if the remote device is not equipped with Wi-Fi or Bluetooth, the standard wireless systems found in a mobile phone. With approximately 15 mW of power available at many mobile phone audio jacks, it limits the options available for wireless communication. Only the lowest power wireless communication systems will be possible using this power source.

Ultra-low Power Near Field Ping (NFP)

It is therefore beneficial to implement an ultra-low power method of wireless communication such as the carrierless near field communication system, NFP. This system utilizes energy pulses, or pings, rather than a modulated carrier. In a system that pings, there is lower average power consumption since no energy is needed to sustain a carrier. Instead, energy is only required to generate the ping pulses.

It should be appreciated that the present invention can be implemented in numerous ways, including as a process, an apparatus, a system, or a computer readable medium such as a computer readable storage medium or a computer network wherein program instructions are sent over wireless, optical, or electronic communication links. It should be noted that the order of the steps of disclosed processes may be altered within the scope of the invention.

Details concerning computers, computer networking, software programming, telecommunications and the like may at times not be specifically illustrated as such were not considered necessary to obtain a complete understanding nor to limit a person skilled in the art in performing the invention, are considered present nevertheless as such are considered to be within the skills of persons of ordinary skill in the art.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications, and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any background or prior art in this specification is not, and should not be taken as, an acknowledgment or any form of suggestion that such background or prior art forms part of the common general knowledge.

Specific embodiments of the invention will now be described in some further detail with reference to and as illustrated in the accompanying figures. These embodiments are illustrative, and not meant to be restrictive of the scope of the invention. Suggestions and descriptions of other embodiments may be included within the scope of the invention but they may not be illustrated in the accompanying figures or alternatively features of the invention may be shown in the figures but not described in the specification.

"Logic," as used here in, includes but is not limited to hardware, firmware, software, and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programs are logic device. Logic may also be fully embodied as software.

"Software," as used here in, includes but is not limited to 1 or more computer readable and/or executable instructions that cause a computer or other electronic device to perform functions, actions, and/or behave in a desired manner. The instructions may be embodied in various forms such as routines, algorithms, modules, or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skilled in the art that the form of software is dependent on, for example, requirements of a desired application, the environment it runs on, and/or the desires of a designer/programmer or the like.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

It will be appreciated by those skilled in the art that the invention is not restricted in its use to the particular application described. Neither is the present invention restricted in its preferred embodiment with regard to the particular elements and/or features described or depicted herein. It will be appreciated that various modifications can be made without departing from the principles of the invention. Therefore, the invention should be understood to include all such modifications within its scope.

BRIEF DESCRIPTION OF THE FIGURES

FIG. 4 illustrates a dongle device capable of being attached to a mobile device;

FIG. 7 illustrates a generator arrangement;

FIG. 10 illustrates an arrangement of multiple PLC gateways and a wand device;

FIG. 13A illustrates a device with integrated near field data communication mechanism;

FIG. 13B illustrates a device with a remotely located near field data communication mechanism;

FIG. 15 illustrates a block diagram of a wireless light controller with remote near field coil;

FIG. 20 illustrates various methods for impedance matching the phone to the dongle device;

FIG. 22 illustrates user selectable devices in a gateway arrangement;

DETAILED DESCRIPTION OF THE INVENTION

Figure 1:
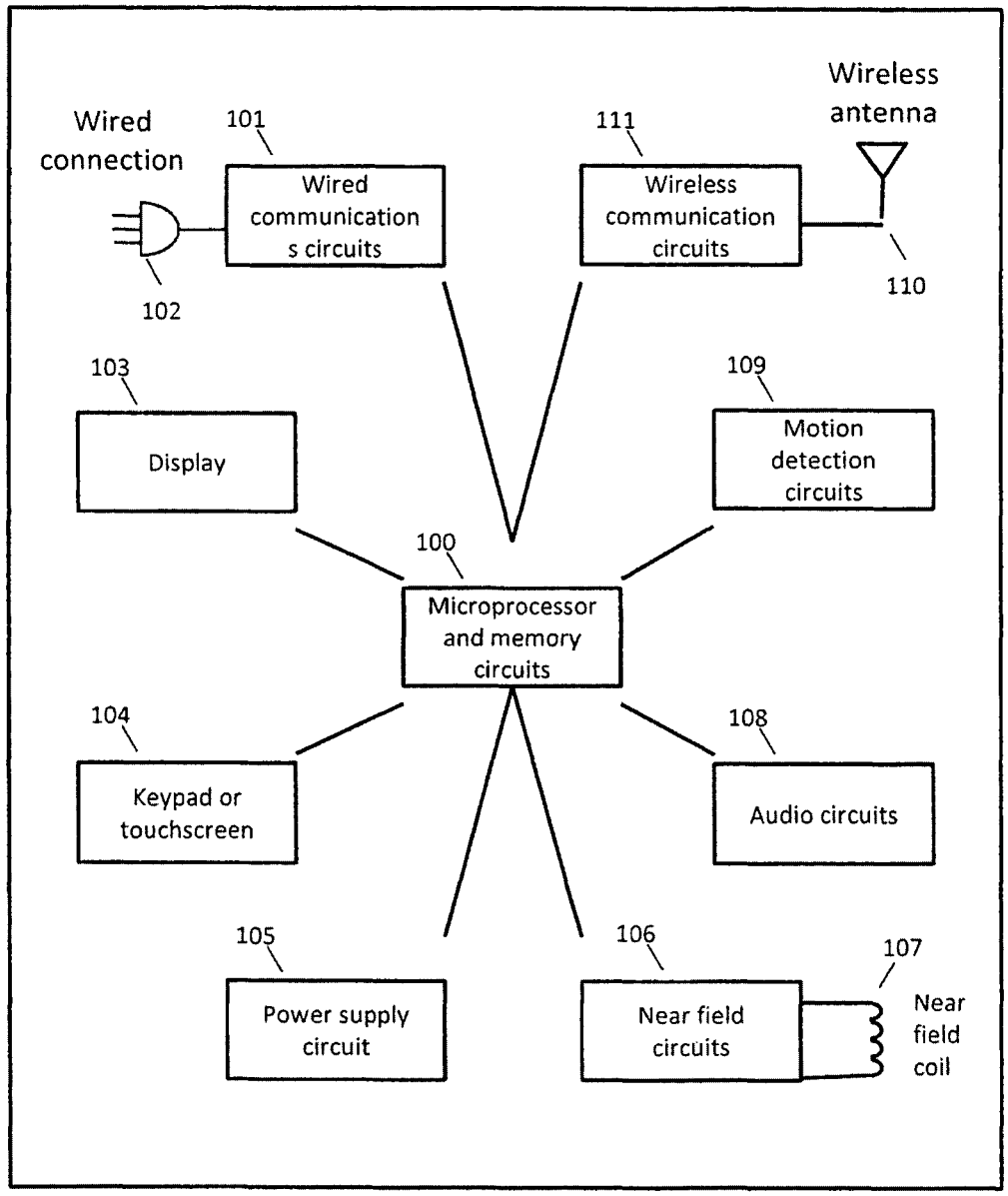
FIG. 1 illustrates a block diagram of a device representative of a 1st, 2nd or 3rd device.

FIG. 1 Illustrates a Block Diagram of a Device.

A device can be a controller, an appliance or a wand. A device can be fixed or mobile and can represent one or more first, second or third devices.

A device is a collection of electronic circuits and can comprise of microprocessor and memory circuits 100.

The device can also include wired communication circuits 101 with the ability to connect to a data conductor using wired connection 102. Examples of a wired connection could be 110V or 240V mains power, an RS485 serial, USB, one wire, or the like, either hard wired or via a connector.

The device can also include a user interface display 103, user interface keypad or touchscreen 104, power supply circuits 105 which might be sourced from low voltage DC circuits, mains voltage supply, battery circuits, super cap, wireless charge circuits, or the like.

The device can also include near field circuits 106 with near field coil 107 for power or data transfer when in close proximity to another device such that the distance between devices is close enough to be suitable for near field power or data to be transferred between the devices.

The device can also include audio circuits 108 which can be used to communicate to the user or to provide the ability to attach external devices via an audio or headset connector. Additionally microphone inputs can be used for voice recognition and voice commands.

The device can also include motion detect circuits 109, which can include accelerometers, gyroscopic sensors, or the like, to determine the movement of the wand. These can be used to interpret user gestures which can then be used as commands to the wand or other devices.

The device can also include wireless communication circuits 111 allowing the device to communicate wireless data to other devices using wireless antenna 110. Examples of wireless communication circuits are 802.15.4, 802.11 (Wi-Fi), infrared, carrierless pulse, etc.

Figure 2:
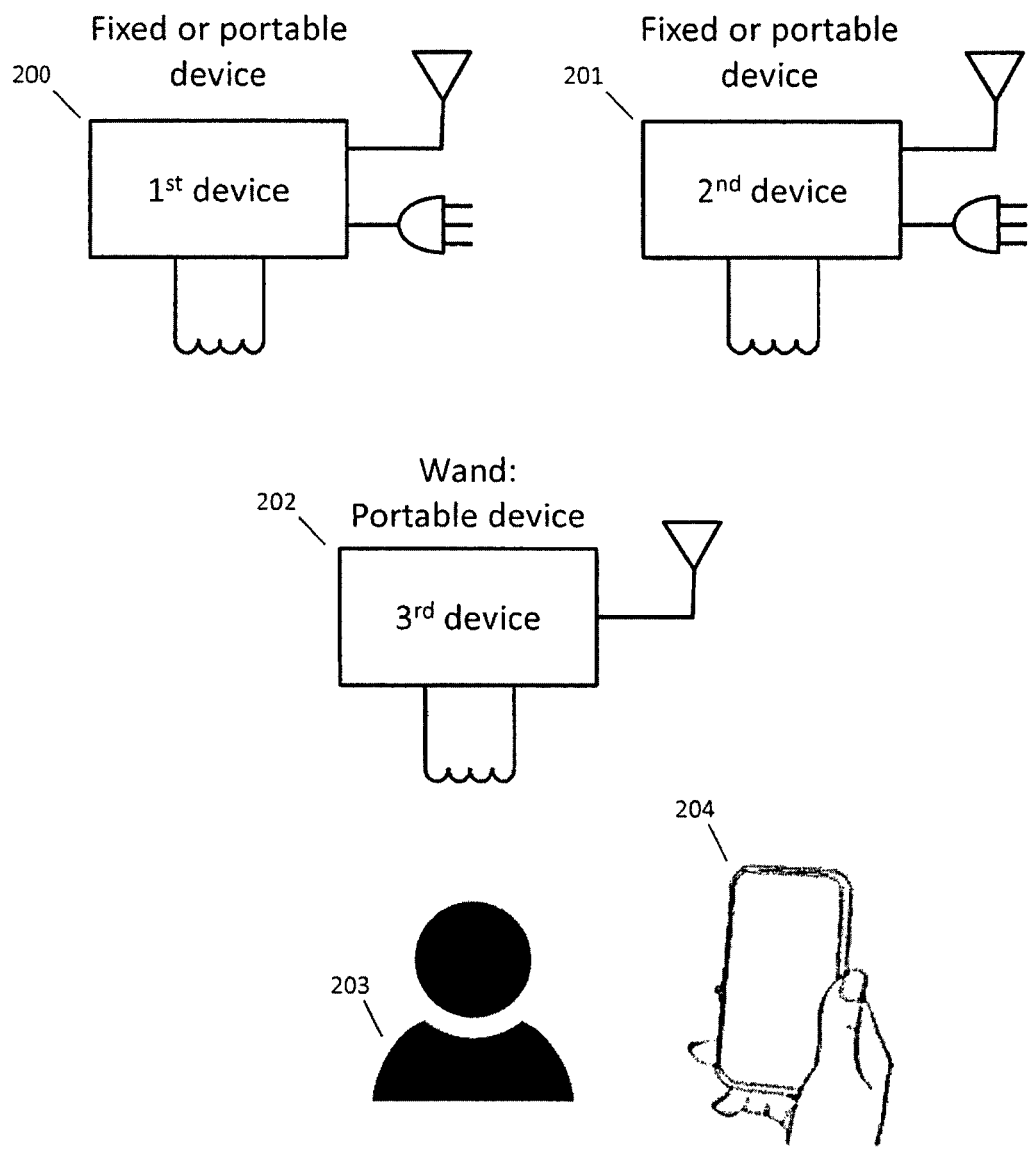
FIG. 2 illustrates an arrangement including a 1st, 2nd and 3rd device.

FIG. 2 Illustrates an Arrangement including a 1st, 2nd and 3rd Device.

The arrangement shows a number of devices where the first device 200 and the second device 201 can be fixed or portable. That is, they can be situated or wired into a fixed or semi fixed location, such as a PC or printer or the like. Although it is not a requirement for this invention that these devices are necessarily fixed in location. Also for simplicity purposes, just two devices (a first and second device) have been shown, but it must be understood that any number of devices could be represented in this arrangement.

The third device 202 is called a wand device and is typically portable device, in that a user 203 can transport the device to the locations of the first and second devices. A typical example of a wand would be a mobile phone 204.

Figure 3A:
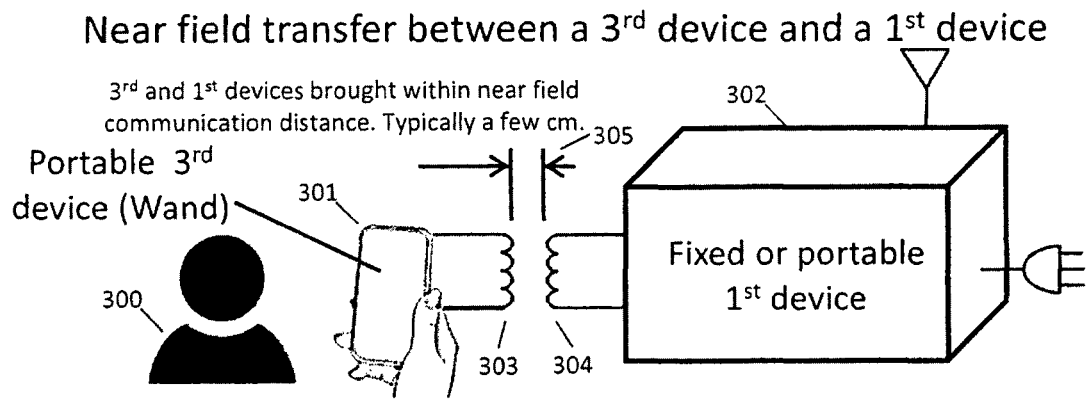
FIG. 3A illustrates a near field transfer between a 3rd device and a 1st device.
Figure 3B:
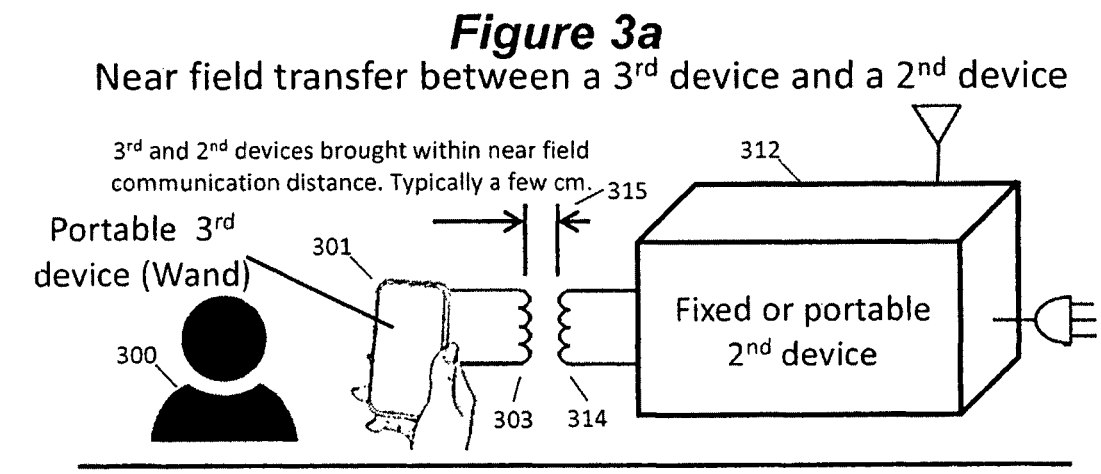
FIG. 3B illustrates a near field transfer between a 3rd device and a 2nd device.
Figure 3C:
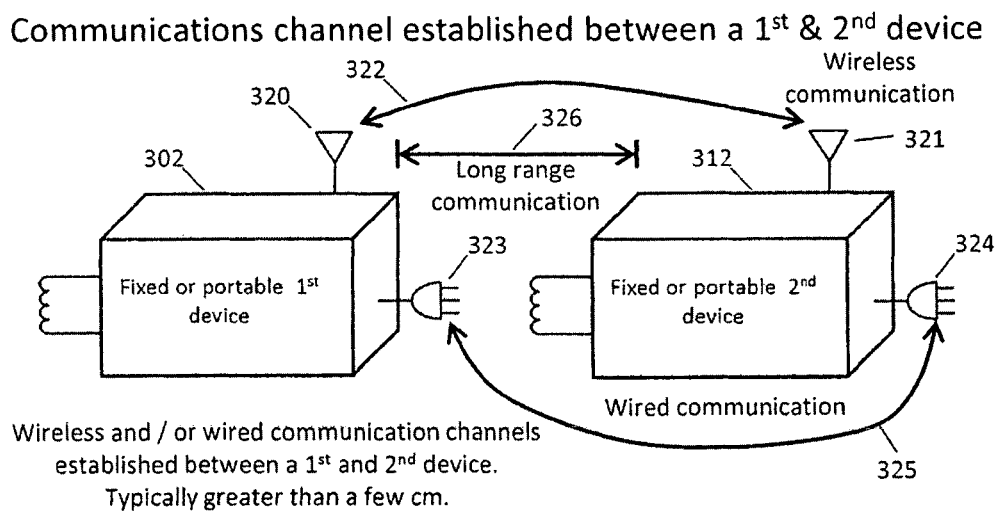
FIG. 3C illustrates one or more communication channels established between a 1st and 2nd device.

FIGS. 3A, 3B and 3C illustrate the process of a user using a wand to establish communications between devices.

FIG. 3A Illustrates a Near Field Transfer between a Third Device and a First Device.

A user 300 brings a portable third device 301, called a wand, equipped with a near field communication mechanism 303 into close proximity with a first device 302 equipped with a near field communication mechanism 304, such that both near field communication mechanisms, 303 and 304 are within a distance 305 to allow for near field communication between devices. This could be for the purpose of transferring power, data or both between devices.

The near field communication range is typically a very short range, operating over a few centimeters or sub meter, since they typically transmit very low power and predominantly operate in the magnetic near field range of the frequency concerned.

FIG. 3B Illustrates a Near Field Transfer between a Third Device and a Second Device.

A user 300 brings a portable third device 301, equipped with a near field communication mechanism 303 into close proximity with a second device 312 equipped with a near field communication mechanism 314, such that both near field communication mechanisms, 303 and 314 are within a distance 315 to allow for near field communication between devices. This could be for the purpose of transferring power, data or both between devices.

FIG. 3C Illustrates Communications Channels Established between a First and Second Device.

During the near field communication events illustrated in FIGS. 3A and 3B, data has been transferred using the near field communication mechanism such as to enable the first device 302 and the second device 312 to establish one or more communication links.

Data such as device identification data, Pan and Mac addresses, security keys, channel number, etc. can be transferred and processed by the devices to pair the devices and establish a wireless communication link 322 using antenna 320 of the first device 302 and antenna 321 of the second device 312. Alternatively or additionally, data can be transferred to establish a wired communication link 325 using wired connection 323 of the first device 302 and wired connection 324 of the second device 312.

Once the communication mechanisms 322 and/or 325 have been established, the first device 302 and the second device 312 can communicate over a long distance 326. The distance of the wired communication is determined by the technology use, line losses, voltages, etc. The long range wireless communication link typically transmit higher power level signals compared to near field transmission powers and propagate in the longer range electromagnetic or planar wave mode, resulting in distance of many meters or kilometers.

FIG. 4 Illustrates a Dongle Device Capable of Being Attached to a Mobile Device.

Mobile device 301 is equipped with a USB connector 400 and audio socket 401. A dongle device is equipped with a compatible USB connector 402 and near field communication mechanism 403. Alternatively a dongle device can be equipped with a compatible audio connector or headset connector 404 and near field communication mechanism 405.

Plugging dongle device 402 or 404, into mobile device 301, creates a single unified mobile unit. With the mobile device executing appropriate software, the resulting arrangement can provide the wand functionality. Typically software on the mobile device, either native to the operating system or as an app, would contain device drivers and provide appropriate user interfaces to the user to affect operation of the third device.

Some mobile phones are already equipped with near field communications so, with an appropriate app can provide the wand functionality without the need for adding an external dongle device.

The device equipped with an audio plug 404 can be inserted into audio socket 401 during normal operation. The audio plug is of the (tip, ring, sleeve) TRS type typically used for analogue signals including audio. This type of plug is also called an audio jack, phone jack, phone plug, and jack plug. The audio jack as it is termed herein is available in different lengths and diameters and each size of audio jack will only suit a compatible audio socket which accommodates the length and diameter dimensions. There are other types of audio jack, some with only a tip and sleeve arrangement for connecting for example, left and right audio signals as are also four- and five-conductor versions where the additional connector is used for video and the other for power.

Mobile phones may have a TRRS (tip, first ring, second ring, sleeve) connection arrangement to allow for headphones/hands-free kits. Two forms are available where left audio is on the tip; right audio is on the first ring; and then different manufacturer's use the second ring and sleeve differently, such as the microphone on the sleeve and the return signal on the second ring and vice versa.

Plug 405 represents the arrangement used for an iPhone audio headset plug.

Figure 5:
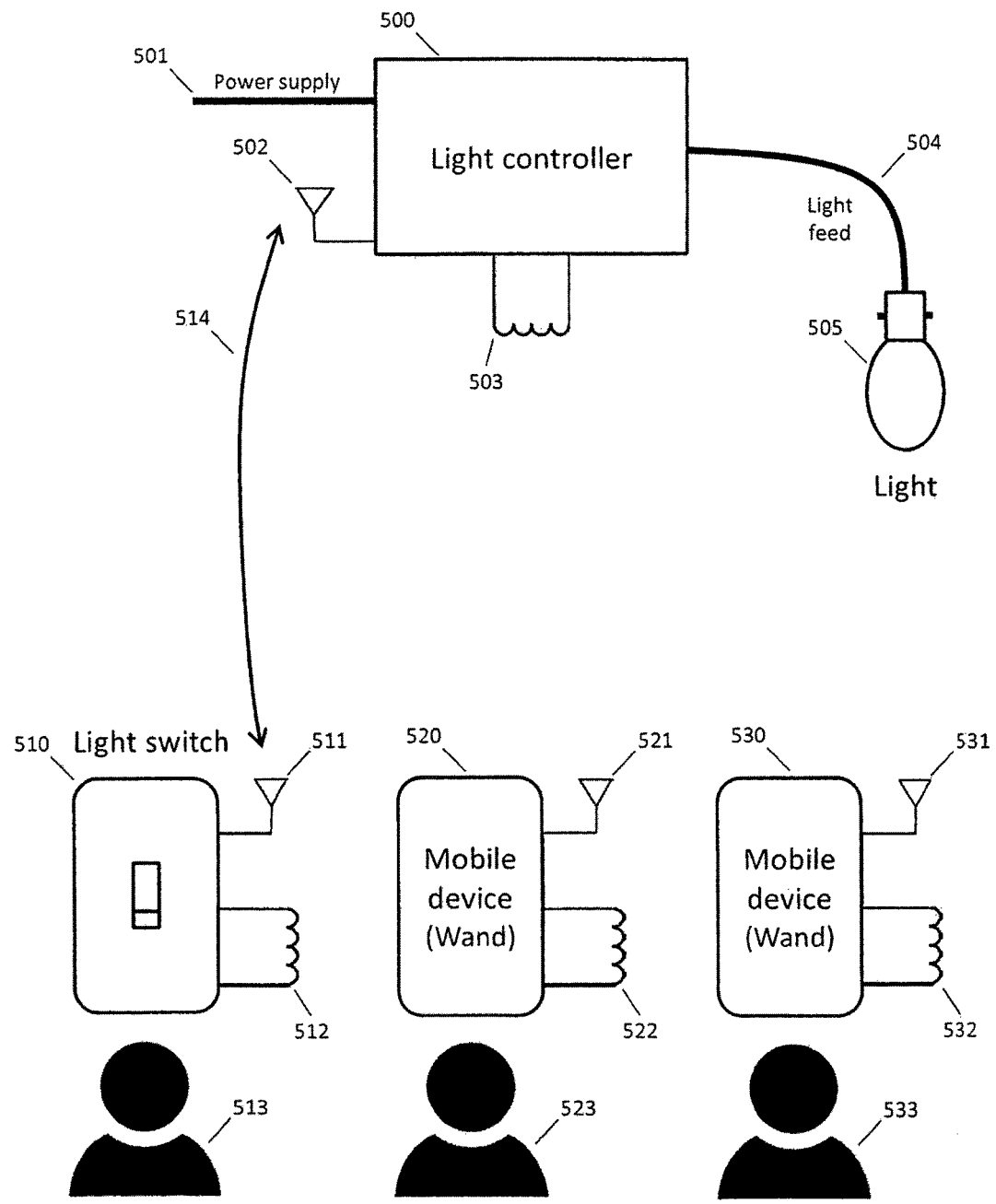
FIG. 5 illustrates a light switch and light controller arrangement.

FIG. 5 Illustrates a Light Switch and Light Ccontroller Arrangement.

Light controller 500 is wired to a power supply 501, typically AC mains at 110V to 240V and to a light 505 using light feed 504. The light controller is equipped with a near field communication mechanism 503 and wireless communication mechanism 502. The light switch 510 is equipped with a near field communication mechanism 512 and a wireless communication mechanism 511.

A user 523 has access to a mobile device 520 acting as a wand in this arrangement, which is equipped with a near field communication mechanism 522. The user brings the mobile device 520 within close proximity to the light switch 510 such that data can be transferred over the near field communication mechanisms 512 and 522. The user then brings mobile device 520 within close proximity to the light controller 500 such that data can transfer over the near field communication mechanisms 522 and 503. The data transferred over the near field communication mechanisms is sufficient to establish a wireless link 514 between the light switch 510 and the light controller 500.

When the user 513 changes the state of the light switch 510, data is communicated over the wireless link 514 to the light controller 500 which causes the light 505 to turned on or off or be otherwise controlled accordingly.

Additionally, it is also possible that if mobile wand device 520 is also equipped with a wireless communication mechanism 521, then the data transferred over the near field communication mechanisms is sufficient to allow mobile device 520 to also access the wireless link 514. Thus providing the user 523 the ability to control the light wirelessly by communicating wireless data to either the light switch wireless mechanism 511 or the light controller wireless mechanism 502 using wireless mechanism 521.

It is then possible that another user 533 can also control the light 505 by bringing mobile device 530, which is similarly equipped with near field proximity mechanism 532 and wireless communication mechanism 531, to within close proximity to the light switch 510, or light controller 500, such that data is communicated over the respective near field proximity mechanisms establishing a wireless link. The wireless link 514 can be a PAN, LAN or similar wireless connection supporting multiple device connections.

Figure 6:
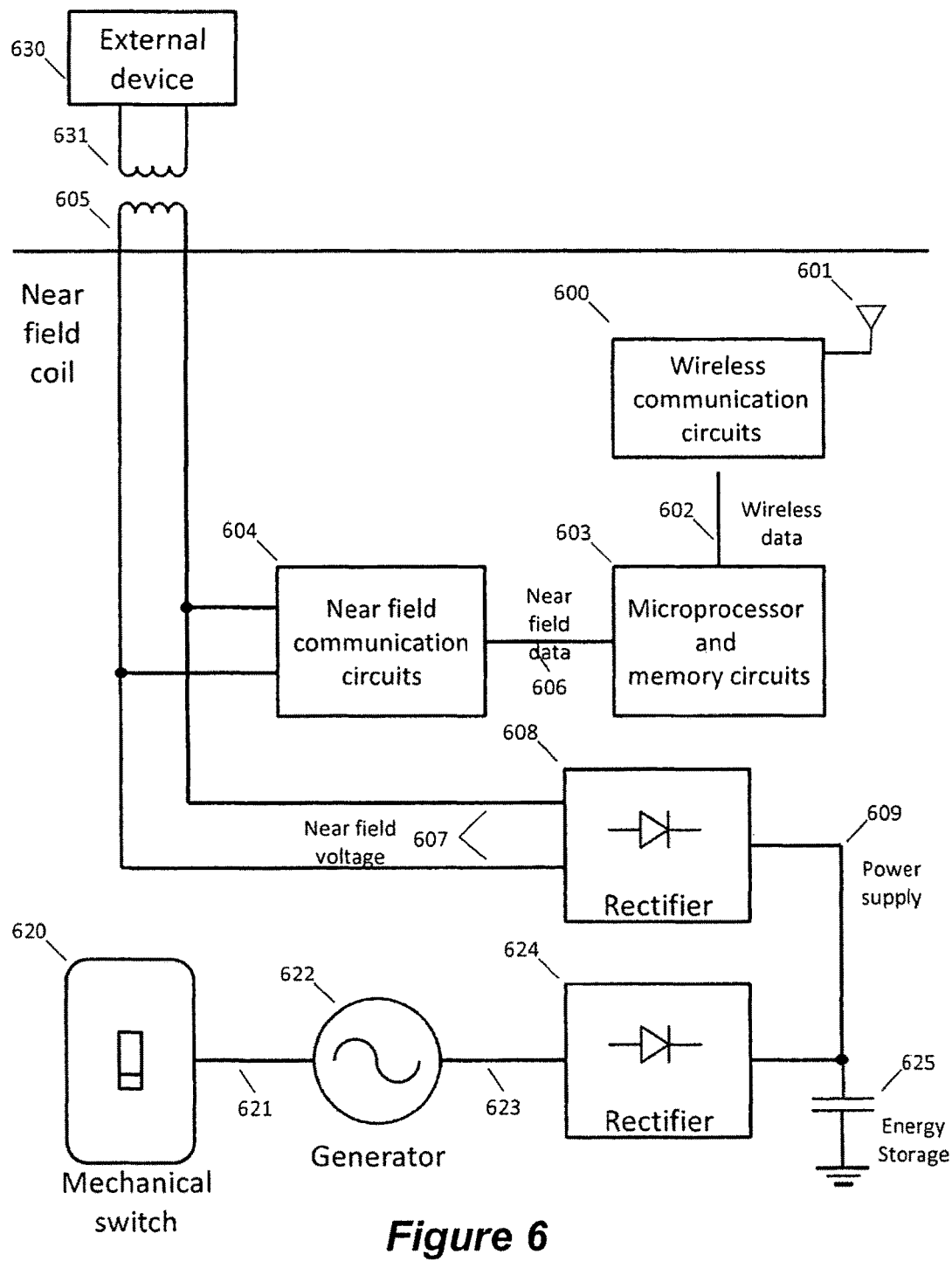
FIG. 6 illustrates a block diagram of a battery-less light switch in close proximity to an external device.

FIG. 6 Illustrates a Block Diagram of a Battery-Less Light Switch in close proximity to an External Device.

Microprocessor and memory circuits 603 process near field data 606 from near field communication circuits 604 when a suitably equipped device 630 equipped with a near field proximity mechanism 631, is placed within close proximity to near field coil 605, Microprocessor and memory circuits process wireless data 602 from wireless communication circuits 600 when wirelessly paired with a suitably equipped device to communicate data using wireless antenna 601.

When the near field communication mechanism 631 of a an external device 630 is placed within close proximity of near field coil 605 such that a resonant circuit forms between the near field mechanism 631 and near field coil 605 power can be transferred. The near field communication mechanism 631 must be suitable for generating a carrier, tones or pulses sufficient to form a power transmission mechanism to be received by a power receiving mechanism incorporating near field coil 605 of the light switch.

The then induced near field voltage 607 is rectified by rectifier 608 and the resulting DC power supply 609 is stored in energy storage element 625. This can be a battery, capacitor, super cap, or the like, or a combination of circuits and energy storing elements to form an energy storage mechanism. The stored energy in this power supply 609 is sufficient to power the microprocessor and memory circuits 603 and the near field communication circuits 604 such that near field data 606 can be transferred between the external device 630 and near field communication circuits 604.

Several methods can be used to facilitate both power transfer and data transfer with only the stored energy in storage device 625.

The external device can generate a carrier wave for a period of time sufficient to charge power supply 609 then stop the carrier and transfer near field data. If the data stream is sort it can be transferred in a single packet, completing the process.

However, if the data stream is long there might be insufficient energy stored to facilitate the data to be sent in a single transfer. Thus it might be necessary to send part of the data and then initiate power transfer again to recharge the power supply. This cycle could be continued until all the data is transferred. In other words, the power generation and data transfer are interleaved and time multiplexed.

Alternatively, a method of load modulating the carrier used for the power transfer can be used allowing data to be simultaneously communicated during the power transfer process. If load modulation techniques are employed some initial power transfer will be needed to enable sufficient energy to be transferred and stored before the microprocessor circuits can power up and are able to load modulate the carrier with the data.

Additionally a mechanical switch mechanism 620 is coupled to a generator 622 via coupling 621 such that the mechanical movement of the switch mechanism results in a generated voltage supply 623 which can be rectified with rectifier 624 and stored by energy storage element 625.

The stored energy in this power supply 609 is sufficient to power the microprocessor and memory circuits 603 and the wireless communication circuits 600 such that wireless data 602 can be transferred to a paired external device such as a wireless light controller.

FIG. 7 Illustrates a Generator Arrangement.

The mechanical switch mechanism can utilize any number of commercially available mechanically based energy harvesting systems where the movement of the switch causes a mechanism to generate a voltage.

Alternatively a voltage generator could be custom made to suit the form factor of the switch arrangement. FIG. 7 shows a light switch mechanical actuator 700 which may be a toggle or rotating knob mechanism that the user operates to turn a light on or off. This mechanism is connected to a rotating element 701 which could be a shaft that is attached to a mounting assembly 702 which could be a disk or similar mechanism to mount permanent magnets 703. Pickup coils 704 are mounted such that the rotation of the shaft causes the motion of the magnets 703 to induce an electrical voltage 705 which can then be rectified and stored.

Alternatively a printed circuit board 722 could be mounted to the rotating element 701. The printed circuit board could implement pickup coils 724 as printed tracks. The rotation of the printed circuit board ensures that the coils pass magnets 723 which cause an induced voltage source 725. This voltage can be transferred to rectifier and storage circuits using slip rings or the like.

Figure 8:
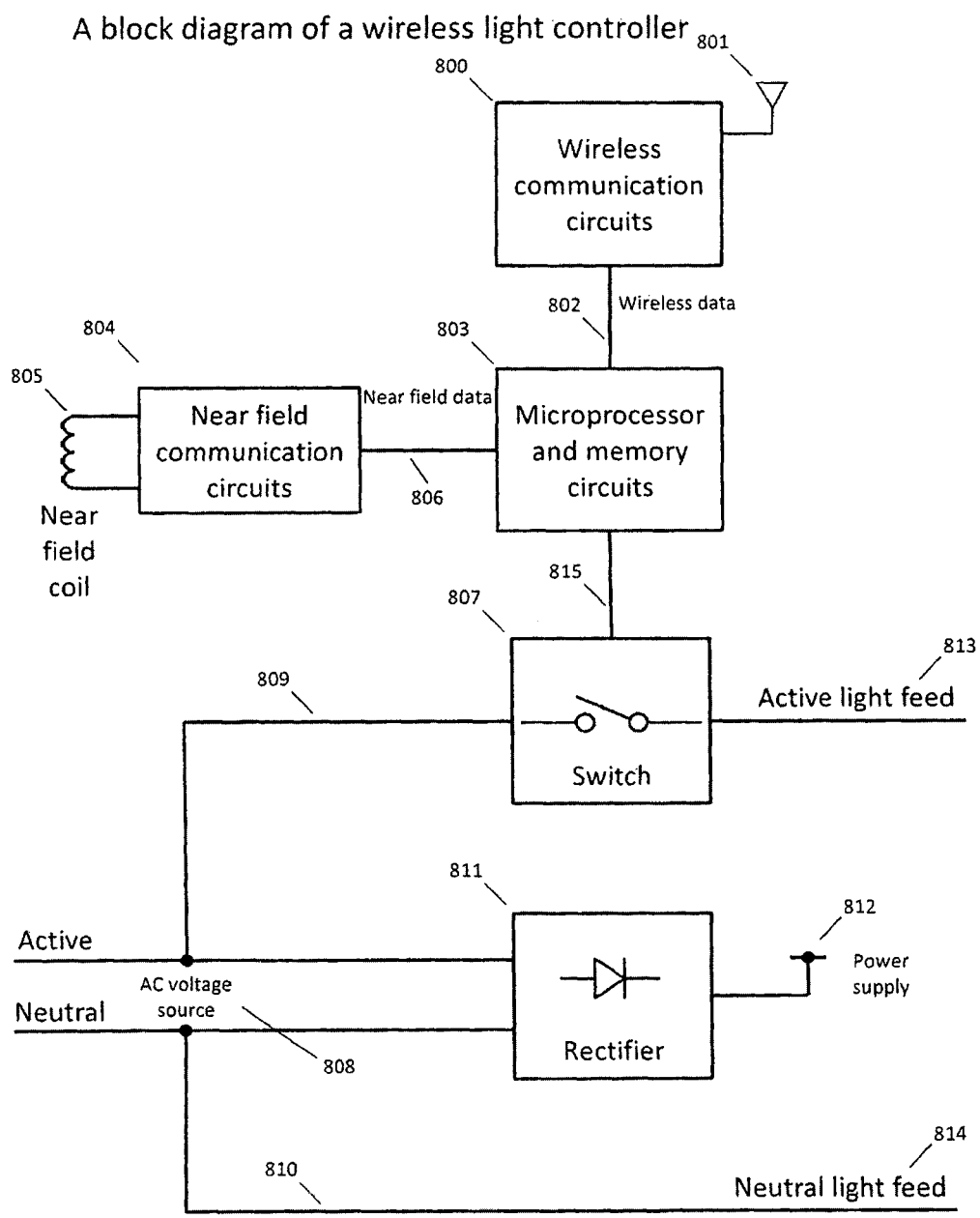
FIG. 8 illustrates a block diagram of a wireless light controller.

FIG. 8 Illustrates a Block Diagram of a Wireless Light Controller.

Microprocessor and memory circuits 803 process near field data 806 from near field communication circuits 804 when a suitably equipped external device is placed within close proximity to near field coil 805.

Microprocessor and memory circuits process wireless data 802 from wireless communication circuits 800 when wirelessly paired with a suitably equipped device to communicate data using wireless antenna 801.

The wireless light controller is supplied with an AC voltage source 808 consisting of active wire 809 and neutral wire 810 which are rectified and conditioned using rectifier 811 to produce a power supply 812 suitable for supplying the electronic circuits in the controller, including the microprocessor and memory circuits, the wireless communication circuits and the near field communication circuits.

The neutral wire is used to supply the neutral light feed 814 which is wired to an external light element. The active light feed 813 is also wired to an external light element and is switched or controlled by switch 807 which is controlled by data or control lines 815 from the microprocessor circuits 803. The switch 807 could include circuits to produce a suitable supply for low voltage lights such as DC or LED lights. In addition to on and off switching, it could include circuits for light dimming.

Figure 9:
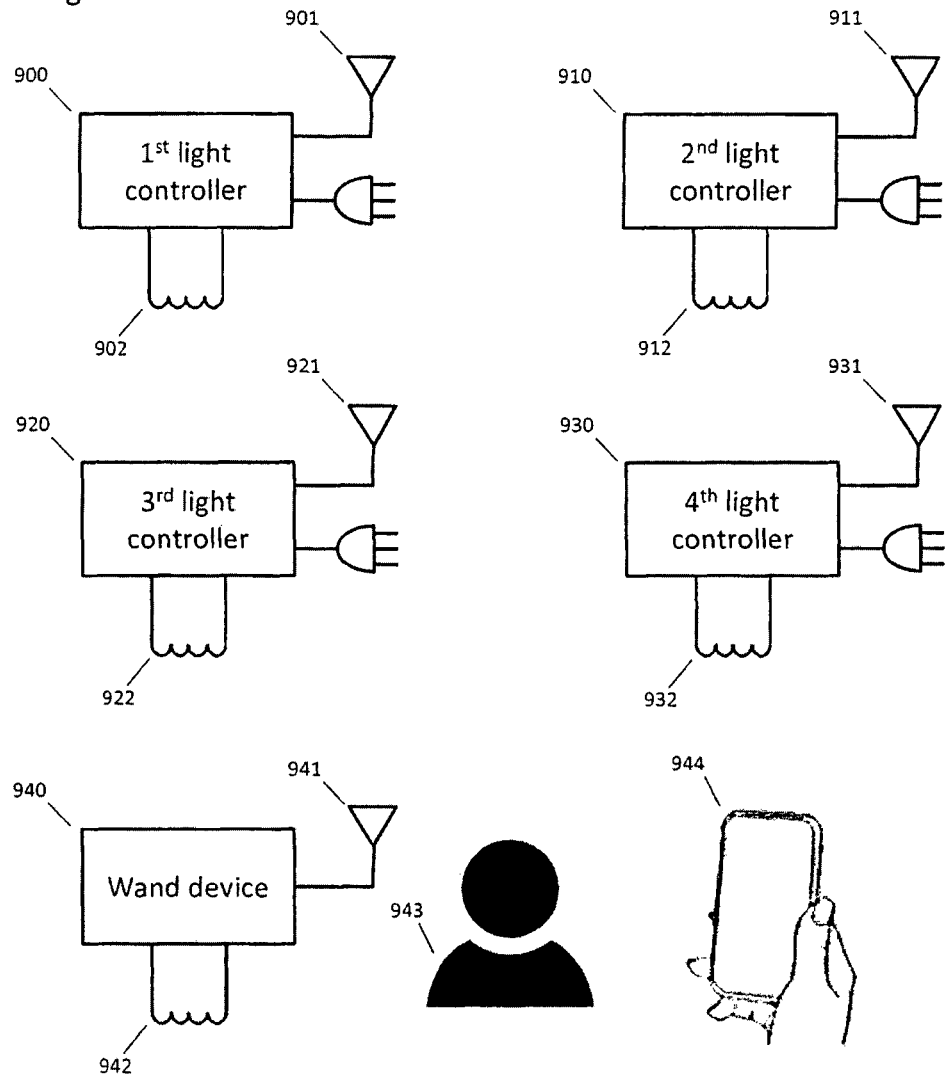
FIG. 9 illustrates an arrangement of multiple devices connected to a wireless network using a wand.

FIG. 9 Illustrates an Arrangement of Multiple Devices Connected to a Wireless Network Using a Wand.

A user 943 has access to a wand device 940 which is equipped with a near field communication mechanism 942 and wireless communication mechanism 941. The wand is a mobile device and could be a suitably equipped smartphone 944.

The arrangement consists of four light controllers 900, 910, 920 and 930. Each is equipped with a near field communication mechanism, 902, 912, 922 and 932 respectively. Each is also equipped with a wireless communication mechanism 901, 911, 921 and 931 respectively.

The user brings the wand device 940 into close proximity to the near field communication mechanism 902 of the first light controller 900 such that data is exchanged between communication mechanism 902 and 942 sufficient to establish wireless pairing. At this stage two options exist.
1. The wand 940 can pair with the light controller 900 establishing a wireless communication link using wireless communication mechanisms 901 and 941. With such a pairing in place, the wand can become a controller to the light controller.
2. The wand 940 can store the data in its memory without actually pairing with the light controller.

This decision may be decided by the user through a user interface prompt, or it could be a fixed function of the wand design. For example if the wand was not equipped with wireless communication mechanism 941, wireless pairing would not be possible. In this case the wand may be a simple low cost memory stick where the pairing parameters are held in memory for use when tapped to other devices.

The user then proceeds to repeat this process with the second, third and fourth light controllers after which all devices are paired and become part of a wireless network, such as a PAN or LAN. The user can terminate the process after tapping the fourth device. This could be a simply button press or in response to a prompt on a user interface. At this point, as discussed above, the wand may also be part of this wireless network, where it could act as a controller to all the lights individually or as a collective group. Alternatively, once the pairing process is complete, the wand could have no further participation with the arrangement.

FIG. 10 Illustrates an Arrangement of Multiple PLC Equipped Devices and a Wand Device.

The arrangement consists of two Power Line Communication (PLC) equipped devices that can communicate data over mains power wiring 1021 which is typically 110V or 240V at 50 Hz or 60 Hz.

The first PLC device 1000 is equipped with a near field communications mechanism 1002, a wireless communications mechanism 1001 and a mains power plug 1003 that plugs into mains socket 1020.

The second PLC device 1010 is equipped with a near field communications mechanism 1012, a wireless communications mechanism 1011 and a mains power plug 1013 that plugs into mains socket 1022.

A user 1033 has available a wand device 1030 which could be a smartphone 1034 which is suitably equipped with a near field communication mechanism 1032 and a wireless communication mechanism 1031.

The user brings the wand device 1030 into close proximity to the near field communication mechanism 1002 of the first PLC device 1000 such that data is exchanged between communication mechanism 1002 and 1012 sufficient to establish wireless pairing. At this stage two options exist.
1. The wand 1030 can pair with the PLC device 1000 establishing a wireless communication link using wireless communication mechanisms 1001 and 1031. With such a pairing in place, the wand can then stream data to the PLC device which can be transferred to the mains wiring 1021.
2. The wand 1030 can store the data in its memory without actually pairing with the PLC device.

This decision may be decided by the user through a user interface prompt, or it could be a fixed function of the wand design. For example if the wand was not equipped with wireless communication mechanism 1030, wireless pairing would not be possible. In this case the wand may be a simple low cost memory stick where the pairing parameters are held in memory for use when tapped to other devices.

Additionally, Ethernet network data and other device identification data is transferred between the PLC device 1000 and wand 1030 during the near field data exchange. This data is stored in the memory of the wand.

The user then proceeds to repeat this process with the second PLC device 1010 after which sufficient data has been exchanged to identify the Ethernet addressed and PLC gateway identities as to allow the first and second PLC devices to communicate over the mains wiring. This would then allow wireless data received by wireless communication mechanism 1001 of the first PLC device 1000 to be transferred onto the mains wiring 1021 which will be received by the second PLC device 1010 to be transmitted using wireless communication mechanism 1011.

Figure 11:
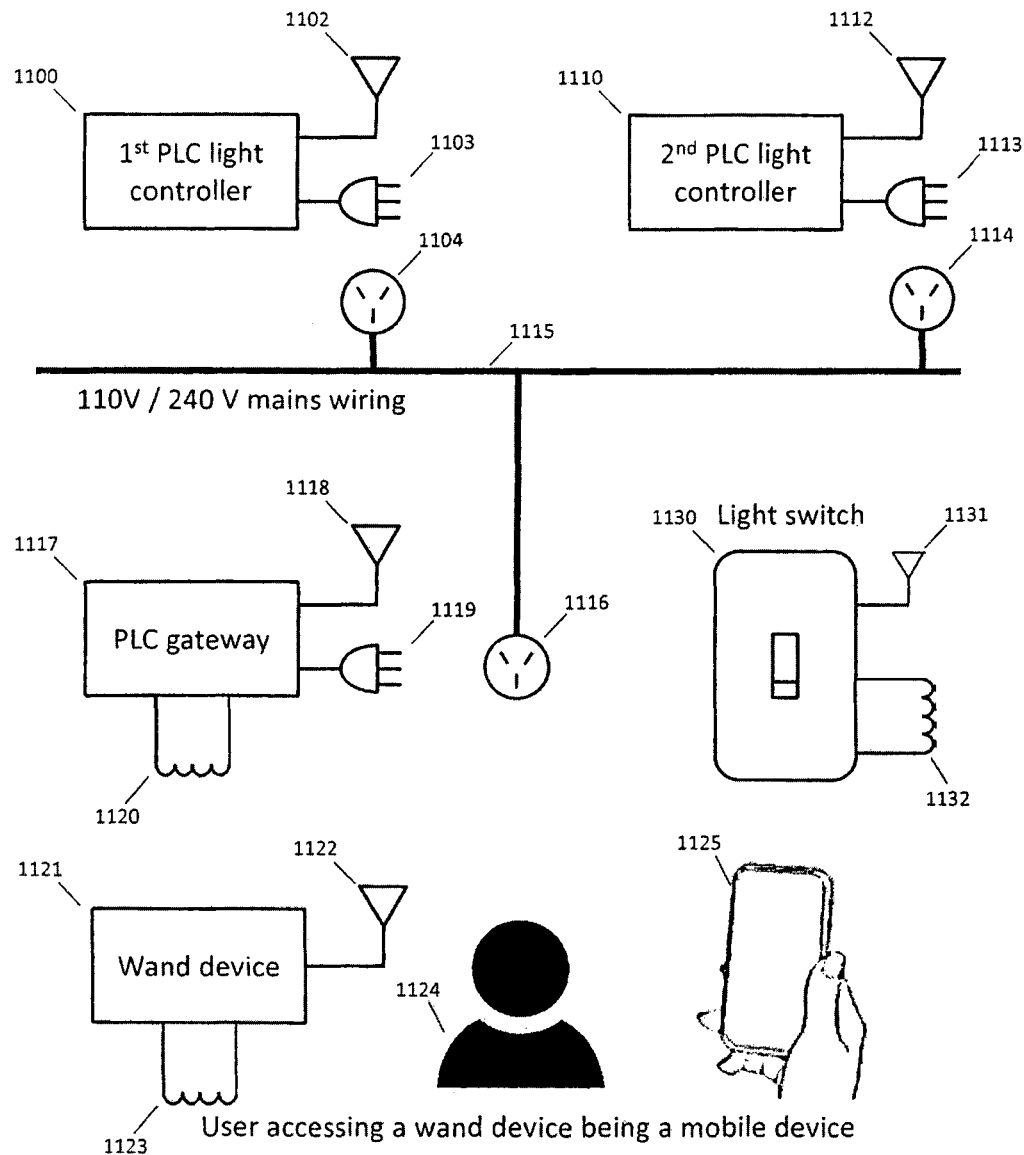
FIG. 11 illustrates an arrangement including a PLC gateway, multiple PLC discoverable light controllers and a wireless light switch.

FIG. 11 Illustrates an Arrangement including a PLC Gateway, Multiple PLC Discoverable Light Controllers and a Wireless Light Switch.

The arrangement consists of two Power Line Communication (PLC) equipped light controllers and a PLC equipped gateway that can communicate data over mains power wiring 1115 which is typically 110V or 240V at 50 Hz or 60 Hz.

The first PLC light controller 1100 is equipped with a wireless communications mechanism 1102 and a PLC communication mechanism 1103 that plugs into mains socket 1104.

The second PLC light controller 1110 is equipped with a wireless communications mechanism 1112 and a PLC communication mechanism 1113 that plugs into mains socket 1114.

The PLC gateway 1117 is equipped with a wireless communications mechanism 1118, a near field communication mechanism 1120 and a PLC communication mechanism 1119 that plugs into mains socket 1116.

The PLC gateway 1117 has received data over the mains wiring 1115 regarding the first and second light controllers 1100 and 1110 respectively. The data includes device identifiers and wireless network parameters sufficient to establish a wireless network and pair with a device.

A user 1124 has available a wand device 1121 which could be a smartphone 1125 which is suitably equipped with a near field communication mechanism 1123 and a wireless communication mechanism 1122.

The user brings the wand device 1121 into close proximity to the near field communication mechanism 1120 of the PLC gateway 1117 such that data is exchanged between communication mechanism 1120 and 1123 sufficient to provide a list of devices which includes the identifiers of the first and second light controllers. The list can be displayed to the user on the screen of the wand device.

The user wishes to pair a light switch 1130 to a light controller. The user selects the first PLC light controller 1100 from the list. The use then brings the wand device 1121 into close proximity with the light switch 1130 such that near field data can transfer between the near field communication mechanism 1132 of the light switch and the near field communication mechanism 1123 of the wand 1121. The data transferred is sufficient to form a wireless network and pair light switch 1130 with the selected first PLC light controller 1100. Wireless data can be sent from the light switch 1130 using wireless communication mechanism 1131 to the wireless communication mechanism 1102 of the first PLC light controller. Thus the process is complete allowing user 1124 to operate the light switch 1130 wirelessly controlling the selected light controller.

Alternatively, the user could have selected both PLC light controllers from the list on the screen of the wand device, resulting in the light switch being paired with and controlling both controllers. Also if the user had access to multiple similarly equipped light switches, more than one switch could have been tapped with the wand, forming a multi switch arrangement. Additionally, if the wand is part of the formed wireless network, it too can be a controller of the selected light controllers.

Figure 12:
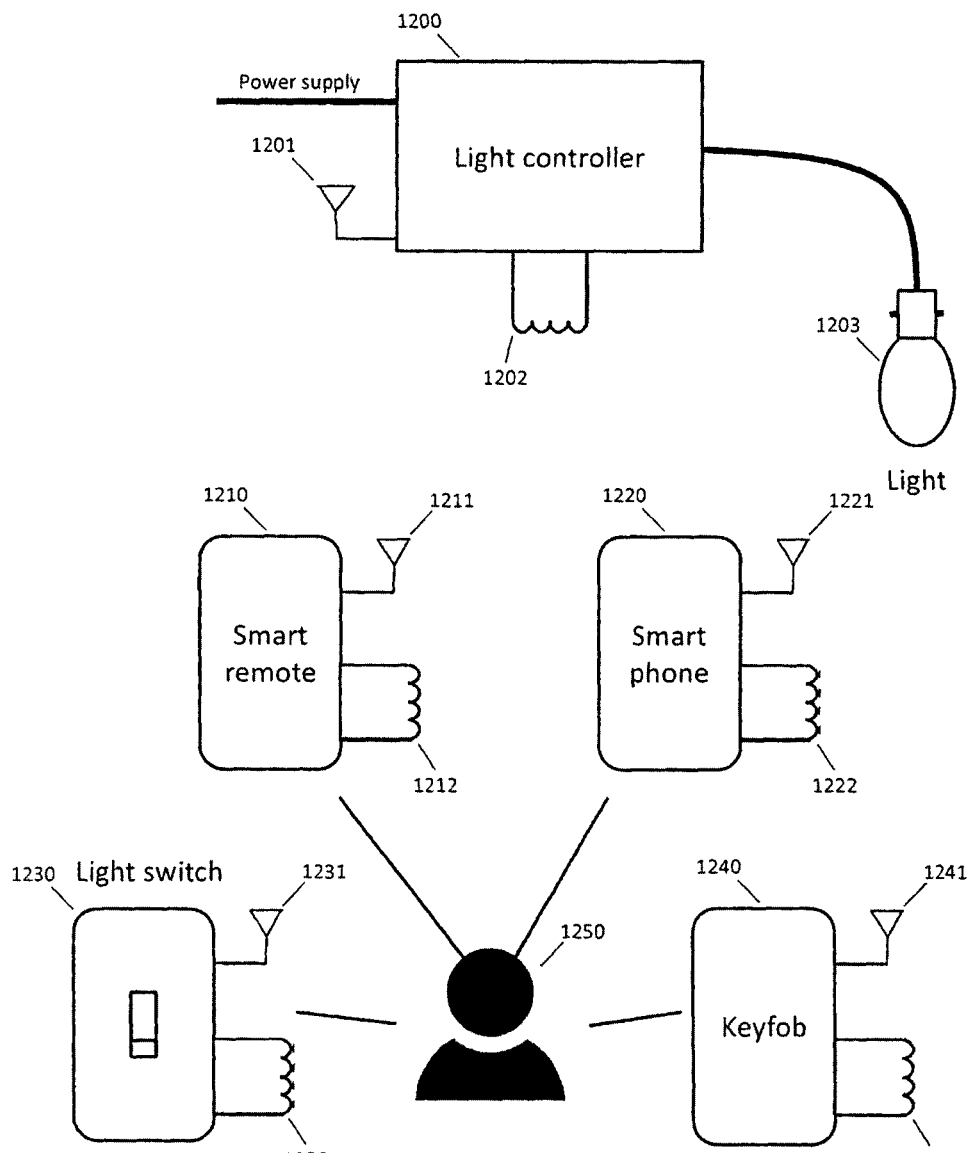
FIG. 12 illustrates an arrangement of multiple light switches controlling a light controller.

FIG. 12 Illustrates an Arrangement of Multiple Light Switches Controlling a Light Controller.

In this arrangement, user 1250 has access to a number of devices that can send commands to a light controller 1200, which can control a light 1203.

The devices are a smart remote 1210, a smartphone 1220, a light switch 1230 and a keyfob 1240. Each is equipped with a near field communication mechanism 1212, 1222, 1232 and 1242 respectively. Each is equipped with a wireless communication mechanism 1211, 1221, 1231 and 1241 respectively.

The user can establish a wireless communication link and pair all of these devices with light controller 1200 such that data can be wirelessly sent to the wireless communication mechanism 1202 of the light controller to control light 1203.

FIG. 13A Illustrates a Device with Integrated Near Field Data Communication Mechanism.

The device housing 1300 contains near field communication circuits 1301, microprocessor circuits and any other circuits specific to the device 1305. The near field communication circuits 1301 communicate data to these circuits using the internal data communication link 1304.

The near field communication circuits are attached to an internally located near field coil 1303, the location of which is identified externally on the housing with a tap point identifier 1302. This communicates the position of the near field coil to a user if another device is to be brought into close proximity to for a near field data transfer. This location identifier is particularly important when the near field coil is small in proportion to the device as it helps the user locate the sweet spot for the data transfer.

FIG. 13B Illustrates a Device with a Remotely Located Near Field Data Communication Mechanism.

In this arrangement a device housing 1310 contains microprocessor circuits and any other circuits specific to the device 1311.

The near field communication circuits 1314, including near field coil 1315 have been removed from the device housing 1310 and relocated remotely into near field housing 1313. The tap point identifier 1312 is now removed from the device housing 1310 and reposition on near field housing 1313. The near field communication circuits 1314 communicate with the microprocessor circuits 1311 over a data communications link 1316. This link can be wires connecting the two housings or can be a wireless data connection.

The exact arrangement can vary, with the near field communication circuits being partly or totally located in the near field housing. In some arrangements, just the near field coil 1315 may be located in the near field housing which is then connected to the near field communication circuits located in the device housing 1310.

Irrespective, the essential idea of a remote near field communication mechanism is that it provides the ability to locate the tap point to a position that is independent of the device it is acting for. This might provide convenient user access that might not otherwise be available due to power supply or other environmental constraints on the device. An example of an environmental constraint might be that the device needs to be kept cool and dry. By relocating the near field tap point, it can be located independently in a position that may be exposed to high temperatures or moisture, while protecting the device.

Figure 14:
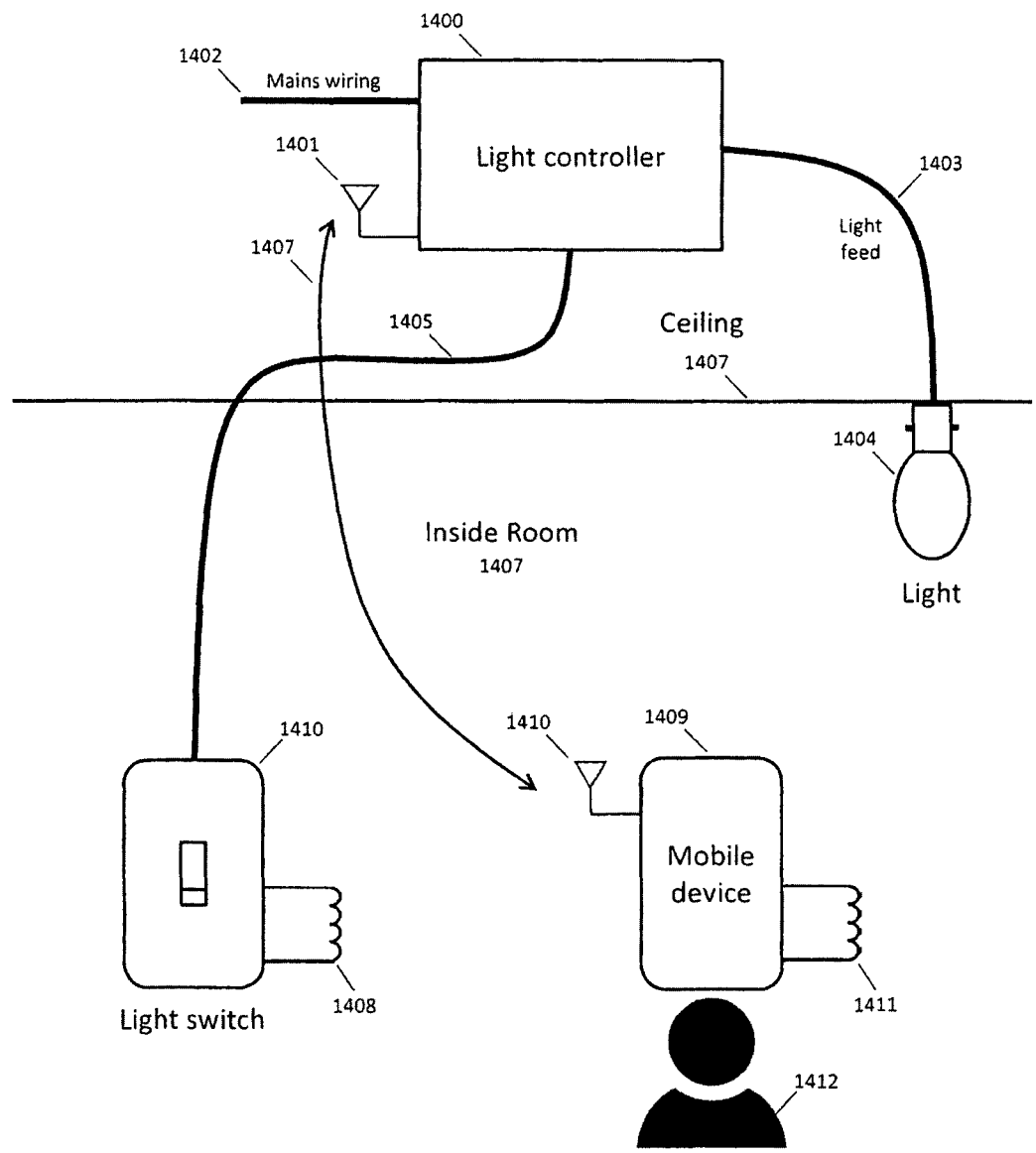
FIG. 14 illustrates an arrangement of a fixed device with a remote coil.

FIG. 14 Illustrates an Arrangement of a Fixed Device with a Remote Coil.

In this arrangement a light controller 1400 equipped with a wireless communication mechanism 1401 is located above ceiling 1407. It is connected to the mains wiring 1402 of the house supply. A light 1404 is attached to the ceiling 1407 and wired into the light controller 1400 via light feed 1403.

Since the light controller is located above the ceiling, it is not easily accessibly user 1412, with a mobile device 1409 which is equipped with a near field communication mechanism 1411 and wireless communication mechanism 1410.

A light switch 1410 is attached to a wall inside the room 1407 and connected to the light controller 1400 using wiring 1405. The light switch is equipped with a near field communication mechanism 1408. The controller is not fitted with a near field communication mechanism as it has been relocated to the remotely located light switch.

In this arrangement the user 1412 brings the mobile device 1409 into close proximity of the light switch such that the near field communication mechanisms 1408 and 1411 are able to exchange near field data establishing a wireless network 1407 and pairing the mobile device and light controller.

FIG. 15 Illustrates a Block Diagram of a Wireless Light Controller with Remote Near Field Coil.

In a standard arrangement for wiring a light in a home, neutral line 1510 is connected directly the neutral line 1514 of the light feed 1515. The active line 1511 is connected directly to the active feed line 1516 which connects to one side of the original light switch 1522 through dotted connection 1520. The other side of the original light switch 1522 is the switched active return line represented by the dotted line 1521 that returns as the switched active return line 1517 of the light feed 1515. Turning the original light switch on and off, switches the active supply line to an externally connected light.

In this new arrangement, the original light switch 1522 is removed. A wireless light controller 1500 and new light switch 1520 arc added. The new light switch 1520 is added to the system using terminals 1522 and 1523. A near field coil 1518 and switch 1521 are coupled to the active feed line 1516 and switched active return line 1517 using coupling circuits 1519.

The light controller 1500 can connect to a wireless network using antenna 1502. The controller is supplied with active line 1511 and neutral line 1510 which are rectified using rectifier 1512 to generate power supply 1513 that is used to power the microprocessor and memory circuits 1506, the wireless communication circuits 1501, the near field communication circuits 1503, the near field coupling circuits 1505 and any other circuits in the system. The near field communication circuits 1503 are coupled to the light feed lines 1515 using near field coupling circuits 1505. Before the light controller transmits near field data, the microprocessor uses control line 1509 to open switch 1508, isolating the light feed lines from the active and neutral lines 1511 and 1510 respectively. Since the wires to the light switch may be long, it may be necessary to transmit high power near field data to overcome line losses. Isolating these switching voltages ensures that line noise regulations from regulating bodies are not exceeded.

The long lines between the wireless controller and light switch can also cause attenuation of received near field data from the near field coil 1518, so the near field communication circuits 1503 are equipped with signal amplification and conditioning circuits to overcome any line losses.

During normal operation, the microprocessor circuits ensure switch 1508 is closed which provides mains power to the light switch 1510.

When a user operates the switch 1521 in the light switch 1520 the light feed which is wired to an externally connected light is switched. The near field circuits 1503 are in receive mode and listening for any near field data transmissions received from the near field coil 1518 located in the light switch 1520.

When a user brings a suitably equipped mobile device into close proximity to the light switch 1520, near field data is received on the near field coil 1518 which is coupled onto the active feed line 1516 and switched active return line 1517 which is then in tern coupled to the near field communication circuits 1503 via the near field coupling circuits 1505. This data is then conditions and processed by the microprocessor circuits. When the light controller is required to transmit a near field data response back to the mobile device, the switch 1508 is opened until the transmission is completed, at which point the switch 1508 is closed again. The near field data can be used to pair the wireless light controller to the mobile device.

If the light switch 1521 is closed when a mobile device is brought within close proximity, the transmission of near field data may cause a brief interruption to the light feed, possibly causing some light flickering.

However, since the data transmissions are generally completed in the order of tens of milliseconds, it is unlikely that the flickering will be noticeable by a user.

An embodiment that would eliminate the interruption of the supply to the light feed would entail disconnecting the light switch 1520 from the mains side of the wiring and connecting it directly to an input/output port of the microprocessor circuits which can pole the status of the switch in order to control the light.

Figure 16:
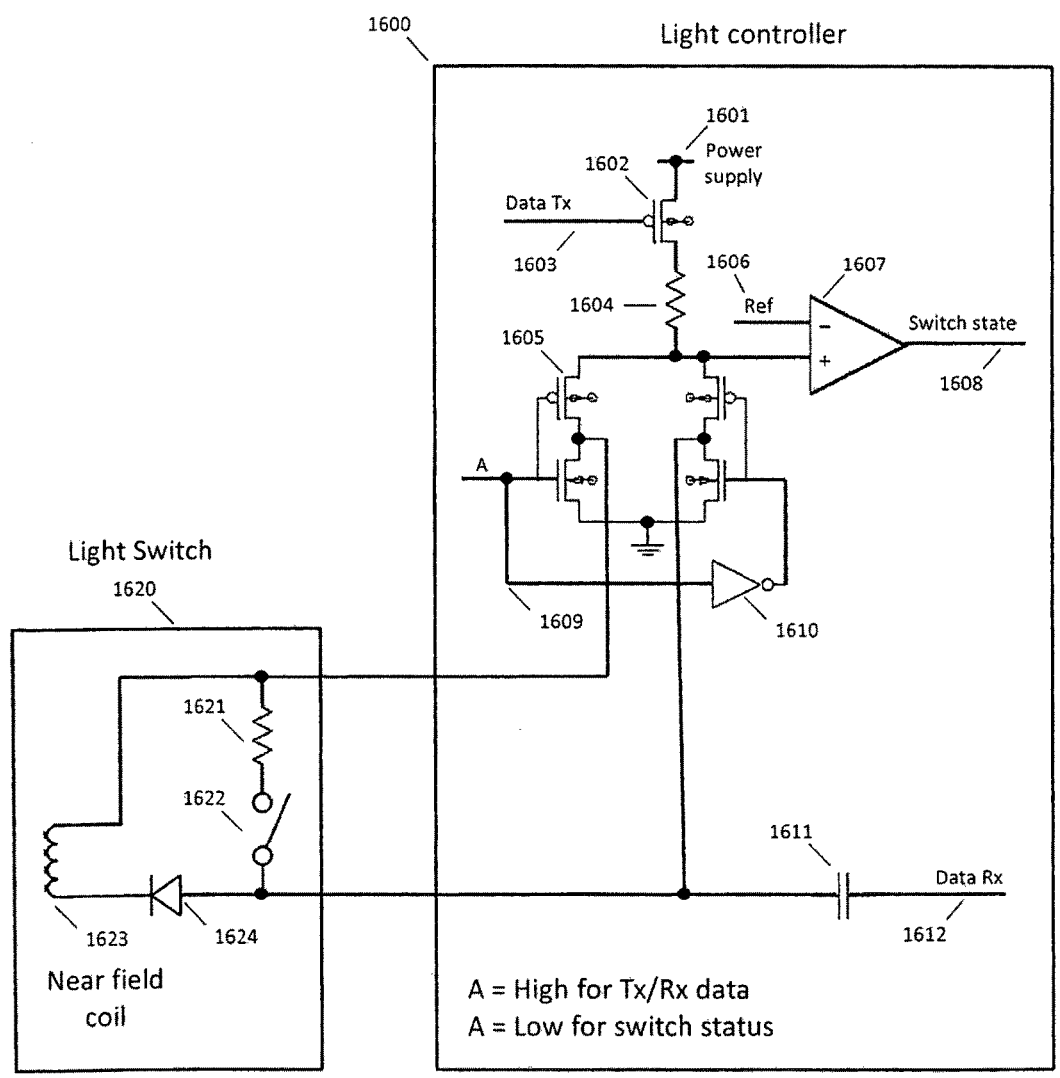
FIG. 16 illustrates a low voltage interface circuit for a light switch with built in near field coil.

FIG. 16 Illustrates a Low Voltage Interface Circuit for a Light Switch with Built in Near Field Coil.

A light controller contains circuits that connect to inputs and outputs of a microprocessor. The purpose of this circuit is to be able to transmit and receive near field data and determine the state of a connected switch.

A light switch 1620 contains a resistor 1621 in series with a switch 1622 and a diode 1624 connected in series with a near field coil 1623.

The light controller 1600 transmits data pulses when signal A 1609 is set high and data Tx 1603 drives a transistor 1602 supplying power supply voltage 1601 to a transistor and inverter arrangement 1605 and 1610 respectively, via current limit resistor 1604. The transistor arrangement supplies a pulse current to the near field coil 1623 located in the light switch 1620.

The light controller 1600 receives data when signal A 1609 is set high. A near field transmission in close proximity to near field coil 1623 induces a voltage across the coil which can be capacitively coupled with capacitor 1611 to produce data Rx signal 1612 which can be further amplified and conditioned.

The light controller can detect an open or closed state of the switch 1622 in the light switch 1620. The series resistor 1621 is of high resistance so not to load the near field data. Signal A 1609 is set low to determine the switch state. Diode 1624 isolates the coil from the circuit during this time. Comparator 1607 is supplied with a voltage reference 1606 such that the output of the comparator switches when the state of switch 1622 changes. Thus the switch state 1608 can be input to a microprocessor allowing control of a light switch.

Figure 17:
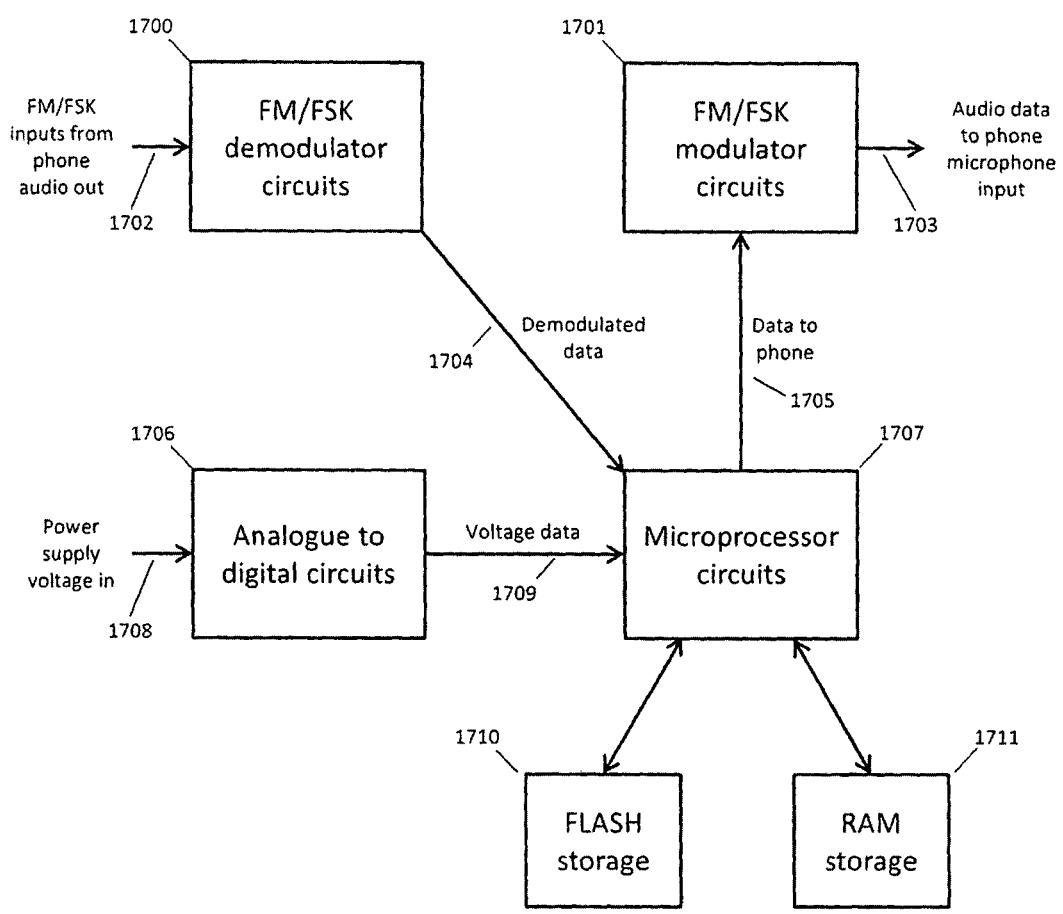
FIG. 17 illustrates a block diagram of the processor circuits in a dongle device.

FIG. 17 Illustrates a Block Diagram of the Processor Circuits in a Dongle Device.

The microprocessor 1707 loads software from flash memory storage 1710 and runs software from RAM memory storage 1711, which can also be used for holding program variables.

The power supply voltage 1708 is input to analogue to digital circuits 1706 that produce an output digital signal, voltage data 1709 which is representative of the magnitude of the voltage in 1708 which is input to the microprocessor 1707. This voltage can be used to alert the microprocessor of over or under voltage conditions allowing corrective action to be made.

FM or FSK inputs 1702 are received from the audio outputs of the phone and are processed by the FM/FSK demodulator 1700 to output demodulated data 1704 suitable for digital processing by the software running in microprocessor 1707.

When the microprocessor is required to send data to the phone, digital data 1705 is output to the FM/FSK modulator circuits 1701 which convert this data to a modulated audio signal, producing audio data 1703 which is directed to the phones microphone input line.

Many modern micro controllers have some or all of these blocks built into the chip, simplifying this arrangement.

Figure 18:
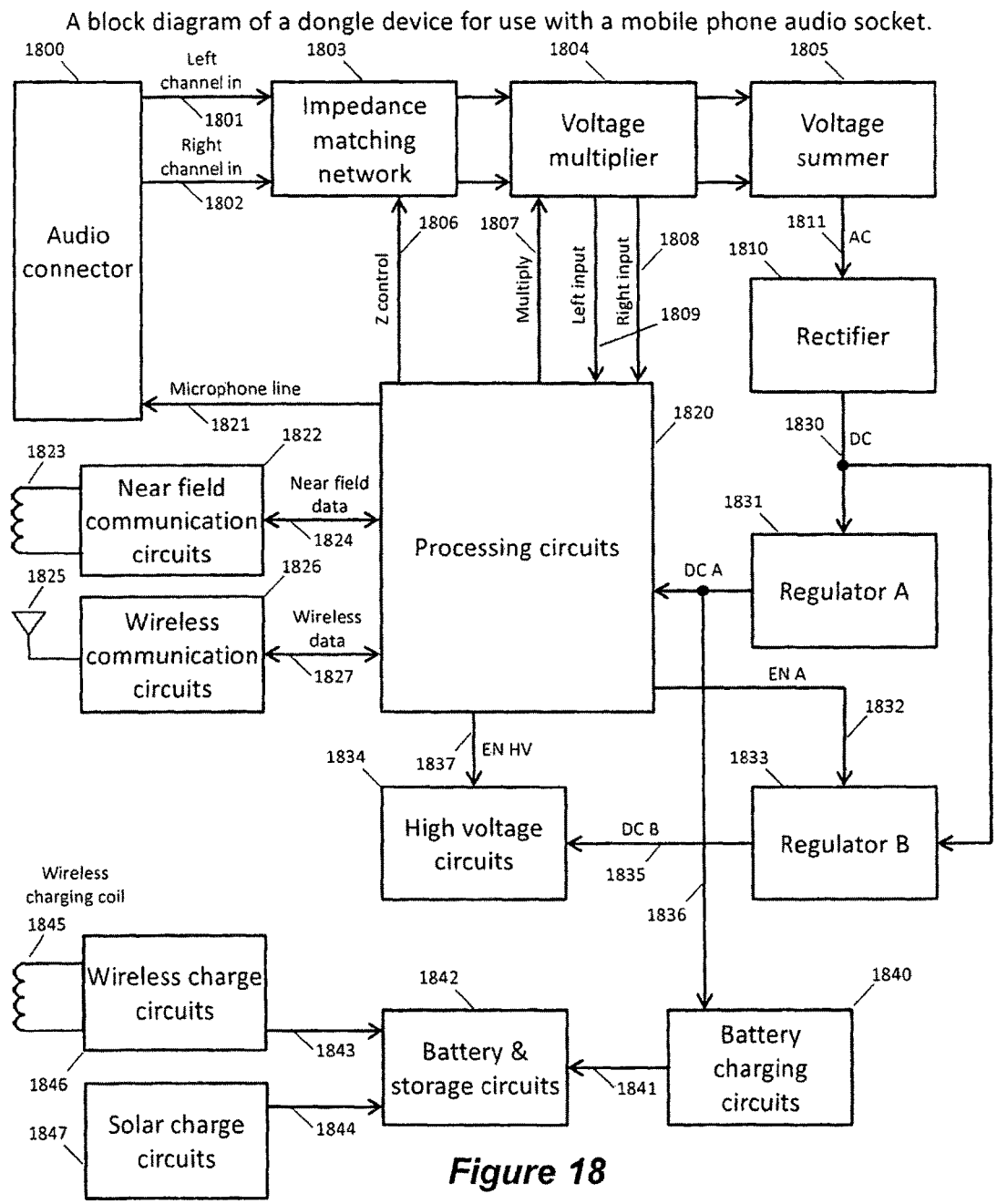
FIG. 18 illustrates a block diagram of a dongle device for use with a mobile phone audio socket.

FIG. 18 Illustrates a Block Diagram of a Dongle Device for Use with a Mobile Phone Audio Socket.

The device is equipped with an audio connector 1800 that receives AC audio signals from the phone using the left audio channel in 1801 and the right audio channel in 1802 and transmits an AC audio out signal 1821 to the phone through the phones microphone in line. The impedance matching network 1803 maximizes the power transfer of the left and right channel signals.

The left and right audio signals from the impedance matching network feed into voltage multiplier 1804 which can be a doubler, trippler or a transformer. To ensure maximum power transfer, the impedance matching network 1803 is designed such its impedance out closely matches the input impedance of voltage multiplier 1804. If implemented, the processing circuits can control the impedance of the impedance matching network 1803 using Z control signal 1806, to maximize the voltages input to voltage multiplier 1804. The gain of the voltage multiplier may be selectable with the multiply signal 1807 generated from the processing circuits 1820. The processing circuits can utilize a microprocessor and the multiply signal 1807 can be set to an initial default state as the microprocessor powers up, or comes out of reset. The microprocessor can use an analog to digital input or external circuit to monitor the supply voltage DC A 1836 to determine the state of the multiply signal 1807. For example the default state may be that the multiplier signal is low on microprocessor power up, causing the multiplier to operate as a doubler. The microprocessor may be of a low voltage type, for example running on 1.2V. During the operation of the device it may be necessary for the microprocessor to activate some 2.0V radio transceiver circuits. To achieve this, the microprocessor would enable the multiply signal 1807 which would change the voltage multiplier to operate as a trippler.

The now multiplied AC audio signals are then combined using voltage summer 1805 to produce a single AC voltage out signal 1811 to be rectified and filtered by rectifier 1810. Alternatively voltage summer 1805 and rectifier 1810 could be combined into a single stage and may be as simple as a diode OR circuit where the left and right audio signals are fed into the anode of each diode and the common cathodes output DC voltage 1830 suitable for filtering and regulation. Regulator A 1831 provides a DC A supply 1836 suitable for powering processing circuits 1820.

Some devices may utilize circuits that require a different voltage supply to the processing circuits. Common examples of high voltage circuits may include radio transceivers, infra-red transmitters, etc. In these cases the high voltage circuits 1834, can utilize a separate supply DC B 1835 from regulator B 1833. The processing circuits will first enable multiply signal 1807 to generate a higher voltage output from voltage multiplier 1804, then enable regulator B 1833 using the EN A enable signal 1832. The high voltage circuits 1834 are then enabled using the HV enable signal 1837 from the processing circuits 1820 when required. It is advantageous to disable these high voltage circuits and regulator B to minimizes the current drain for these circuits, extending the battery life of the mobile phone.

If the device is equipped with a battery or some form of energy storage circuit 1842, the supply out DC A 1836 can be used to charge the battery using battery charging circuits 1840. Additionally, the battery can be charged using solar charge circuits 1847. Furthermore the battery can be charged using wireless charging circuits 1846 when wireless charging coil 1845 receives energy from an external wireless charging device.

The device dongle can communicate wirelessly to paired devices within wireless communication range by transmitting wireless data 1827 using the wireless communication circuit 1826 and antenna 1825.

The device dongle can also communicate to other devices using near field proximity by transmitting near field data 1824 using near field communication circuit 1822 and near field coil 1823.

The preceding text has covered in detail the mechanism of how a device connected to a phone's audio socket, can maximize the scavenged power through the audio lines and adjust the power required to supply different circuit needs while minimizing the power consumption of the battery within the phone.

The following sections now discuss how a device and phone can communicate while the device simultaneously scavenges power as described.

When a phone operates as a music player, source music content is processed by the phones music player which consists of software to decode and stream the music to the phone audio circuits. The user may listen to that music using connected headphones. The headphone supports stereo content via left and right audio channels. Additionally, a headset can be connected into the audio socket of a suitably equipped phone and a microphone-in line allows a user's voice input to be processed by the internal circuits and software.

In this invention the phone uses a software application, or "app", to processes data that is to be sent to the dongle device. The app uses the data to modulate the audio signals that the phone outputs on its audio channels. These modulated signals are demodulated by the attached device recovering the data, thus allowing data to be transmitted from the phone to the attached device. The functionality of the device will determine how this data is used. The data could be commands for the device, retransmitted to a remote device, or some other use.

The device can also modulate an audio signal on the microphone line of the phone. The app can demodulate that signal to recover the baseband data for use by the phone. Again, the functionality of the device will determine how this data is used, whether it is commands for the phone, data to be retransmitted to a remote device or over the network, or some other use.

Phone Transmits Data to the Device

Referring to FIG. 18 for more detail, when the phone transmits data to the device, the modulated signals are generated by the phone and appear as voltages on either left channel in 1801, right channel in 1802, or both if two data channels are used. The signals are impedance matched, multiplied and input to processing circuits 1820 as audio signals right input 1808 and left input 1809. In this embodiment the left and right data channels are derived and directed to the processing circuits from the voltage multiplier 1804 circuits, but can optionally be derived from any stage of the signal path. Processing circuits 1804 demodulate the audio data, recovering the data from the phone.

Device Transmits Data to the Phone

The processing circuits 1820 transmit an audio signal 1821 on the microphone line of the audio connector 1800 which connects to the microphone input of the phone.

The processing circuits must use the data to modulate a carrier signal that is compatible with the microphone input circuits of the phone. A carrier within the audio range of 20 Hz to 20 kHz can be selected and using FSK or FM techniques the data can be used to modulate the carrier. An app on the phone is required to demodulate this signal to recover the baseband data.

Where the processing circuits have analogue data to send to the phone, such as might be the case if the device is measuring voltage as part of a voltmeter or Cathode Ray Oscilloscope (CRO) application, then FM would be a suitable choice.

In the case where the data is in digital format, such as might be the case if the device is reading data over a digital communication channel from a remote device, then FSK would be a preferred choice.

This data channel can be used not only to send data to the phone, as is the current state of the art, but to allow the device to send status information or commands to the phone.

An example of where command data is useful is that the device can command the phone to generate a particular audio frequency, rather than being a fixed parameter of the app. Devices are generally designed to maximize the power transfer at a particular frequency and if an app is associated with a device, then that frequency will be known. However it might be beneficial for an app to support multiple devices or a family of devices and the optimum frequency of that device might not be known to the app. In this case, the device can command the phone to do a frequency scan allowing the device to monitor the output voltage at different frequencies, thus determining which frequency has the optimum power transfer. The device can then command the app on the phone to use that frequency for subsequent operation.

In the cases where the app and the device are matched and the operational frequency known, it may still be beneficial to initiate a frequency scan around the operational frequency to tune out any small mismatches in the device and phone circuits. So even if 18 kHz has been designed as the operating frequency, one phone may produce optimum power at 18.5 kHz whereas another brand of phone may be better at 17.4 kHz.

In addition to status and commends being sent from the device to the phone over the microphone input, data may be received by the device with appropriate circuits and that data transferred to the phone for use by the app. Examples might include receiving data from a wireless radio network, an infra-red reader circuit, magnetic stripe, near field data reader, etc. Often this data will be baseband digital data, but may also be in an analogue form such as might be received from a light detector, a voltage measurement input, a current measurement input or the like.

Figure 19A:
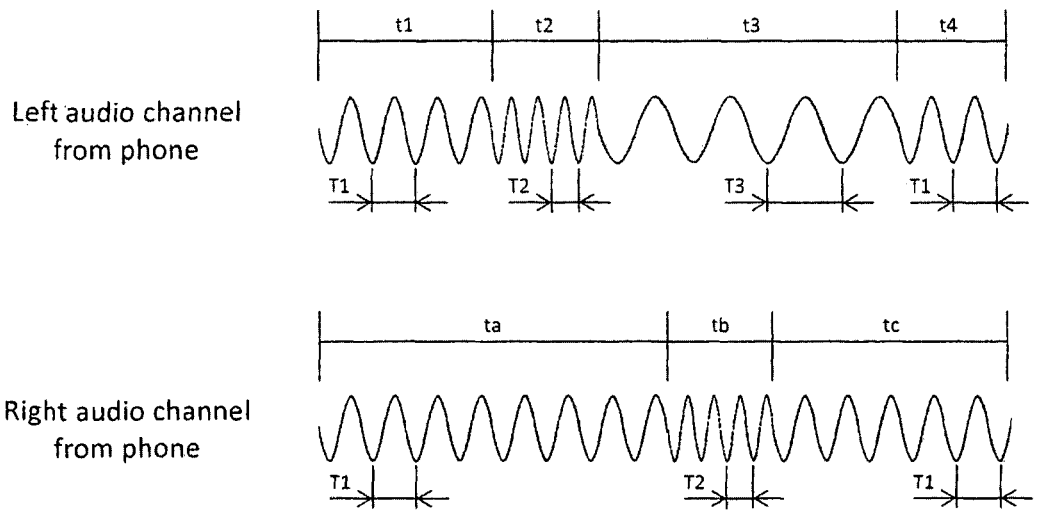
FIG. 19A illustrates audio channel data modulation.

FIG. 19A Illustrates Audio Channel Data Modulation.

This illustrates how the app on the phone can modulate the voltage signals on the left and right audio channels. The left channel data shows the phone generating a frequency with period T1 for a time t1. During time t2 a second higher frequency with period T2 is generated and during time t3 a lower frequency of period T3 is generated. During time t4 the original frequency of period T1 is transmitted. Similarly the right channel shows the phone generating a frequency with period T1 for a time ta. During time tb a second higher frequency with period T2 is generated. During time tc, the original frequency of period T1 is transmitted.

In the left channel example, there are three frequencies used, represented by period T1, T2 and T3. These frequencies will typically be in the audio range of 20 Hz to 20 kHz, to be compatible with the audio circuits and amplifiers found in phones. It is known however, that many mobile phone audio circuits are capable of transmitting much higher than 20 kHz. In any case the choice of frequency must be compatible with the phone or range of phones chosen.

The three frequencies illustrated here can represent a center frequency or no data state; a lower frequency to represent the logic 0 state; and a higher frequency to represent the logic 1 state. The benefit of using a center frequency when no data is being transmitted is that the impedance matching circuits 1803 in FIG. 18 can be tuned to this frequency, thus providing maximum power transfer at this center frequency. Higher Q circuits are more sensitive to frequency deviation and will result in lower output voltages for a given frequency deviation compared to lower Q circuits.

Thus the impedance matching circuit can be tuned to the center frequency and when the phone transmits data using a FSK method, the frequency will deviate around the center frequency. The processing circuits 1820 on FIG. 18 can demodulate this data by measuring these frequency shifts. This can be done with an FM receiver or by using timers within a microprocessor to determine the times T1, T2 and T3.

An example might be that the center frequency is set to 18 kHz and a logic 0 is represented by 16 kHz and a logic 1 is represented by 20 kHz. This example shows a 2 kHz deviation from the center frequency with a total frequency change or delta frequency of 4 kHz. If the demodulator circuits can discriminate even smaller frequency deviations, then a higher Q circuit can be tolerated in the impedance matching network without suffering large voltage losses when data is being transmitted.

Figure 19B:
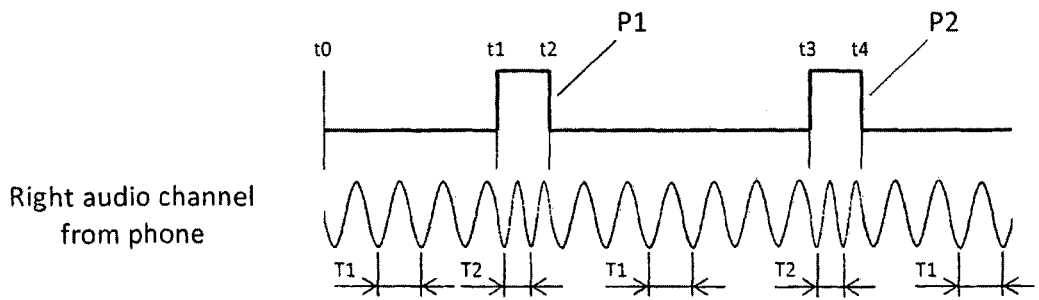
FIG. 19B illustrates audio channel data modulation for near field ping data communication.

FIG. 19B Illustrates Audio Channel Data Modulation for Near Field Ping Data Communication.

Another technique of data transfer is shown here for the right audio channel. In this case two frequencies are used represented by periods T1 and T2. In this case a nominal or constant frequency represented by period T1 can be transmitted. This can represent a logic 0 state. Then the logic 1 state can be represented by a second frequency illustrated by period T2.

An example might be that the nominal frequency is set to 14 kHz and using the same delta frequency of 4 kHz from above, a logic 1 frequency is represented by 18 kHz. Considering that the impedance matching network will be tuned to the nominal 14 kHz to ensure maximum power transfer, a greater mismatch will occur at the time when a logic 1, or 18 kHz is present.

The two frequency right channel example, although being a simpler system to implement, will result in greater mismatch when data is being transmitted from the phone, as it will consist of some proportion of logic 1 states.

However, this can be minimized if the logic 1 states are very short in duration as would be the case for a pulse, or ping modulation system that utilizes very short pulses.

Referring back to FIG. 19B, the audio channel data shows the phone generating a frequency with period T1 for a time between t0 and t1. At time t1, the frequency changes to a period of T2. The device has appropriate frequency measuring circuits and can detect or measure this change in period and generate a data pulse P1. The higher frequency signal may only be present for a few cycles and resume back to the frequency with period T1 at time t2. The beginning of the high frequency burst at time t1 determines the leading edge of the ping pulse P1. Similarly the leading edge of ping pulse P2 is generated at t3 when signal with period T2 begins. The signal resumes back to the steady state period of T1 at time t4. The width of pulse P1 and P2 may be shortened with the appropriate software or hardware such as a monostable or the like. Pulse widths down to sub microseconds can be generated, reducing the power required to transmit these signals.

Now referring to FIG. 18, near field data 1824 containing pulses P1 and P2 is used by the near field communication circuits 1822 to generate near field ping pulses on the near field coil 1823. This near field ping data can be received by an external device equipped with a near field ping receiving mechanism, when it is brought within near field proximity distance. When the remote device transmits near field ping data, near field communication circuits 1822 receive this signal from near field coil 1823 and send near field data 1824 to the processing circuits 1820. This data is converted to audio signal 1821 on the microphone line that is fed into the microphone input of the phone. An application running on the phone then decodes these frequency shifts back to the baseband digital data that originated in the remote device.

Using the techniques described above it is possible for the designer of a device to utilize one audio channel to generate a constant frequency and match the corresponding channel of the impedance matching network to that frequency, thus providing the benefits of a high Q circuit minimizing frequency mismatch losses. The second audio channel can then utilize either two or three frequency modulation schemes and choose appropriate characteristics for the impedance matching circuits based on data transmit times, the number of logic 1's that may exist in the data, etc.

This system provides a clear advantage over existing systems that utilize a single channel for data and the second channel for power scavenging. Clearly more power can be sourced using two channels while also providing the additional advantage of being able to support two channels of data rather than one.

A system that has the ability to support two communication channels has benefits as one channel can be dedicated to commands and the second dedicated to communication data. Additionally, data systems that support simultaneous quadrature I and Q channels can now be implemented with this system.

For example if the device is equipped with a near field proximity data mechanism, the near field data can be transmitted continuously and not be interrupted with command data. In the case where the near field data is only capable of low data rates, due to ultra-low power restrictions, then having the ability not to interrupt this data for commands results in greater data throughout and therefore a system that has faster response.

The protocol used to transmit the data or commands can be determined by the designer to include start and stop and can include bits, check sums, etc.

FIG. 20 Illustrates Various Methods for Impedance Matching the Phone to the Dongle Device.

The fixed impedance matching network 2000 consists of capacitors C1 and C2 and inductor L1.

Switchable impedance matching network 2002 illustrates how a select line 2001 can cause switches S1 and S2 to switch alternative components C1B and L1B into the network thus changing the networks impedance matching characteristics, For example components C1A, L1A and C2 could be chosen to transform a 4 ohm Zin source into Zout of the load, while switching the components of C1B in parallel with C1A, L1B in parallel with L1A and C2 could transform an 8 ohm Zin source into Zout of the load.

Alternatively, switched network 2004 illustrates how two different impedance matching networks can be selected using select line 2003 to cause multiplexers S1A and S1B to switch either the C1A, L1A and C2A network or the C1B, L1B and C2B network.

Figure 21:
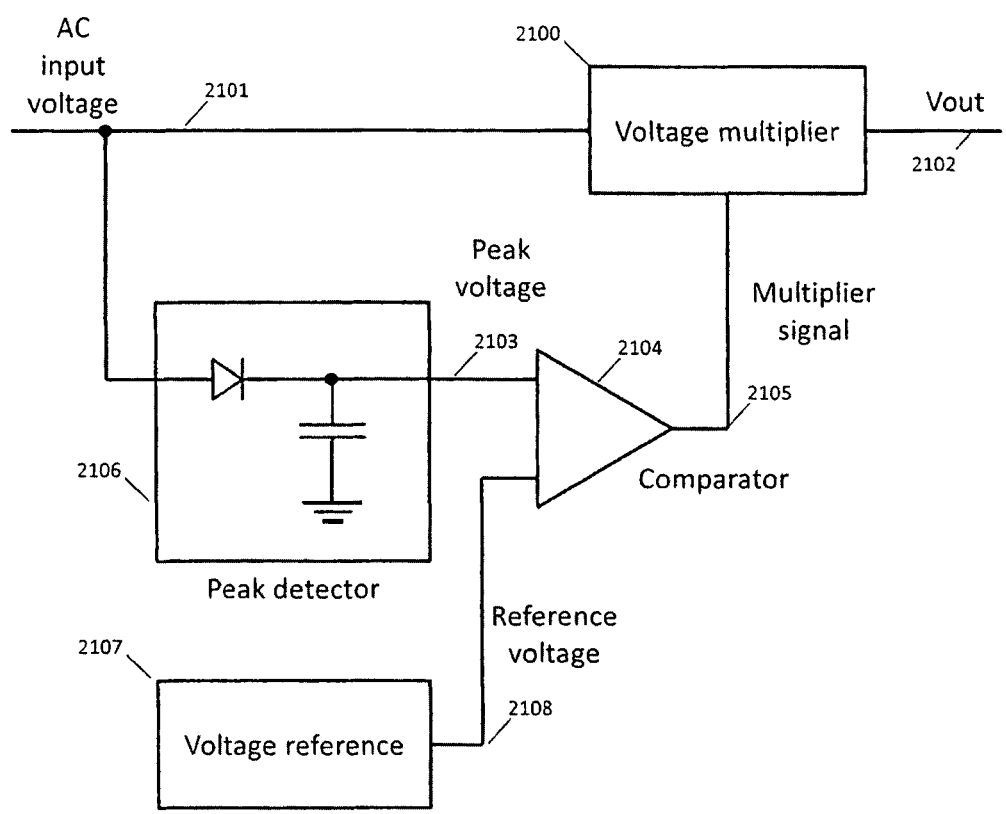
FIG. 21 illustrates the voltage detection circuits used for adjusting a voltage multiplier.

FIG. 21 Illustrates the Voltage Detection Circuits used for Adjusting a Voltage Multiplier. This demonstrates how a multiplier can be automatically controlled without the use of a microprocessor. The AC input voltage 2101 is fed into a peak detector 2106 to produce a peak voltage 2103; the magnitude of this voltage is representative of the AC input voltage level. This peak voltage is fed into comparator 2104 and is compared to a reference voltage 2108 generated by voltage reference device 2107.

The comparator can be configured such that if the peak voltage 2103 is greater than the reference voltage 2108, the output multiplier signal 2105 will be driven to a low state, configuring or switching the voltage multiplier 2100 to operate as a voltage doubler.

When the peak voltage 2103 is less than the reference voltage 2108, the output multiplier signal 2105 will be driven to a high state, configuring or switching the voltage multiplier 2100 to operate as a voltage trippler.

This is a simple form of automatic gain control. Many techniques can be employed to automatically boost or amplify low input voltages.

FIG. 22 Illustrates user Selectable Devices in a Gateway Arrangement.

Referring to FIG. 11 by way of example, the arrangement illustrates a user 1124 has access to mobile device 1125, which is running software to allow the mobile device to function as a wand. A PLC gateway 1117 uses a PLC communication mechanism to communicate to two PLC equipped devices, 1100 and 1110, which are light controllers, using mains wiring 1115. The arrangement also includes a light switch 1130. The light controllers, light switch and wand are equipped with a wireless communication mechanism.

Now referring to FIG. 22. For this example, a total of seven PLC equipped light controllers and five light switches are included in a similar arrangement.

In step 1 the user taps the wand to the gateway device. A list of the seven light controllers, that are in communication with the gateway using PLC, are presented in a list on the touchscreen display 2203 of the mobile device. The user assigns nicknames to each device using the touchscreen, completing the list 2200 shown under the heading "Gateway Devices" 2201. At this point the wand pairs with the gateway using the wireless communication mechanism.

The user then taps the wand to five light switches. A list of the five light switch devices are presented in a list on the touchscreen display 2203 of the mobile device. The user assigns nicknames to each device using the touchscreen, completing the list 2204 shown under the heading "Devices" 2202.

In step 2, using the touchscreen of the mobile device 2203, the user drags list items to form groupings. The groupings associate which light switches the user would like use for each controller. The grouped list of light controllers 2205 under the heading 2201 "Gateway Devices" and the corresponding list of light switches 2208 under the heading 2202 "Devices" are shown and identify which light switch will control which lights.

At this point the user can accept the completed list which generates a pairing table that holds the information necessary for device pairing and establishing a wireless communication link. Specifically, pairing will be established allowing the lounge light switch to control lounge lights 1 to 4; bedroom 1 light switch to control bedroom 1 light; bedroom 2 light switch to control bedroom 2 light; and hall light switch front and hall light switch back will both pair with the hall light, allowing them to be used in a two way, multi way light switch arrangement.

If the wand was not equipped with a wireless communication mechanism it could not have been previously paired with the gateway. In this case the user could tap the wand to the gateway a second time, transferring the pairing table using their respective proximity communication mechanisms.

Figure 23:
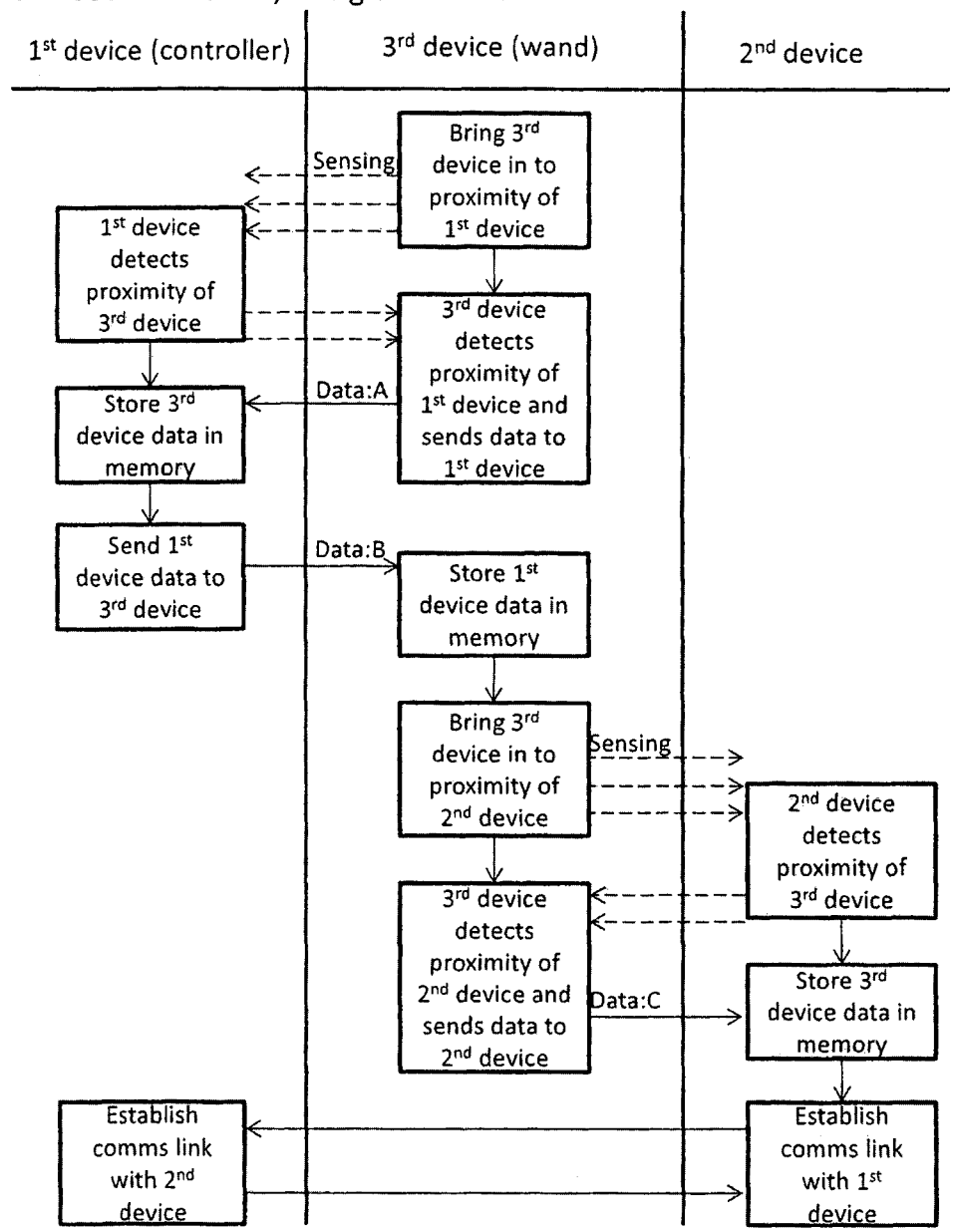
FIG. 23 illustrates a method used to establish a communication link between a first and second device, using a third device.

FIG. 23 Illustrates a Method used to Establish a Communication Link between a First and Second Device, Using a Third Device.

FIGS. 3A, 3B and 3C illustrate the steps that the method references.

1. A third device is brought into close proximity with a first device.
2. At least one of the respective proximity sensors confirms the proximity of the other device.
3. The third device transmits data including at least a security key to the first device.
4. The first device stores the data and security key in memory.
5. The first device transmits first device data to the third device.
6. The third device stores the first device data in memory.
7. The third device is brought into close proximity with a second device.
8. At least one of the respective proximity sensors confirms the proximity of the other device.
9. The third device transmits the security key and first device data to the second device.
10. The second device stores the security key and first device data in memory.
11. The second device uses the security key and first device data to make available a communication link between the first and second device.

Figure 24:
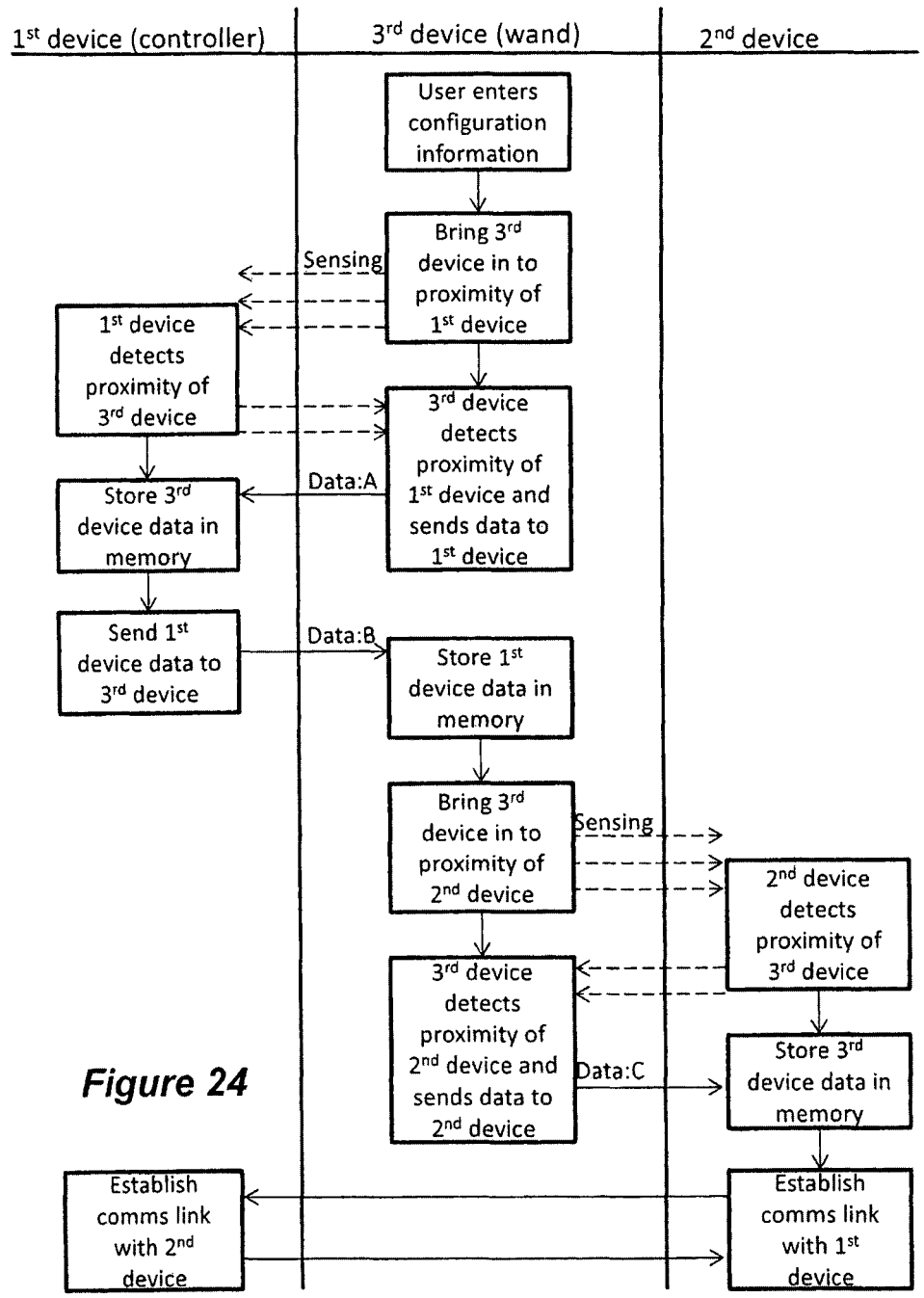
FIG. 24 illustrates a method used to establish a communication link between a first and second device, using a third device and configuration details supplied by a user.

FIG. 24 Illustrates a Method Used to Establish a Communication Link between a First and Second Device, Using a Third Device and Configuration Details Supplied by a User.

1. A user supplies extra configuration information to the third device. This may include details such as the RF channel, PANID and nick names to use when the first and second devices establish their communications link.
2. A third device is brought into close proximity with a first device.
3. At least one of the respective proximity sensors confirms the proximity of the other device.
4. The third device transmits data including at least a security key to the first device.
5. The first device stores the data and security key in memory.
6. The first device transmits first device data to the third device.
7. The third device stores the first device data in memory.
8. The third device is brought into close proximity with a second device.
9. At least one of the respective proximity sensors confirms the proximity of the other device.
10. The third device transmits the security key and first device data to the second device.
11. The second device stores the security key and first device data in memory.
12. The second device uses the security key and first device data to make available a communication link between the first and second device.

In this method, the user has the option to enter data that can be used to configure the arrangement. For example, a user may wish to set up several wireless PAN networks. The user could enter a PAN nickname, such as "home security system" then proceed to tap all the devices to be added to that PAN. Then another PAN nickname could be added, such as "Home Lights" then tap the appropriate light controllers that would be added that PAN. By establishing multiple PANs, different security priveleges can be assigned to each, using passwords, or other methods.

Figure 25:
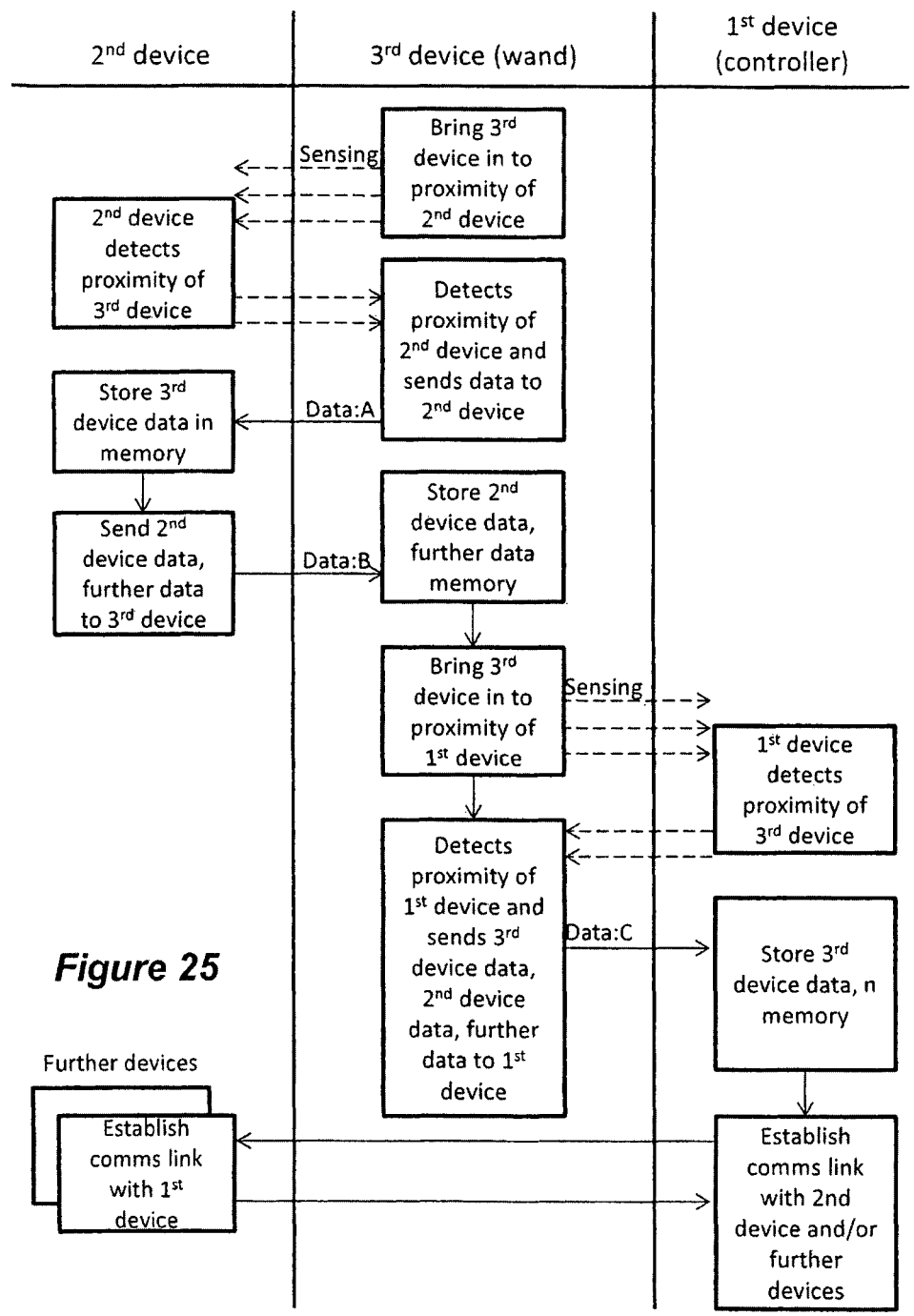
FIG. 25 illustrates a method used to establish a communication link between a first device and second device having further associated devices, using a third device.

FIG. 25 Illustrates a Method Used to Establish a Communication Link between a First Device and Second Device having further Associated Devices, Using a Third Device;

By way of reference, the following method can apply to the arrangement shown in FIG. 11 where the light switch 1130 is the first device, the PLC gateway 1117 is the second device, the wand 1121 is the third device and the PLC light controllers 1100 and 1110 represent further devices.
1. A second device has access to further device data.
2. A third device is brought into close proximity with a second device.
3. At least one of the respective proximity sensors confirms the proximity of the other device.
4. The third device transmits data including at least a security key to the second device.
5. The second device stores the data and security key in memory.
6. The second device transmits data and at least further device data to the third device.
7. The third device stores the data and further device data in memory.
8. The third device is brought into close proximity with a first device.
9. At least one of the respective proximity sensors confirms the proximity of the other device.
10. The third device transmits data including at least a security key and at least part of the further device data to the first device.
11. The first device stores at the security key and the at least part of the further device data in memory.
12. The first device uses the security key and at least part of the further device data to make available communication between the first and second device, and/or one or more of the first and further devices.

In this method, using an example of a wireless communication mechanism, the second device can be automatically paired with the first device. Thus, the first device can have access to the further devices by way of the communication mechanism used to connect the second device and the further devices. Alternatively, the first device and be automatically paired with each of the further devices, or indeed paired with each of the further devices and the second device.

It is beneficial however if the wand is equipped with a touchscreen display, to provide a user a list of the further devices. The user can then select individual or a group of devices select devices from this list that will be used to pair with the first device. Additionally if there are multiple first devices, the user can select from one or more of these to pair with one or more of the further devices.

Figure 26:
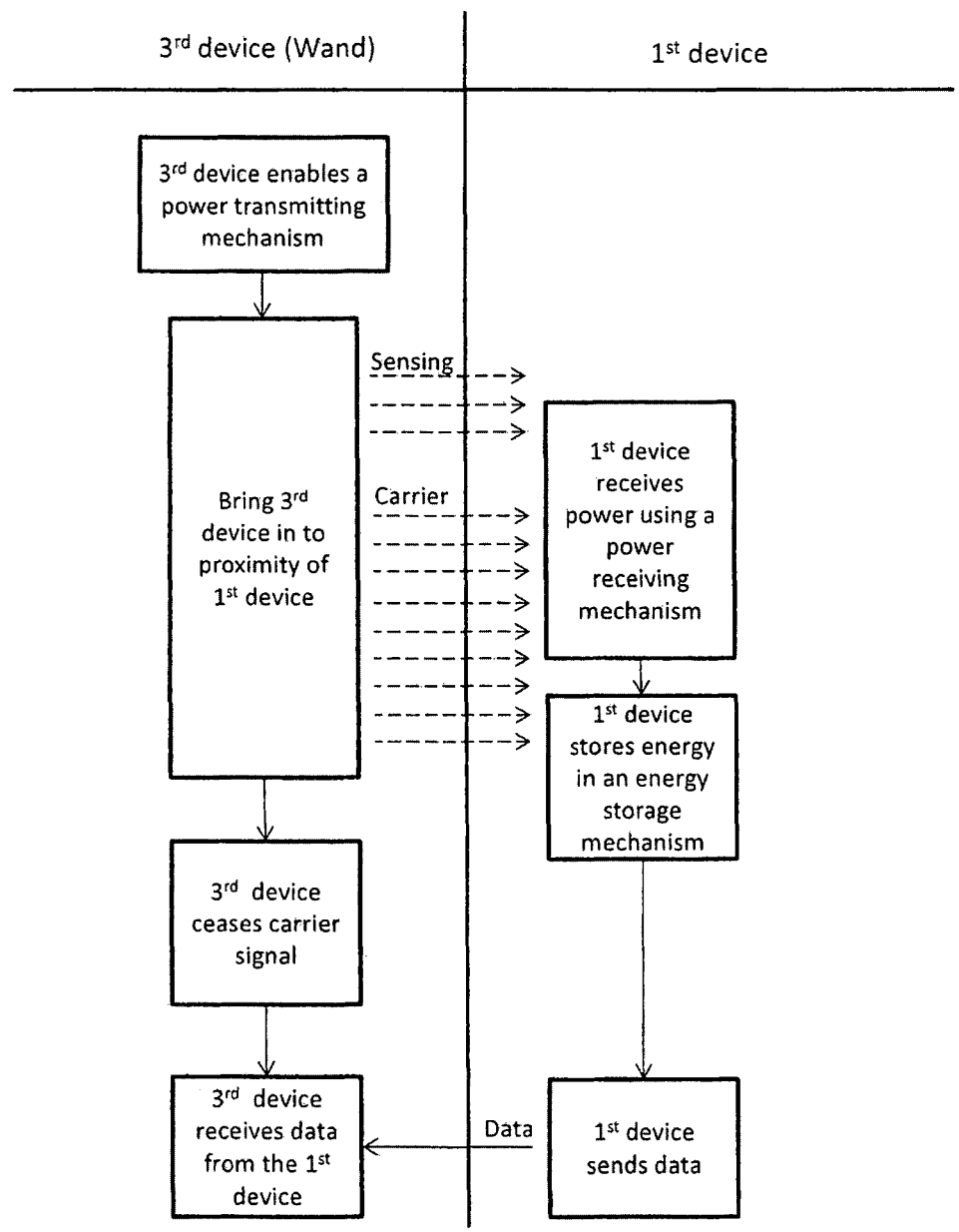
FIG. 26 illustrates a method used to establish a transfer of electrical energy between a third device and a first device using time multiplexed carrier and data.

FIG. 26 Illustrates a Method Used to Establish a Transfer of Electrical Energy between a Third Device and a First Device Using Time Multiplexed Carrier and Data.
1. A third device enables a power transmitting mechanism for a predetermined time.
2. The third device is brought into close proximity with a first device.
3. The first device receives power from a power receiving mechanism.
4. The first device stores the received power using a power storage mechanism.
5. The first device transmits data to the third device.
6. The third device receives the data from the first device and stores the data in memory.

In this method the wand can transmit a carrier a suitable for power transfer from the wand to the device. The carrier will be turned on for a predetermined time. At the end of the predetermined time the wand turns off the carrier and listens for data from the device. If no data is detected within a further predetermined time, than the carrier can be turned on again and the cycle repeated until the user stops it using the app or the system times out.

For the device, it must store the received power from the carrier generated by the wand. When enough power is received the microprocessor circuits within the device can power up and begin transmitting data immediately. The data may be repeated so as to ensure he data is received by the wand during a carrier off cycle. Or the microprocessor circuits can power up and wait until the carrier stops, then transmit the data within that time window. This system will require the microprocessor circuits to have a carrier detect circuit.

If the time it takes to transmit the data from the device to the wand data exceeds the carrier off time, then multiple carrier on/carrier off/data transmit cycles will need to be carried out with a part of the total data being sent in each carrier off time window.

Figure 27:
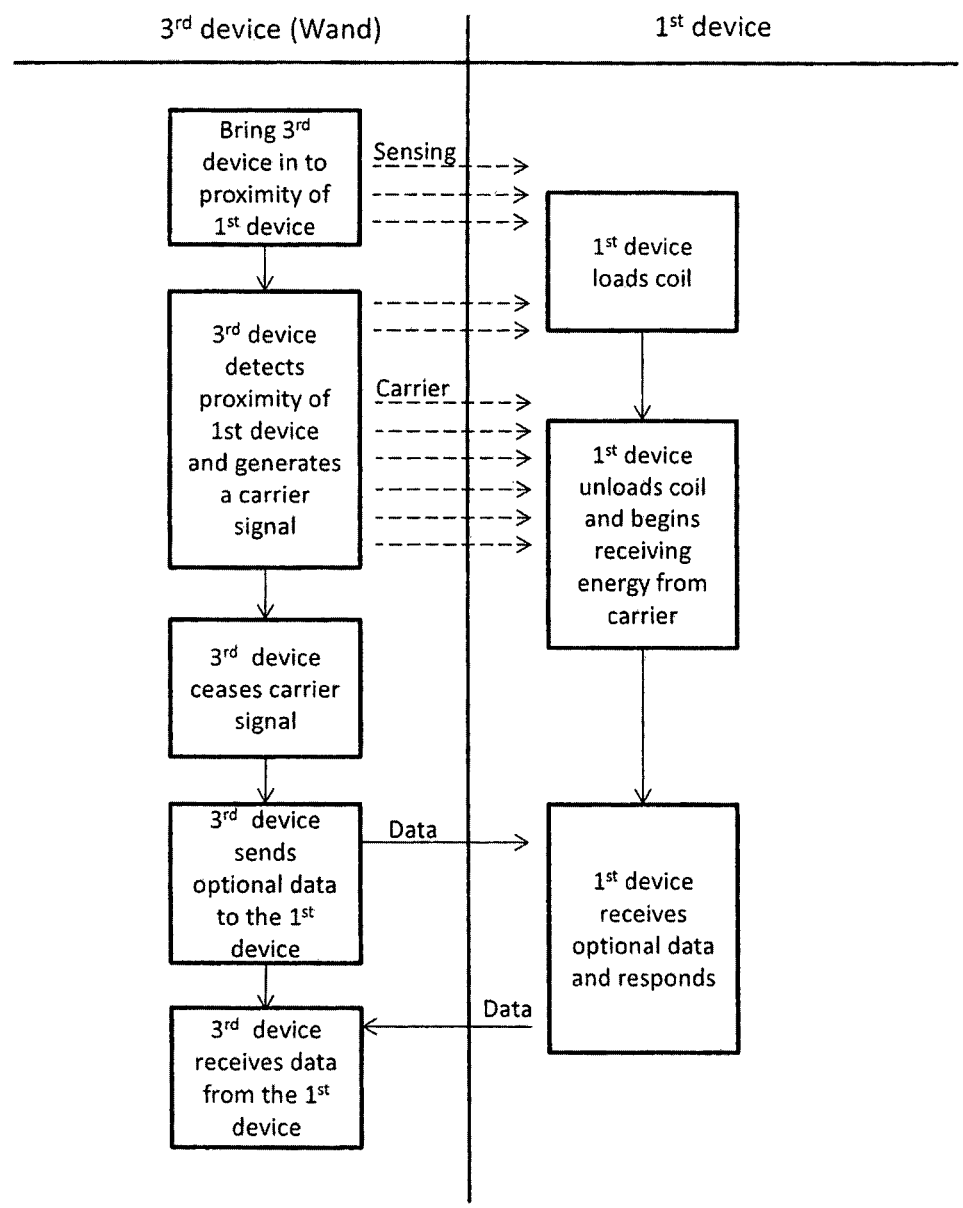
FIG. 27 illustrates a method used to establish a transfer of electrical energy between a third device and a first device using time multiplexed carrier and data and an automatic detection mechanism.

FIG. 27 Illustrates a Method Used to Establish a Transfer of Electrical Energy between a Third Device and a First Device Using Time Multiplexed Carrier and Data and an Automatic Detection Mechanism.
1. A third device is brought into close proximity with a first device
2. At least one of the respective proximity sensors confirms the proximity of the other device.
3. The third device detects the presence of the first device. In this example the first device has a default, unpowered state that loads the coil which allows the 3rd device to automatically detect presence of the first device.
4. The third device enables a power transmitting mechanism. In this example it is a carrier.
5. The third device receives power from a power receiving mechanism and stores the power in a power storage mechanism.
6. The third device disables the power transmitting mechanism after a predetermined time.
7. The third device optionally transmits data to the 1st device. In this case it might be to inform the first device that the third device is ready to receive data.
8. The first device transmits data to the third device.

The benefit with this method is that the user is not required to start an app to initiate the power transfer from the wand to the device. The wand detects automatically when it is in the presence of a device and turns on its power transmitting mechanism.

The characteristics of the wand coil will change in the presence of a second device coil. If this change can be detected by the wand, then the power transmitting mechanism in the wand can be automatically enabled. If the change of the second coil is small, it might be possible to load or somehow change the characteristic of the coil in the device to create a greater change in the characteristic of the wand coil when in the presence of the device coil. This loading may be determent to the efficiency of the power transfer between the wand and the device as the two coils need to form part of a resonant power transfer mechanism. Therefor it would be beneficial for circuits to remove this loading once the power receiving circuits in the device are enabled allowing for normal efficient power transfer.

Figure 28:
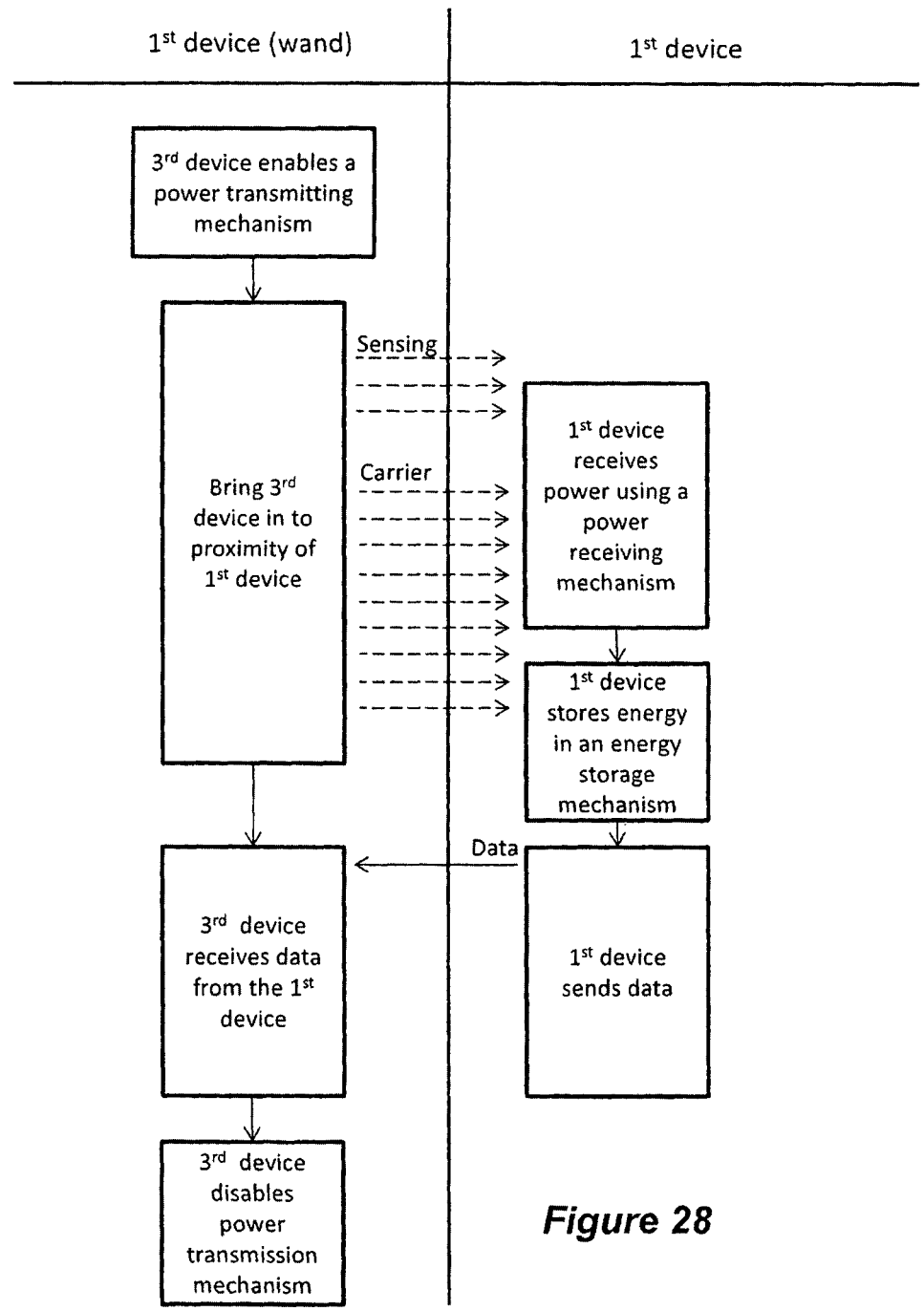
FIG. 28 illustrates a method used to establish a transfer of electrical energy between a third device and a first device using a sustained carrier.

FIG. 28 Illustrates a Method Used to Establish a Transfer of Electrical Energy between a Third Device and a First Device Using a Sustained Carrier.
1. A third device enables a power transmitting mechanism for a predetermined time.
2. The third device is brought into close proximity with a first device.
3. The first device receives power from a power receiving mechanism.
4. The first device stores the received power using a power storage mechanism.
5. The first device transmits data to the third device.
6. The third device receives the data from the first device and stores the data in memory.

In this method the carrier and data are not multiplexed. The wand can sustain a continuous carrier which can be load modulated by the device. This can be done by loading the coil of the device. The loading can be detected by the wand coil and therefore data can be transferred from the device to the wand in the presence of a carrier.

The present invention relates to the field of near field communications and especially methods for establishing associations, transferring power and communicating data between devices.

The above embodiments reveal details of how certain aspects of the invention can be implemented, however these do not represent an exhaustive or required list of solutions. Other implementation methods can be employed without deviating from the concepts covered in this invention.

Many problems have been described and solved in this invention not covered by the current state of the art. The invention disclosed herein breaks down the many barriers that exist and provides a holistic and complete solution, where a mobile device acting as a wand employing near field data communication techniques, facilitates multiple devices to be associated such that they can communicate data. The solutions not only cover the wand acting as the coordinator for the associations, but can also act as a security agent or controller for these devices. Additionally multiple controllers and multiple devices can exist in the same arrangement.

The invention is particularly beneficial to establish data communications between devices which are not easily portable, have limited access, or where existing cabling or wireless techniques make connection difficult.

Devices in the arrangement can be connected wirelessly, eliminating data cabling, but techniques are disclosed allowing devices to also be battery-less, providing installation flexibility that extends well beyond the current state of the art.

Since near field proximity methods are used extensively in this invention, details are also disclosed to allow the construction of devices that can be retro fitted to existing mobile devices, such as a mobile phone that might not already be equipped with such a mechanism. This allows users the flexibility to use their existing mobile devices to access the convenience and functional benefits this invention provides.

The invention claimed is:
1. An arrangement for managing communication between a first, second and third devices the arrangement including;
   a first device having a proximity sensor for detecting the proximity of another device, one or more communication mechanisms, one of which is a proximity communication mechanism;
   a second device having a proximity sensor for detecting the proximity of another device, one or more communication mechanisms, one of which is a proximity communication mechanism; and
   a third device having a proximity sensor for detecting the proximity of another device, one or more communication mechanisms, one of which is a proximity communication mechanism, wherein the third and the first devices are brought together such that at least one of the respective proximity sensors confirms the proximity of the other device after which the respective devices communicate to exchange data and the third and the second devices are brought together such that at least one of the respective proximity sensors confirms the proximity of the other device after which the respective devices communicate to exchange data; wherein the data transferred between the proximity communication mechanisms of the first device, second device and third device enables communications to be established between the first and second devices using one or more communication mechanisms.
2. The arrangement of claim 1, where the proximity sensor is a near field proximity sensor.
3. The arrangement of claim 1, where the proximity communication mechanism is a near field communication mechanism.
4. The arrangement of claim 1, where the communications mechanism includes one of the group including; 802.15.4, 802.11, USB, PLC.
5. The arrangement according to claim 1, wherein
   a first device further includes a power receiving mechanism,
   a third device further includes a power transmitting mechanism, such that when the devices are brought together the third device transfers power to the first device.

6. The arrangement of claim 5, wherein the power transmitting mechanism is near field communication.

7. The arrangement according to claim 1, where the data exchanged includes security keys.

8. The arrangement according to claim 1, wherein the third device includes a mobile device executing a software application.

9. The arrangement according to claim 1, wherein the third device includes a dongle device connected to a mobile device executing a software application to control the functionality of the dongle device.

10. The arrangement according to claim 9, wherein the dongle exchanges data with the mobile device using audio signals using the audio port of the mobile device.

11. The arrangement according to claim 1, wherein the third device is also a controller, an appliance or both.

12. The arrangement according to claim 11, further including one or more further devices wherein the third device connects with one or more further controller devices to enable communications to be established between a device and said one or more further controller devices.

13. The arrangement according to claim 1, wherein the third device further includes sensors for detecting user inputs.

14. The arrangement according to claim 13, wherein the sensors are one or more of the group: accelerometer, microphone, gyroscopic, touch screen, keypad or button.

15. The arrangement according to claim 1, wherein any device is a controller of an appliance associated, with a light, or an appliance associated with light.

16. The arrangement according to claim 15, further including a near field coil coupled to a controller associated with a light switching device.

17. The arrangement according to claim 16, further including one or more further devices wherein the third device connects with one or more further devices to enable communications to be established between a controller device and said one or more further devices.

18. The arrangement according to claim 1, wherein a device is an appliance being a light and a controller being a light switch controlling a light appliance.

19. The arrangement according to claim 1, wherein a device is an appliance being a wireless router.

20. The arrangement according to claim 1, wherein a device is an appliance includes a PLC as a communication mechanism.

21. An arrangement according to claim 1, wherein the device includes a mechanical power generation device to provide power for use by a respective device.

22. An arrangement for managing communication between a first, second and third devices the arrangement including;
    a first device having a proximity sensor for detecting the proximity of another device, one or more communication mechanisms, one of which is a proximity communication mechanism;
    one or more further devices having one or more communication mechanisms;
    a second device having a proximity sensor for detecting the proximity of another device, one or more communication mechanisms, one of which is a proximity communication mechanism, and has communication with one or more further devices;
    a third device having a proximity sensor for detecting the proximity of another device, one or more communication mechanisms, one of which is a proximity communication mechanism, wherein the third and the second devices are brought together such that at least one of the respective proximity sensors confirms the proximity of the other device after which the respective devices communicate to exchange data to permit the establishment of communication between said further devices and the first device as well communication between the first device and the second device using one or more communication mechanisms; and the third and the first devices are brought together such that at least one of the respective proximity sensors confirms the proximity of the other device after which the respective devices communicate to exchange data that enables communications to be established between the first and further devices and/or the first and second devices using one or more communication mechanisms.

23. An arrangement according to claim 22, wherein a communication mechanism used by the second device and further devices is PLC.

24. An arrangement according to claim 22, wherein the third device further includes a mechanism for selecting or determining the one or more further devices.

25. An arrangement according to claim 22, wherein the first device or second device includes a portion of a near field communication mechanism located remotely from— the device housing.

26. An arrangement according to claim 25, wherein the portion is a near field coil.

27. An arrangement according to claim 26, wherein the portion is remotely located and connected with wires.

28. An arrangement according to claim 27, wherein the wires are exposed to mains voltages.

29. An arrangement according to claim 27, wherein the state of the switching device can be determined through impedance measurement, voltage or current measurement.

30. An arrangement according to claim 26, wherein the near field coil is coupled to wires where the coupling is capacitive or coupled using a transformer.

31. An arrangement according to claim 30, wherein near field data is transmitted over the wires.

32. An arrangement according to claim 22, wherein the switching device includes a mechanical power generation device to provide power for use by a respective device.

33. A method for effecting communications between a first device and a second device, using a third device, the method including the following steps:
    positioning the third device at a close proximity to a first device, wherein the close proximity is suitable for data transfer using a the near field communication mechanism;
    positioning the third device at a close proximity to a second device, wherein the close proximity is suitable for data transfer using the near field communication mechanism; wherein the data transferred between the near field communication mechanisms of the first device, second device and third device enables communications to be established between the first and second devices.

34. The method of claim 33, where the method includes the further step: transfer by the third device of power to a first device.

35. The method of claim 34, wherein the power is transferred using one or more of the following wireless mechanisms: near field communication, low frequency electromagnetic transfer.

36. The method of claim 33, wherein the power is transferred using a time multiplexed carrier and data.

37. The method of claim 33, wherein the power is transferred using a sustained carrier.

* * * * *

UNITED STATES PATENT AND TRADEMARK OFFICE
CERTIFICATE OF CORRECTION

PATENT NO. : 9,654,179 B2  
APPLICATION NO. : 14/387916  
DATED : May 16, 2017  
INVENTOR(S) : John Schultz and Christopher Richard Wood Page 1 of 1

It is certified that error appears in the above-identified patent and that said Letters Patent is hereby corrected as shown below:

On the Title Page

Listed in the inventors section, "John Shultz" should be -- John Schultz --

Signed and Sealed this  
Eighth Day of May, 2018

Andrei Iancu  
*Director of the United States Patent and Trademark Office*